US006016154A

United States Patent [19]

Moroo et al.

[11] Patent Number: 6,016,154

[45] Date of Patent: Jan. 18, 2000

[54] IMAGE FORMING APPARATUS

[75] Inventors: Jun Moroo; Tomohisa Mikami; Masahiro Mori; Hirotaka Chiba; Shigemi Nagata; Shigeyoshi Nakamura; Toshio Konaka; Kazuhiko Sato, all of Kawasaki, Japan

[73] Assignee: Fujitsu Limited, Kawasaki, Japan

[21] Appl. No.: 07/911,741

[22] Filed: Jul. 10, 1992

[30] Foreign Application Priority Data

| | | | |
|---|---|---|---|
| Jul. 10, 1991 | [JP] | Japan | 3-170225 |
| Aug. 2, 1991 | [JP] | Japan | 3-194423 |
| Aug. 2, 1991 | [JP] | Japan | 3-194424 |

[51] Int. Cl.[7] .................. G09G 5/00

[52] U.S. Cl. .................. 345/442; 345/147; 345/148; 345/149; 345/442; 345/136; 345/137; 395/22; 395/24; 395/25; 395/128; 395/129; 395/132

[58] Field of Search .................. 395/128, 129, 395/132, 22, 24, 25; 345/147, 148, 149, 442, 136, 137; 364/200 MS File, 900 MS File

[56] References Cited

U.S. PATENT DOCUMENTS

| | | |
|---|---|---|
| 3,360,883 | 1/1968 | Glanzer . |
| 3,573,789 | 4/1971 | Sharp et al. . |

(List continued on next page.)

FOREIGN PATENT DOCUMENTS

| | | |
|---|---|---|
| 0 449 516 | 10/1991 | European Pat. Off. . |
| 53-133335 | 11/1978 | Japan . |
| 54-102142 | 8/1979 | Japan . |
| 55-66051 | 5/1980 | Japan . |
| 55-91022 | 7/1980 | Japan . |
| 57-34286 | 2/1982 | Japan . |
| 57-172485 | 10/1982 | Japan . |
| 59-12486 | 1/1984 | Japan . |
| 59-185487 | 10/1984 | Japan . |
| 60-157375 | 8/1985 | Japan . |
| 60-186968 | 9/1985 | Japan . |
| 61-15485 | 1/1986 | Japan . |
| 62-48188 | 3/1987 | Japan . |
| 3-295380 | 12/1991 | Japan . |

OTHER PUBLICATIONS

*IEEE*, "A Neural Architecture Applied to the Enhancement of Noisy Binary Images without Prior Knowledge", Frank Y. Shih, et al., Nov. 6, 1990, pp. 699–705.

Frankline C. Crow, "The Aliasing Problem in Computer–Generated Shaded Images", *Graphics and Image Processing,* vol. 20, 1977, pp. 799–805.

Okada, et al., "Multi–Level Dot Display Method of Lines and Arcs", *The Transaction of the Institute of Electronics, Information and Communication Engineers on Information and Systems,*vol. J61–D, No. 7, 1978, pp. 491–493.

Barros, et al., "Generating Smooth 2–D Monocolor Line Drawings on Video Displays", vol. 13, No. 2, 1979, pp. 260–269.

(List continued on next page.)

*Primary Examiner*—Phu K. Nguyen
*Attorney, Agent, or Firm*—Staas & Halsey

[57] ABSTRACT

An image forming apparatus, such as a laser printer, ink jet printer, or a thermal transfer, which comprises a neural network. The apparatus improves image quality by reducing a zigzag included, e.g., in input image data, reducing the circuit size by reducing the number of bits having small weights for an input combination, and concurrently correcting the size of center, left and right picture elements in a predetermined window. The neural network outputs correction data for the size and position of the center dot in a window in response to an input of dot image data in a window or subdot pattern exposure data for the center dot. Additionally, the neural network uses any of the three values, +1, −1 and 0, for the coefficient of input combination for a hidden layer neuron, e.g., after a teacher pattern is learned. Further, the neural network outputs correction data for 3xN subblocks of picture elements obtained by dividing blocks of picture elements in the center, left and right of a window.

53 Claims, 77 Drawing Sheets

U.S. PATENT DOCUMENTS

| | | | |
|---|---|---|---|
| 3,737,855 | 6/1973 | Cutaia . | |
| 3,803,631 | 4/1974 | Nucklos et al. . | |
| 3,846,754 | 11/1974 | Oka et al. . | |
| 3,871,003 | 3/1975 | Kondo et al. . | |
| 3,952,311 | 4/1976 | Lapeyre . | |
| 3,988,742 | 10/1976 | Meier . | |
| 3,991,868 | 11/1976 | Robinson et al. . | |
| 4,032,977 | 6/1977 | Liao . | |
| 4,084,259 | 4/1978 | Katagi . | |
| 4,107,687 | 8/1978 | Pfeifer et al. . | |
| 4,124,870 | 11/1978 | Schatz et al. . | |
| 4,150,400 | 4/1979 | Wong . | |
| 4,212,009 | 7/1980 | Aldeman et al. . | |
| 4,242,678 | 12/1980 | Somerville . | |
| 4,280,144 | 7/1981 | Bacon . | |
| 4,323,974 | 4/1982 | Sekigawa . | |
| 4,353,337 | 10/1982 | Rosaen . | |
| 4,355,337 | 10/1982 | Sekigawa . | |
| 4,386,272 | 5/1983 | Check, Jr. et al. . | |
| 4,437,122 | 3/1984 | Walsh et al. . | |
| 4,450,483 | 5/1984 | Coviello . | |
| 4,455,562 | 6/1984 | Dolan et al. . | |
| 4,460,909 | 7/1984 | Bassetti et al. . | |
| 4,544,264 | 10/1985 | Bassetti et al. . | |
| 4,544,922 | 10/1985 | Watanabe et al. . | |
| 4,625,222 | 11/1986 | Bassetti et al. . | |
| 4,681,424 | 7/1987 | Kantor et al. . | |
| 4,715,006 | 12/1987 | Nagata . | |
| 4,786,923 | 11/1988 | Shimizu . | |
| 4,847,641 | 7/1989 | Tung . | |
| 5,131,072 | 7/1992 | Yoshizawa et al. . | |
| 5,148,497 | 9/1992 | Pentland et al. | 382/54 |
| 5,251,268 | 10/1993 | Colley et al. | 382/14 |

OTHER PUBLICATIONS

Nikkei Electronics, 1981, pp. 96–99.

Nishida, et al., “Removing jags from line drawings on a color display”, *Computer Vision,*1981, pp. 2 and 3.

Rumelhart, et al., “Learning Internal Representation by Error Propagation”, *Parallel Distributed Processing,* vol. I, II, Chapter 8, 1986, pp. 319–362.

MEAN OPINION SCORE

| MARK | MEANING |
|---|---|
| 5 | INPERCEPTIBLE |
| 4 | PERCEPTIBLE, BUT NOT ANNOYING |
| 3 | SLIGHTLY ANNOYING |
| 2 | ANNOYING |
| 1 | VERY ANNOYING |

$$y^n = f(k_0^n + k_1^n \chi_1^n + \ldots + k_m^n \chi_m^n)$$

| | 1 | 2 | 3 | 4 | 5 | 6 | 7 | 8 | 9 | 10 | 11 | 12 | 13 | 14 | 15 | CONSTANT TERM |
|---|---|---|---|---|---|---|---|---|---|---|---|---|---|---|---|---|
| 1 | 1.5 | -0.8 | -1.0 | 0.5 | 0.9 | -2.2 | -4.5 | -7.4 | 4.7 | 3.1 | 0.5 | -2.7 | -2.7 | -2.5 | 2.8 | -0.01 |
| 2 | -3.1 | -2.0 | -2.0 | -1.1 | 0.3 | -2.5 | 1.9 | 2.5 | -1.2 | 1.9 | -0.6 | -0.3 | -1.5 | -1.0 | 0.9 | -0.61 |
| 3 | 0.2 | -1.4 | -8.7 | -2.4 | -0.6 | -0.3 | -1.2 | 1.1 | 0.8 | 0.7 | -1.2 | 1.9 | -4.6 | 0.9 | -0.7 | 3.23 |
| 4 | -1.4 | -4.5 | -4.8 | -3.8 | 1.0 | -0.7 | 0.5 | -1.7 | -2.9 | -1.9 | 1.7 | 1.7 | -2.1 | 2.6 | 1.9 | 1.52 |
| 5 | -2.3 | -2.0 | -5.0 | -0.2 | 1.1 | -4.3 | -2.0 | 5.0 | 4.2 | 1.6 | 0.1 | 2.0 | -3.9 | 2.2 | -2.0 | 1.15 |
| 6 | -0.1 | 1.9 | 5.9 | -2.0 | -0.5 | 0.4 | 2.2 | -4.9 | 0.3 | -0.2 | -0.1 | 1.7 | 6.6 | -1.3 | 0.0 | -1.18 |
| 7 | -0.9 | 1.4 | 0.5 | -2.1 | 0.8 | -1.9 | -0.2 | 4.1 | 2.1 | 2.4 | 2.4 | 3.1 | 1.6 | -0.1 | 0.0 | 3.09 |
| 8 | -2.3 | -1.8 | 1.3 | 3.0 | 2.7 | 3.0 | -1.4 | 2.5 | -0.7 | 2.4 | 0.0 | 0.2 | 4.1 | 0.2 | 1.3 | -5.43 |
| 9 | -1.6 | 4.5 | 1.4 | -0.1 | -2.3 | 3.1 | 3.8 | 1.4 | -2.4 | -1.6 | 0.9 | 0.1 | 3.0 | -2.0 | -1.2 | 3.14 |
| 10 | -0.2 | -3.0 | -3.6 | -3.1 | -1.5 | -1.9 | -2.5 | -3.1 | -0.4 | 0.8 | -0.3 | 0.9 | 1.5 | 1.5 | -1.1 | -0.81 |
| 11 | 0.6 | -0.5 | -5.6 | -5.7 | -0.5 | 0.1 | -0.2 | 2.6 | -5.4 | -0.4 | 0.0 | 2.0 | -3.3 | -6.0 | 0.0 | 3.05 |
| 12 | -1.5 | -2.6 | -5.1 | -0.1 | 1.8 | -0.5 | 2.4 | -2.9 | 0.0 | 0.5 | 0.9 | 0.3 | -2.7 | 3.0 | 0.0 | 2.38 |
| 13 | 1.1 | 0.0 | -0.4 | -2.8 | 0.0 | 0.3 | 2.4 | 6.5 | -1.1 | 0.0 | -0.2 | 3.5 | -2.7 | 0.8 | 0.4 | -1.36 |
| 14 | -1.0 | 0.6 | 0.0 | 0.2 | 1.4 | 1.1 | 0.9 | -8.8 | 1.1 | 1.0 | -0.3 | 1.1 | 1.1 | 0.1 | -0.3 | 2.26 |
| 15 | -1.1 | -7.6 | -3.3 | -2.5 | -0.3 | 0.7 | -0.9 | 4.7 | -0.5 | -0.5 | 0.2 | -3.7 | 1.7 | 3.1 | 0.3 | -0.11 |
| 16 | -0.4 | -4.4 | 2.1 | -0.6 | 0.4 | 2.0 | -2.8 | -0.1 | -1.2 | 0.7 | 1.0 | -2.0 | 1.4 | 0.1 | 0.1 | 0.30 |

Fig. 28

| | 1 | 2 | 3 | 4 | 5 | 6 | 7 | 8 | 9 | 10 | 11 | 12 | 13 | 14 | 15 | 16 | CONSTANT TERM |
|---|---|---|---|---|---|---|---|---|---|---|---|---|---|---|---|---|---|
| 1 | -11.67 | 3.38 | -4.39 | -6.20 | 6.31 | -2.83 | 1.38 | 6.50 | -0.16 | -3.38 | 1.95 | -1.41 | 4.91 | -9.94 | 1.19 | 1.41 | -1.55 |
| 2 | 9.80 | -2.95 | 3.21 | 5.99 | -6.84 | -0.40 | 1.54 | -4.43 | -0.66 | -1.99 | -1.90 | -1.34 | 1.55 | -12.48 | 0.05 | -4.51 | -3.40 |
| 3 | -2.08 | -0.88 | 2.68 | -4.07 | 6.70 | 1.82 | -10.46 | -4.82 | -2.33 | 6.21 | -2.78 | -7.54 | -4.97 | 6.14 | -1.75 | -0.22 | -0.59 |
| 4 | -7.19 | 0.98 | -6.85 | -2.94 | 4.04 | 6.29 | -1.28 | 3.27 | -8.11 | -2.64 | 12.87 | -4.02 | -6.18 | -6.42 | -6.64 | -2.56 | 0.97 |
| 5 | -1.26 | -2.13 | -6.73 | -3.66 | 1.65 | -10.63 | -2.25 | -1.42 | -1.42 | -2.96 | -4.65 | -4.29 | -1.99 | 2.48 | 9.04 | 3.31 | -0.06 |

Fig. 29

| | 1 | 2 | 3 | 4 | 5 | 6 | 7 | 8 | 9 | 10 | 11 | 12 | 13 | 14 | 15 | CONSTANT TERM |
|---|---|---|---|---|---|---|---|---|---|---|---|---|---|---|---|---|
| 1 | 0.00 | 0.00 | 1.00 | -1.00 | 0.00 | 0.00 | 0.00 | 1.00 | -1.00 | 0.00 | 0.00 | 1.00 | -1.00 | -1.00 | 0.00 | -3.00 |
| 2 | 0.00 | 1.00 | -1.00 | -1.00 | 0.00 | 0.00 | 0.00 | 1.00 | -1.00 | 0.00 | 0.00 | 0.00 | 1.00 | -1.00 | 0.00 | -3.00 |
| 3 | 0.00 | -1.00 | 1.00 | 0.00 | 0.00 | 0.00 | -1.00 | 1.00 | 0.00 | 0.00 | 0.00 | -1.00 | -1.00 | 1.00 | 0.00 | -3.00 |
| 4 | 0.00 | -1.00 | -1.00 | 1.00 | 0.00 | 0.00 | -1.00 | 1.00 | 0.00 | 0.00 | 0.00 | -1.00 | 1.00 | 0.00 | 0.00 | -3.00 |
| 5 | 0.00 | -1.00 | 1.00 | 0.00 | 0.00 | -1.00 | -1.00 | 1.00 | 1.00 | 0.00 | -1.00 | 1.00 | 1.00 | 1.00 | 0.00 | -6.00 |
| 6 | -1.00 | 1.00 | 1.00 | 1.00 | 0.00 | -1.00 | -1.00 | 1.00 | 1.00 | 0.00 | 0.00 | -1.00 | 1.00 | 0.00 | 0.00 | -6.00 |
| 7 | 0.00 | 0.00 | 1.00 | -1.00 | 0.00 | 0.00 | 1.00 | 1.00 | -1.00 | -1.00 | 0.00 | 1.00 | 1.00 | 1.00 | -1.00 | -6.00 |
| 8 | 0.00 | 1.00 | 1.00 | 1.00 | -1.00 | 0.00 | 1.00 | 1.00 | -1.00 | -1.00 | 0.00 | 0.00 | 1.00 | -1.00 | 0.00 | -6.00 |
| 9 | 0.00 | 0.00 | -1.00 | -1.00 | -1.00 | -1.00 | -1.00 | -1.00 | 1.00 | 1.00 | 1.00 | 1.00 | 1.00 | 0.00 | 0.00 | -5.00 |
| 10 | 1.00 | 1.00 | 1.00 | 0.00 | 0.00 | -1.00 | -1.00 | -1.00 | 1.00 | 1.00 | 0.00 | 0.00 | -1.00 | -1.00 | -1.00 | -5.00 |
| 11 | -1.00 | -1.00 | -1.00 | 0.00 | 0.00 | 1.00 | 1.00 | -1.00 | -1.00 | -1.00 | 0.00 | 0.00 | 1.00 | 1.00 | 1.00 | -5.00 |
| 12 | 0.00 | 0.00 | 1.00 | 1.00 | 1.00 | 1.00 | 1.00 | -1.00 | -1.00 | -1.00 | -1.00 | -1.00 | -1.00 | 0.00 | 0.00 | -5.00 |
| 13 | 0.00 | -1.00 | -1.00 | -1.00 | -1.00 | -1.00 | -1.00 | 1.00 | 1.00 | 1.00 | 1.00 | 1.00 | 0.00 | 0.00 | 0.00 | -5.00 |
| 14 | 1.00 | 1.00 | 0.00 | 0.00 | 0.00 | -1.00 | -1.00 | 1.00 | 1.00 | 1.00 | 0.00 | -1.00 | -1.00 | -1.00 | -1.00 | -5.00 |
| 15 | -1.00 | -1.00 | -1.00 | -1.00 | 0.00 | 1.00 | 1.00 | 1.00 | -1.00 | -1.00 | 0.00 | 0.00 | 0.00 | 1.00 | 1.00 | -5.00 |
| 16 | 0.00 | 0.00 | 0.00 | 1.00 | 1.00 | 1.00 | 1.00 | 1.00 | -1.00 | -1.00 | -1.00 | -1.00 | -1.00 | -1.00 | 0.00 | -5.00 |
| 17 | 0.00 | 0.00 | -1.00 | -1.00 | -1.00 | -1.00 | -1.00 | -1.00 | 1.00 | 1.00 | -1.00 | 1.00 | 1.00 | 0.00 | 0.00 | -4.00 |
| 18 | -1.00 | 1.00 | 1.00 | 0.00 | 0.00 | -1.00 | -1.00 | -1.00 | 1.00 | 1.00 | 0.00 | 0.00 | -1.00 | -1.00 | -1.00 | -4.00 |
| 19 | -1.00 | -1.00 | -1.00 | 0.00 | 0.00 | 1.00 | 1.00 | -1.00 | -1.00 | -1.00 | 0.00 | 0.00 | 1.00 | 1.00 | -1.00 | -4.00 |
| 20 | 0.00 | 0.00 | 1.00 | 1.00 | -1.00 | 1.00 | 1.00 | -1.00 | -1.00 | -1.00 | -1.00 | -1.00 | -1.00 | 0.00 | 0.00 | -4.00 |
| 21 | 0.00 | -1.00 | -1.00 | -1.00 | 1.00 | -1.00 | -1.00 | 1.00 | 1.00 | 0.00 | 1.00 | 1.00 | 0.00 | 0.00 | 0.00 | -5.00 |
| 22 | 1.00 | 1.00 | 0.00 | 0.00 | 0.00 | -1.00 | -1.00 | 1.00 | 1.00 | 0.00 | 0.00 | -1.00 | -1.00 | -1.00 | 1.00 | -5.00 |
| 23 | 1.00 | -1.00 | -1.00 | -1.00 | 0.00 | 0.00 | 1.00 | 1.00 | -1.00 | -1.00 | 0.00 | 0.00 | 0.00 | 1.00 | 1.00 | -5.00 |
| 24 | 0.00 | 0.00 | 0.00 | 1.00 | 1.00 | 0.00 | 1.00 | 1.00 | -1.00 | -1.00 | 1.00 | -1.00 | -1.00 | -1.00 | 0.00 | -5.00 |

( NUMBER OF NEURONS: 24, NUMBER OF INPUTS: 15 )

Fig. 33

| DOT NUMBER | CO-EFFICIENT | SELECTION CONTROL | DOT NUMBER | CO-EFFICIENT | SELECTION CONTROL | DOT NUMBER | CO-EFFICIENT | SELECTION CONTROL |
|---|---|---|---|---|---|---|---|---|
| 1 | 0 | 0 | 6 | 0 | 0 | 11 | 0 | 0 |
| 2 | 1 | 0 | 7 | 0 | 0 | 12 | 0 | 0 |
| 3 | 1 | 1 | 8 | 1 | 0 | 13 | 1 | 0 |
| 4 | 1 | 1 | 9 | 1 | 1 | 14 | 1 | 1 |
| 5 | 0 | 0 | 10 | 0 | 0 | 15 | 0 | 0 |

WHERE SELECTOR SELECTS "A" WHEN CONTROL SIGNAL INDICATES "0".

Fig. 36

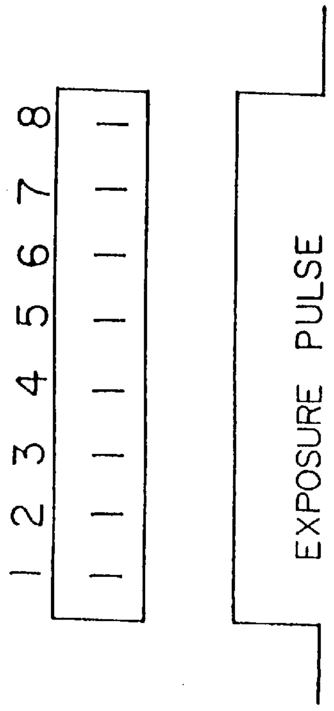
Fig. 45A SIZE $\frac{8}{8}$, NO SHIFT
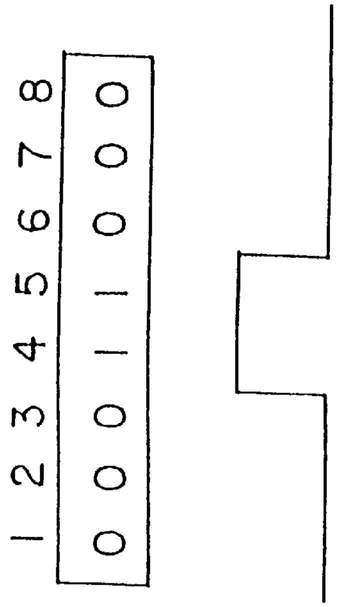
Fig. 45B SIZE $\frac{2}{8}$, NO SHIFT
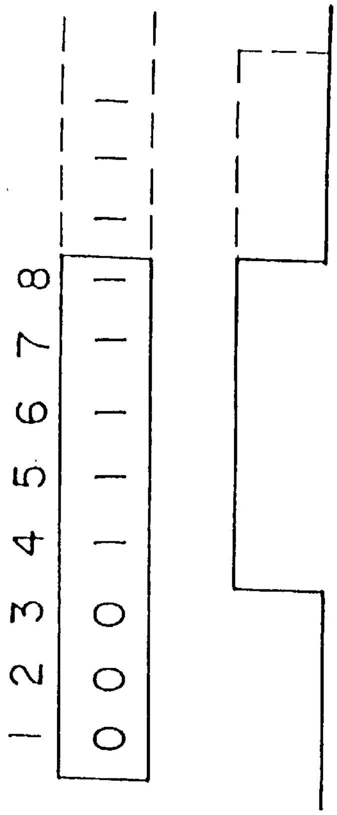
Fig. 45C SIZE $\frac{8}{8}$, SHIFT TO RIGHT
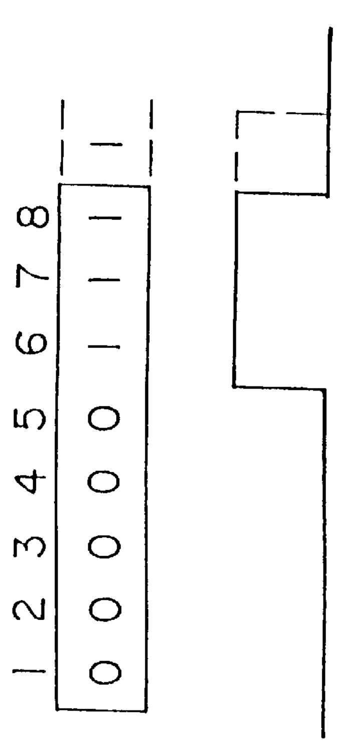
Fig. 45D SIZE $\frac{4}{8}$, SHIFT TO RIGHT

FIG. 57

| | 10 20 30 40 50 63 | CONSTANT TERM |
|---|---|---|
| 1 | 222222222222222222222220002000000112221111222222222222222222222 | -6 |
| 2 | 222222222222222222221111222000000112222220002222222222222222222 | -6 |
| 3 | 222222222222222220002222222110000002221111222222222222222222222 | -6 |
| 4 | 222222222222222222221111222110000002000222222222222222222222222 | -6 |
| 5 | 222222222222222222222220002220000111222111222222222222222222222 | -6 |
| 6 | 222222222222222222221112222220000111222220002222222222222222222 | -6 |
| 7 | 222222222222222220002222222111000022222111222222222222222222222 | -6 |
| 8 | 222222222222222222221112221110000222000222222222222222222222222 | -6 |
| 9 | 222222222222222222222220002222200112222211222222222222222222222 | -4 |
| 10 | 222222222222222222221122222222200112222220002222222222222222222 | -4 |
| 11 | 222222222222222220002222222221100222222211222222222222222222222 | -4 |
| 12 | 222222222222222222221122222110022222000222222222222222222222222 | -4 |
| 13 | 222222222222222222222220002222000111222111222222222222222222222 | -6 |
| 14 | 222222222222222222221112222222000111222220002222222222222222222 | -6 |
| 15 | 222222222222222220002222221110002222222111222222222222222222222 | -6 |
| 16 | 222222222222222222221112221110002222000222222222222222222222222 | -6 |
| 17 | 222222222222222222222200000222000111122111222222222222222222222 | -7 |
| 18 | 222222222222222222211122222222000111122200002222222222222222222 | -7 |
| 19 | 222222222222222200000222211110002222222111222222222222222222222 | -7 |
| 20 | 222222222222222222222112211110002220000222222222222222222222222 | -7 |
| 21 | 222222222222222222222220000022200111111211222222222222222222222 | -8 |
| 22 | 222222222222222222221122222222200111111220000022222222222222222 | -8 |
| 23 | 222222222222222200000022111111002222222211222222222222222222222 | -8 |
| 24 | 222222222222222222221121111110022200000222222222222222222222222 | -8 |
| 25 | 222222222222222222221002222221022222221022222222222222222222222 | -3 |
| 26 | 222222222222222222222102222222102222221002222222222222222222222 | -3 |
| 27 | 222222222222222222220012222220122222201222222222222222222222222 | -3 |
| 28 | 222222222222222222222012222222012222222001222222222222222222222 | -3 |
| 29 | 222222222222210022222210222222210222222210222222210222222210222 | -6 |
| 30 | 222210222222210222222210222222210222222210222222210022222222222 | -6 |
| 31 | 222222222220012222222012222222012222222012222222012222222012222 | -6 |
| 32 | 222012222222012222222012222222012222222012222220012222222222222 | -6 |
| 33 | 222100222222210222222210222222210222222210222222210222222210222 | -7 |
| 34 | 222210222222210222222210222222210222222210222222210222222100222 | -7 |
| 35 | 222001222222012222222012222222012222222012222222012222222012222 | -7 |
| 36 | 222012222222012222222012222222012222222012222222012222222001222 | -7 |
| 37 | 222222222222222122222110222221002222100222222222222222222222222 | -5 |
| 38 | 222222222222222222221002222221002222211022222221222222222222222 | -5 |
| 39 | 222222222212222222201122222200122222200122222222222222222222222 | -5 |
| 40 | 222222222222222222220012222200122222011222212222222222222222222 | -5 |
| 41 | 222222222212222222001222222001122222000122222200122222222222222 | -6 |
| 42 | 222222222220012222000122220011222200122222221222222222222222222 | -6 |
| 43 | 222222222222222122222221002222110022221000222100222222222222222 | -6 |
| 44 | 222222222100222222210002222221100222222210022222221222222222222 | -6 |
| 45 | 222222222012222222012222222001222222001122222000122222222222222 | -6 |

| | 1 ↓ · 10 ↓ · 20 ↓ · 30 ↓ · 40 ↓ · 50 ↓ · 63 ↓ | CONSTANT TERM |
|---|---|---|
| 46 | 222222222222200012222001122220012222220122222201222222222222222 | -6 |
| 47 | 222222222222222210222222102222221002222110022221000222222222222 | -6 |
| 48 | 222222222210002222222110022222221002222222102222222102222222222 | -6 |
| 49 | 012222222201222222220122222222012222222001222222201122222222001 | -8 |
| 50 | 222222200122222011222200122222201222222012222220122222201222222 | -8 |
| 51 | 222222210222222102222221022222210222222100222211022222100222222 | -8 |
| 52 | 100222222211022222221002222222102222222210222222221022222222210 | -8 |
| 53 | 222222222222220122220012222220122222201222222012222222222222222 | -5 |
| 54 | 222222222220122222220122222220122222220012222222201222222222222 | -5 |
| 55 | 222222222210222222222100222222210222222221022222221022222222222 | -5 |
| 56 | 222222222222221022222221022222210222222100222221022222222222222 | -5 |
| 57 | 222222012222201222220012222220122222201222222012222222012222222 | -7 |
| 58 | 201222222201222222220122222222012222222001222222220122222222012 | -7 |
| 59 | 210222222221022222222100222222210222222221022222222102222222102 | -7 |
| 60 | 222222102222222102222221022222210222222100222221022222210222222 | -7 |

Fig. 58

: DON'T CARE

FIG. 74

| CENTRAL PICTURE ELEMENT | LEFT PICTURE ELEMENT | CENTRAL PICTURE ELEMENT | RIGHT PICTURE ELEMENT |
|---|---|---|---|
| 1 (BLACK) | 0 0 0 0 0 0 | 1 1 1 1 1 1 | 0 0 0 0 0 0 |
| 0 (WHITE) | 0 0 0 0 0 0 | 0 0 0 0 0 0 | 0 0 0 0 0 0 |

IMAGE FORMING APPARATUS

BACKGROUND OF THE INVENTION

The present invention relates to an image forming apparatus used for printers such as laser printers, ink jet printers, thermal transfer printers, etc., and more specifically to an image forming apparatus capable of improving the quality of inputted images by reducing jaggy forms and smoothing the density variation in gray scale images.

Since a large part of image forming printers ar e designed for 300 dpi, most electronic computers output signals in accordance with 300 dpi. However, 300 dpi printers have a disadvantage of forming jaggy images. To eliminate it, the density of picture elements must be made higher. Nevertheless, high-density picture elements increase page buffers and printer costs associated with enhanced precision in an engine. Additionally, widely distributed bit map font and popular input units (scanners, etc.) for 300 dpi units cannot be used at all. With laser printers, high-density picture elements can be obtained in the vertical scanning. That is, it is very difficult to increase the pitch of form feed and drum feed. If it could, it, would cost very high. If high-density picture elements is designed in the horizontal scanning direction, the improvement can be realized more easily with a low cost. Therefore, it is proposed that the quality of images should be improved by tripling the picture element positioning precision in the horizontal direction and setting the size of a picture element in 12 variations (U.S. Pat. No. 4,847,641). With this method, inputted image picture elements are segmented by a sampling window of a predetermined form, compared with a plurality of template patterns written in a PLA (programmable logic array), and modified to the correct position and size of corresponding picture elements if they match any of the predetermined patterns.

FIG. 1 shows how to correct the position and size of picture elements. Inputted data 1 are segmented by a sampling window 2, compared with templates 3 shown to the right in FIG. 1, and corrected to the position and size of corresponding picture elements if inputted data match any of the template patterns.

FIG. 2 shows before-correction and after-correction pattern samples stored in templates 3. In FIG. 2, the patterns above each arrow shows data in a template to be corrected, and the patterns below each arrow show patterns corrected according to the data. Each of the upper patterns shows a vertical oblique line to be corrected to an appropriate vertical oblique line. For example, the left most pattern shows that the picture element at the center is moved by ⅓ element to left. In these patterns, thin black dots indicate picture elements not to be corrected in the present process.

In FIG. 2, middle patterns shows a jag reducing process on a horizontal oblique line where the size of a dot to be corrected is reduced to 60% in normal dot diameter. The two patterns in the lower right corner show a jag reducing process on a horizontal oblique line where the size of a dot to be corrected is reduced to 30% in normal dot diameter. Then, a white dot right to the corrected dot is assigned a black dot of 60% in normal dot diameter, thus reducing jags in horizontal oblique lines.

However, since the methods described by referring to FIGS. 1 and 2 require a number of template patterns, they cause problems of a low process speed, a large memory requirements for storing a large number of template patterns, and correction being performed only on picture elements at the coincident positions in template patterns.

Additional problem is that an appropriate correction cannot be performed for a pattern of, for example, a black-white-black arrangement because the correction is made only in picture element units and such arrangement cannot be made within one picture element. In addition to the jag reducing method, a there is a density variation smoothing method as another method for improving the quality of images. However, this method is not practical because a great number of picture element patterns exist in the same gray scale. Furthermore, in the method shown in FIG. 1, the quality of images is improved by correcting the position and size of a target picture element, that is, a picture element at the center of a template. Therefore, picture elements are undesirably corrected depending on the types of patterns as shown in FIG. 3, thereby resulting in worse image quality.

Besides, a picture element comes in 12 variations and the input position can be shifted for 3 positions, that is, the original, forward, and backward positions. This generates 36 selections of lighting timing, thereby causing.a large scale circuit for light modulation.

SUMMARY OF THE INVENTION

An object of the present invention is to improve the quality of images by reducing jags in images inputted through a neural network and smoothing the density variations in gray-scale images. Another object is to reduce the capacity of a buffer for storing a coefficient and minimize the scale of a circuit by using a network capable of representing by a small number of bits the coefficient of input connection to each neuron in the hidden layer after the learning of a correction pattern.

The third object of the present invention is to reduce image jags and improve the quality of images by comparing the data of a target picture element and those surrounding it with a predetermined pattern and simultaneously correcting the target and the right and left adjacent picture elements.

A feature of the present invention resides in a image forming apparatus comprising a means for receiving an image, and a smoother means for smoothing the image by correcting dot positions of input dots of image data according to the array of inputted image data, wherein; a neural network forming said smoother means outputs correction data in response to an image data input in a window of a predetermined shape for correcting the position and size for a central dot in said window.

Another feature of the present invention resides in a image forming apparatus comprising; a input means for receiving an image and an smoother means for smoothing the image by correcting dot positions of input dots of image data according to the array of inputted image data; wherein; a neural network forming said smoother means outputs, in response to an input of dot image data in a window having a predetermined shape, subdot pattern exposure data for a center dot in said window.

A further feature of the present invention resides in an image forming apparatus comprising; a window data segmenter means for segmenting data representing picture elements in a window comprising more than one [1] picture element each on more than one [1] line, a correction data outputter means for dividing by N a block of center picture elements on a horizontal line in said window, a neighboring block of left picture elements on the same horizontal line in said window and a neighboring block of right picture elements on the same horizontal line in said window and for outputting, as for center picture element correction data, correction data for the 3×N subblocks of picture, elements obtained by the N division in a sequence of left, center and right, and an output picture element data operator means for receiving said center picture element correction data outputted from said correction data outputter means, for processing the result of processing by said center picture element correction data on receiving N subblocks of left side picture element correction data for said center picture element, and for outputting output picture element data for a block of picture elements further to the left of a block of picture elements neighboring said block of center picture elements in said window.

A still further feature of the present invention resides in an image forming apparatus for smoothing an image by correcting dots in said inputted dot image data according to an array of inputted dot image data, comprising smoothing means for receiving dot image data in a window of a predetermined form and outputting a plurality of subdot pattern exposure data for one central dot in said window, and an exposure pattern data outputting means for obtaining a logical sum using an output from said smoothing means subdot information about left to right dots and right to left dots containing said central dot and subdot information about said central dot, and outputting said logical sum as exposure pattern data for said central dot in said window.

BRIEF DESCRIPTION OF THE DRAWINGS

FIG. 28 shows an embodiment of a coefficient for a neuron in the hidden layer after a learning process;

FIG. 29 shows an embodiment of a coefficient for a neuron in the output layer after a learning process;

FIG. 33 shows an embodiment of a coefficient for a neuron in the hidden layer after a learning process;

FIG. 36 shows an embodiment of the content of the coefficient buffer and the selection control signal shown in FIG. 35;

FIG. 45 shows an example of a exposure pulse correction signal specified by the dot size and shift;

FIG. 57 shows the coefficient of input connection (1);

FIG. 58 shows the coefficient of input connection (2);

FIG. 74 shows an embodiment of a correction pattern for a window not coincident with template data;

DESCRIPTION OF THE PREFERRED EMBODIMENT

Figure 1:
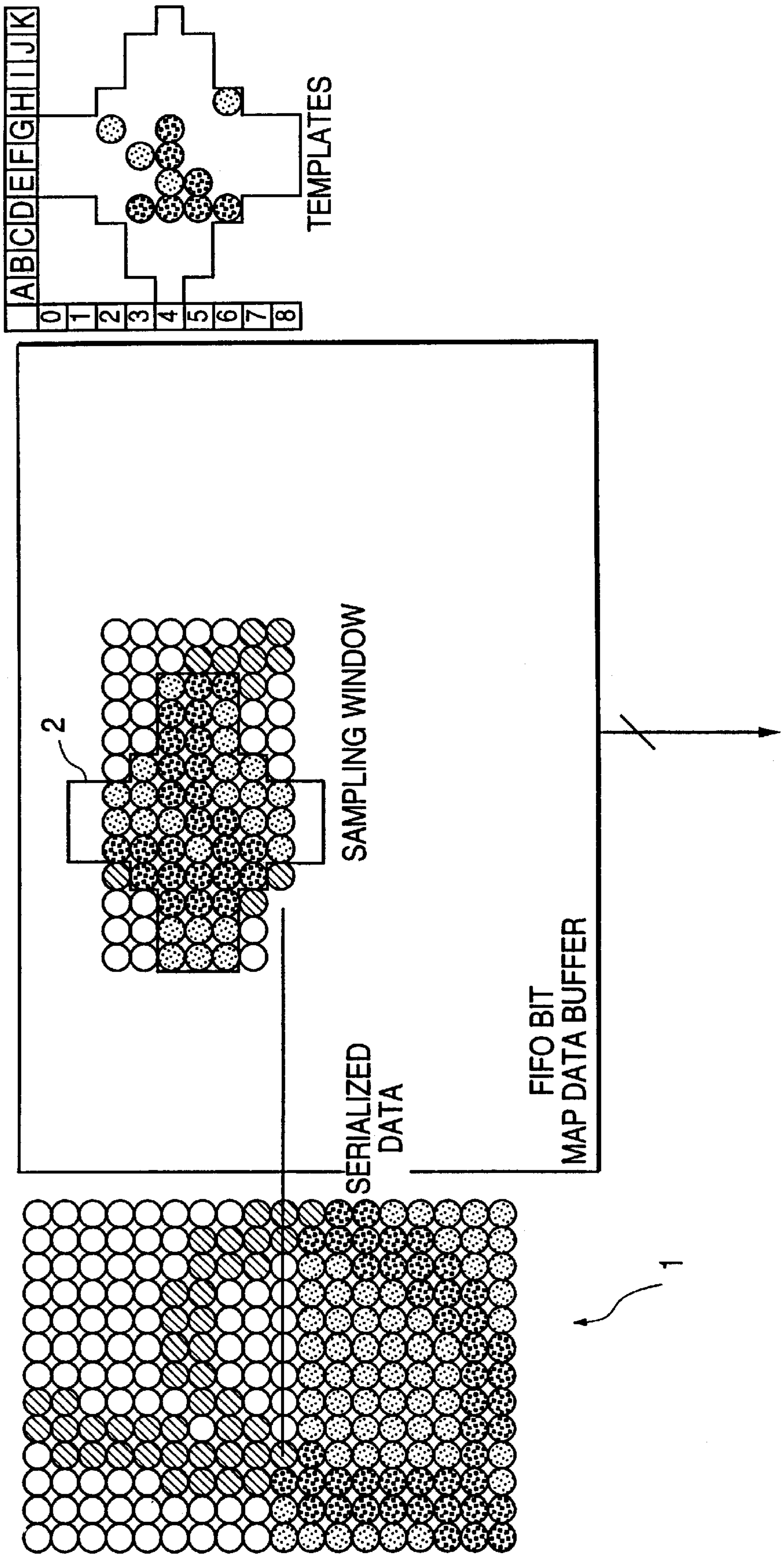
FIG. 1 shows the prior art technology of improving the quality of images represented by inputted image data.
Figure 2:
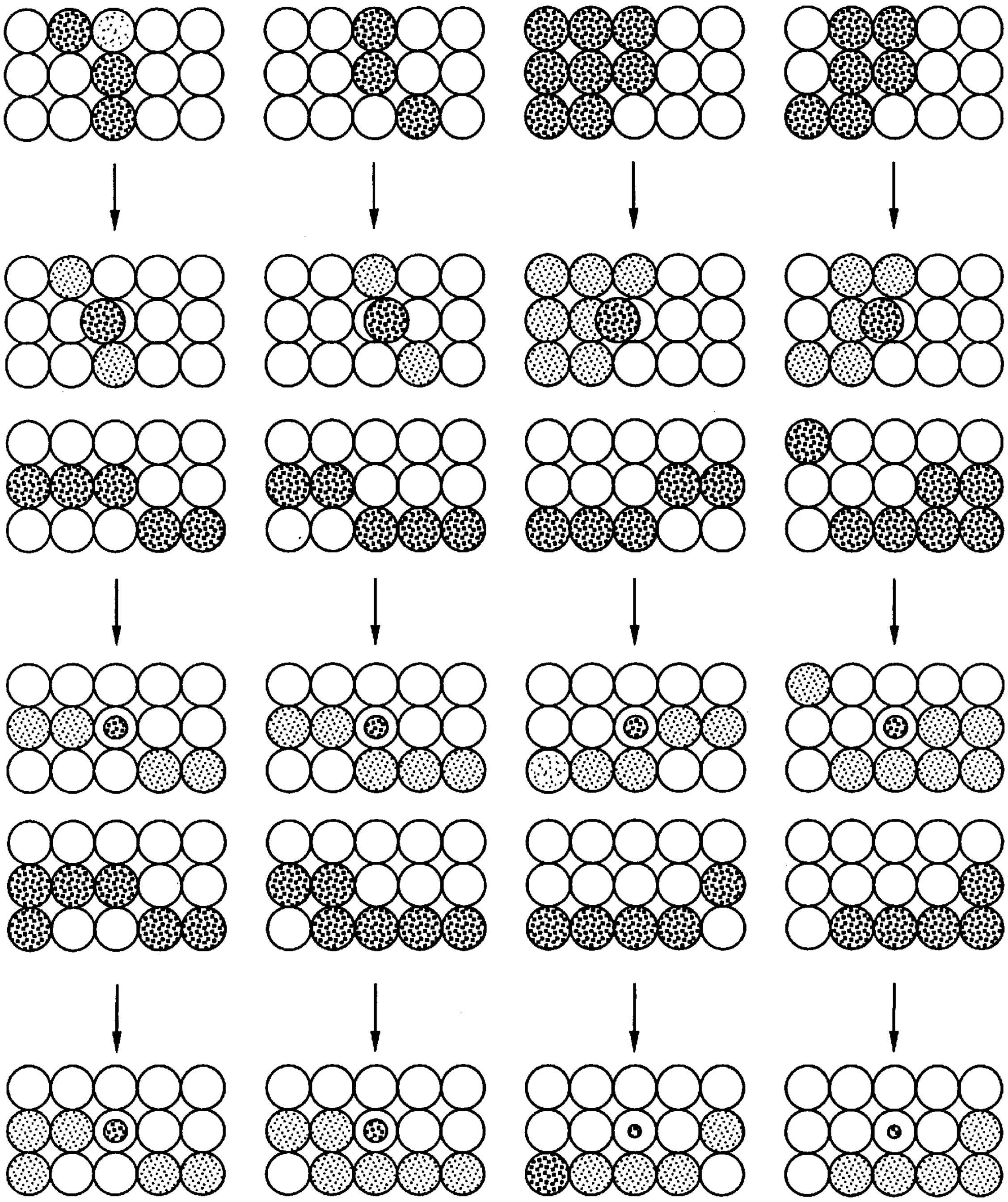
FIG. 2 shows an example of a correction pattern.
Figure 3:
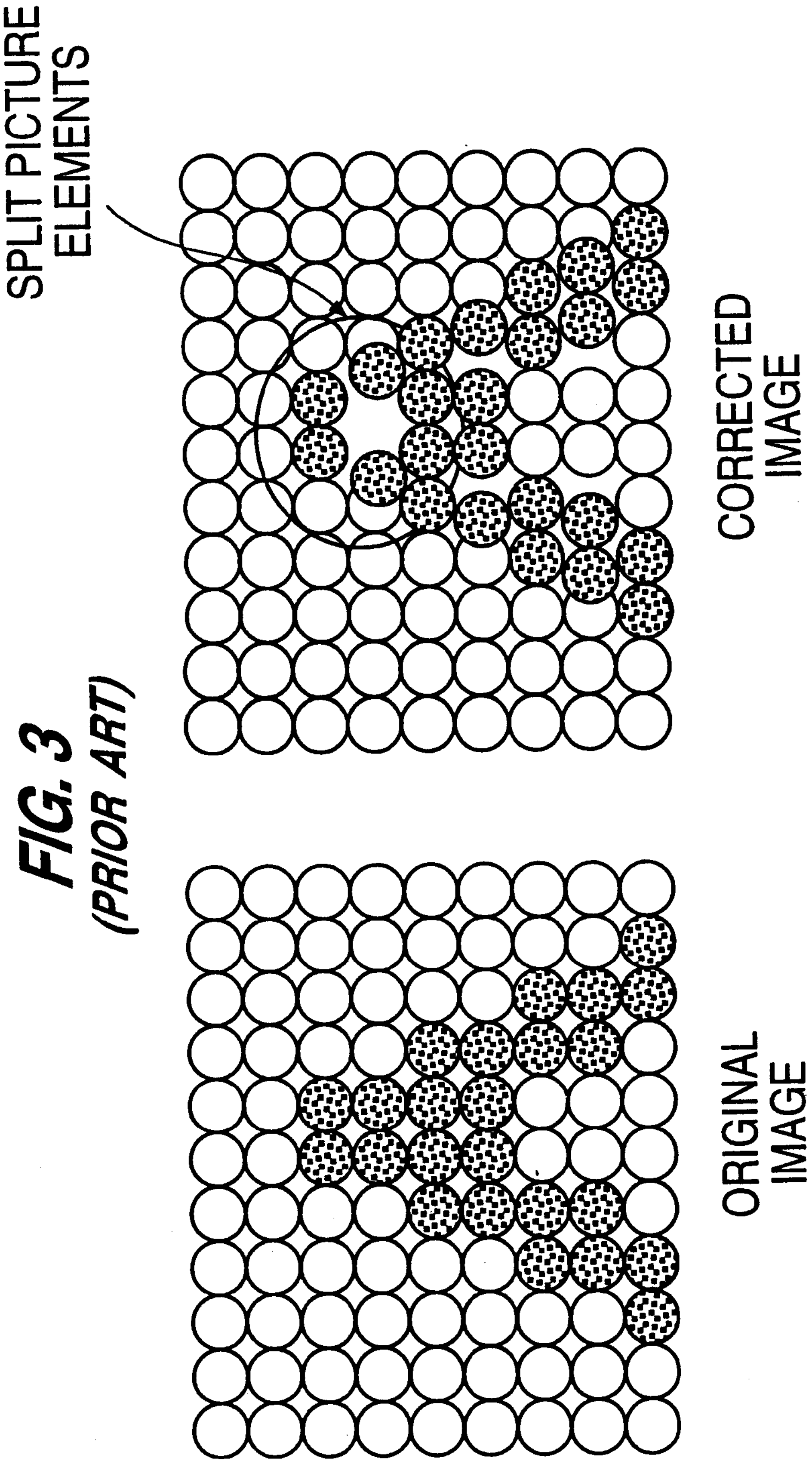
FIG. 3 shows the prior art technology of correcting images.
Figure 4:
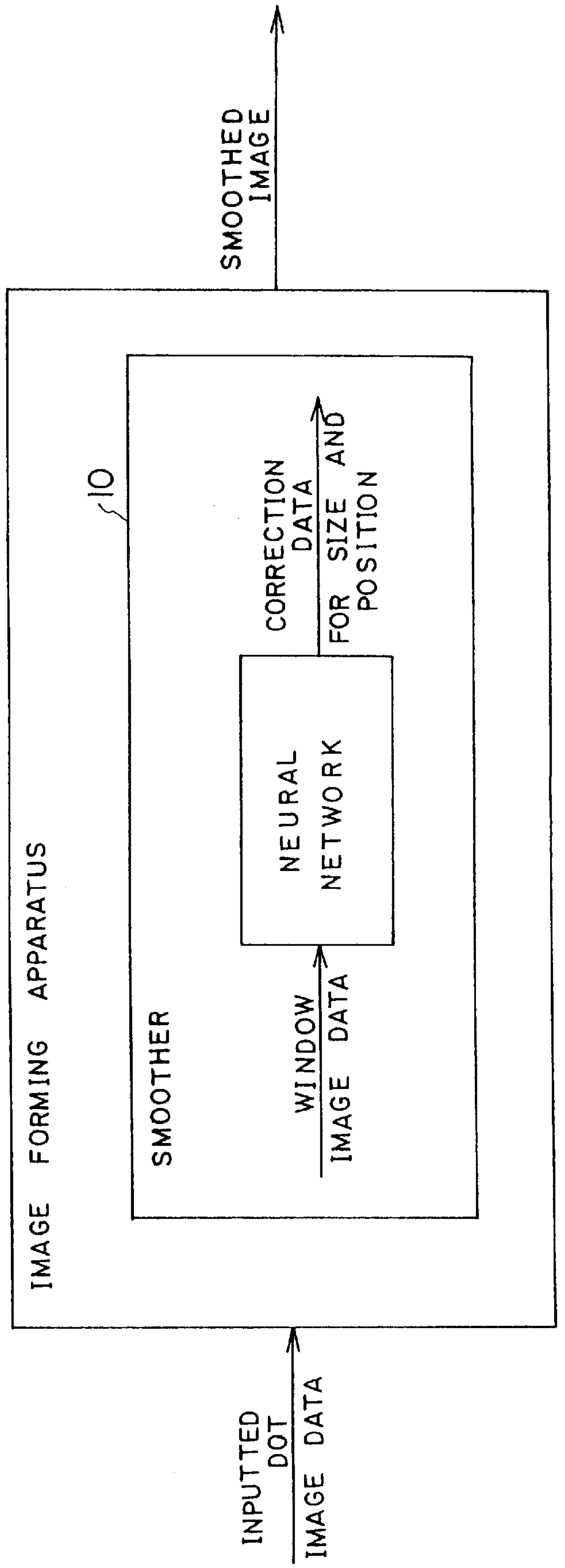
FIG. 4 is a block diagram for explaining the first principle of the present invention.

FIG. 4 is a block diagram for explaining the first principle of the present invention. It shows the principle of the image forming apparatus for reducing jags in images and smoothing density variations in gray-scale images to obtain a high quality of inputted dot images by controlling the correction of inputted dot image data according to the array of the data.

In FIG. 4, a neural network forming a smoother 10 outputs conversion data of the position and size of a central picture element (dot) in a window of a predetermined form, for example, a rectangular window comprising three lines each comprising 5 picture elements, according to picture element data inputted therein.

For example, the size of a dot as a picture element can be specified by 4 values including 100% at maximum, 60%, 30%, and 0% (no dot), or by 5 values including 100%, 75%, 50%, 25%, and 0%. The position of an image, that is, a dot, can be specified by 3 positions including the original position and its right and left adjacent positions.

In an output layer of neural network, a plurality of neurons (units) output size conversion data of picture elements, and another plurality of units output position conversion data of picture elements. The size and position data of picture elements are outputted separately from respective units. Thus, compared with the conventional method in which a unit in the output layer generates an output code containing size and position data together, the present invention reduces the number of units in the hidden layer, thus stepping up the process in the neural network.

Since the first principle is based on a neural network for instructing a correction of a dot according to the array of inputted dot image data, it does not require many template patterns, performs a process at a high speed, requires a small memory capacity, and gives the optimum correction instruction in response to an unlearned pattern.

Figure 5:
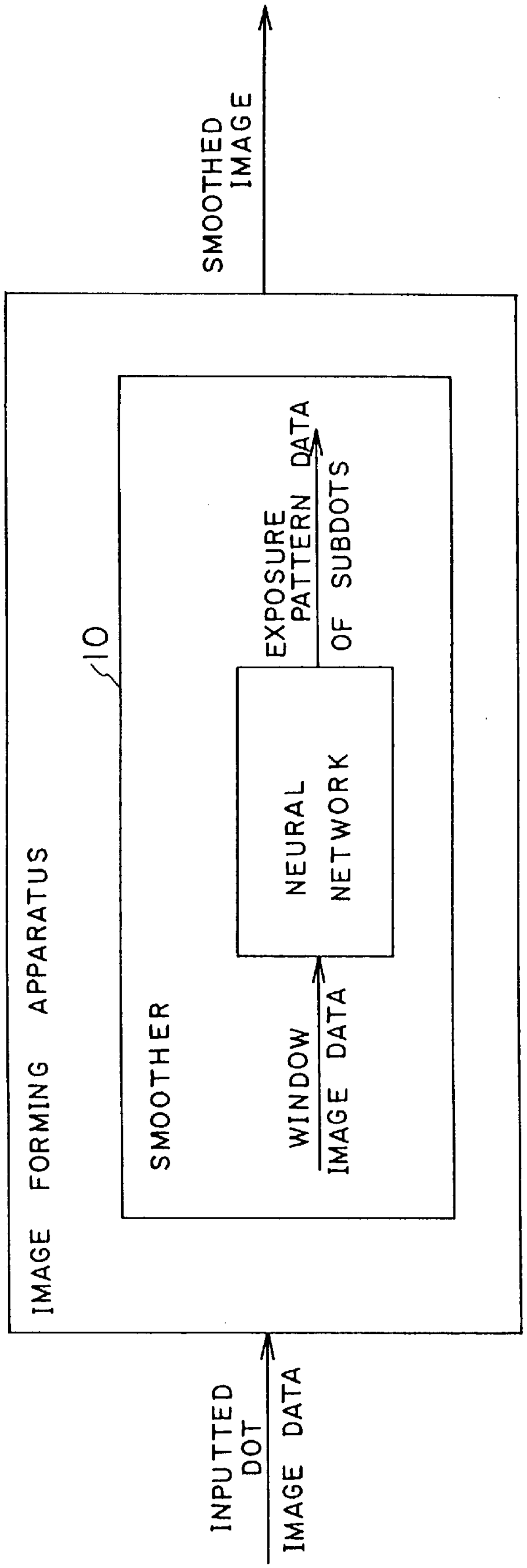
FIG. 5 is a block diagram for explaining the second principle of the present invention.

FIG. 5 is a block diagram for explaining the second principle of the present invention. The neural network forming a part of the smoother 10 outputs exposure pattern data using a plurality of subdots corresponding to the dots for representing inputted image data which are processed in a rectangular window units. A window comprises, for example, 7 lines each comprising 9 picture elements. The exposure pattern data are outputted to correct a central picture element in a window according to the array of picture element data in each window.

For example, if one picture element is represented by an 8-subdot exposure pattern, data conversion is performed for 2,400 dpi when the resolution in the horizontal scanning direction is set for 300 dpi. To further improve the quality of images, a pattern consists of 8-segment patterns to remove jags from picture elements and smooth density variations.

Figure 6:
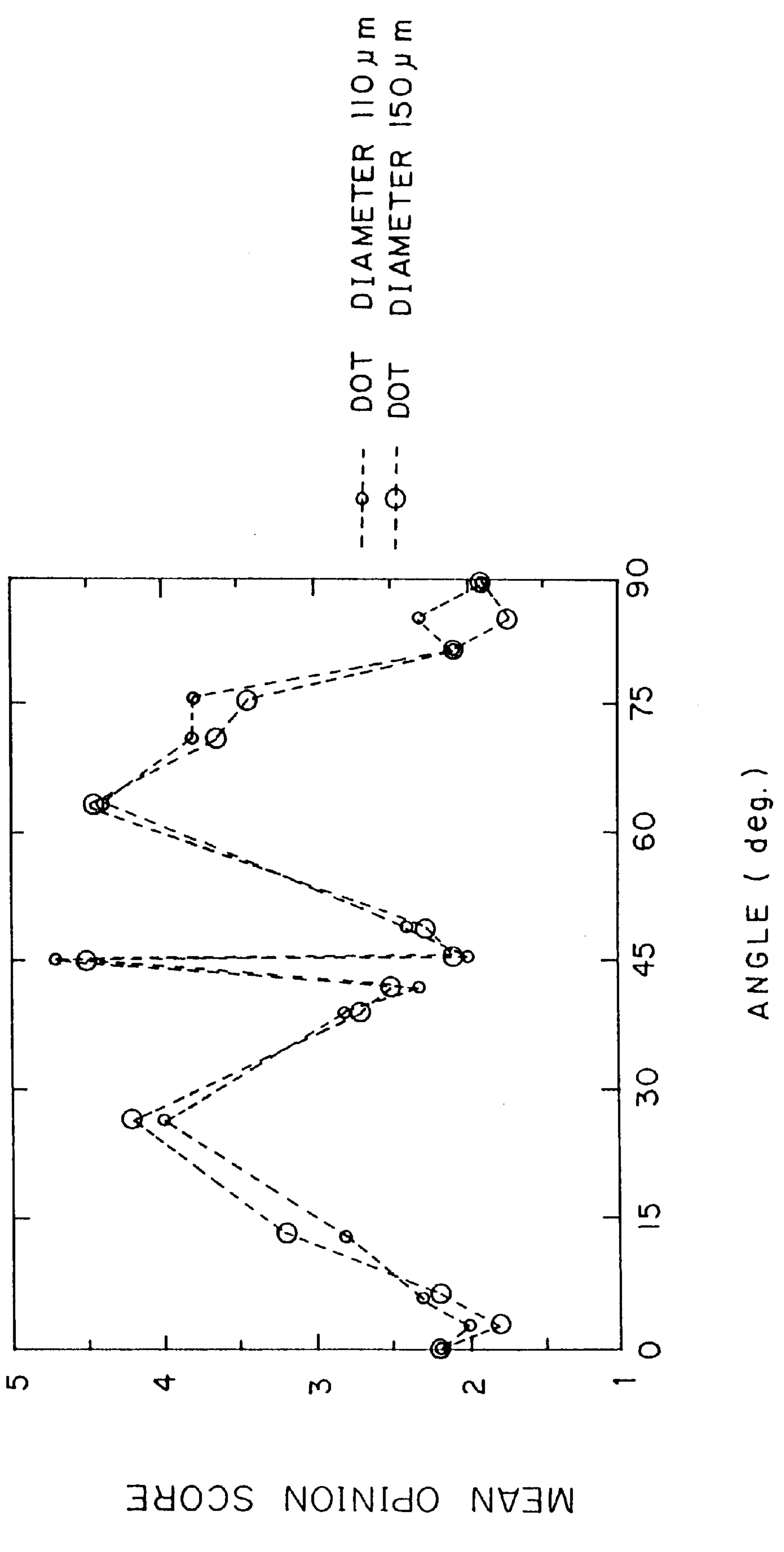
FIG. 6 shows the relationship between an angle and an jaggy effect.
Figure 7:
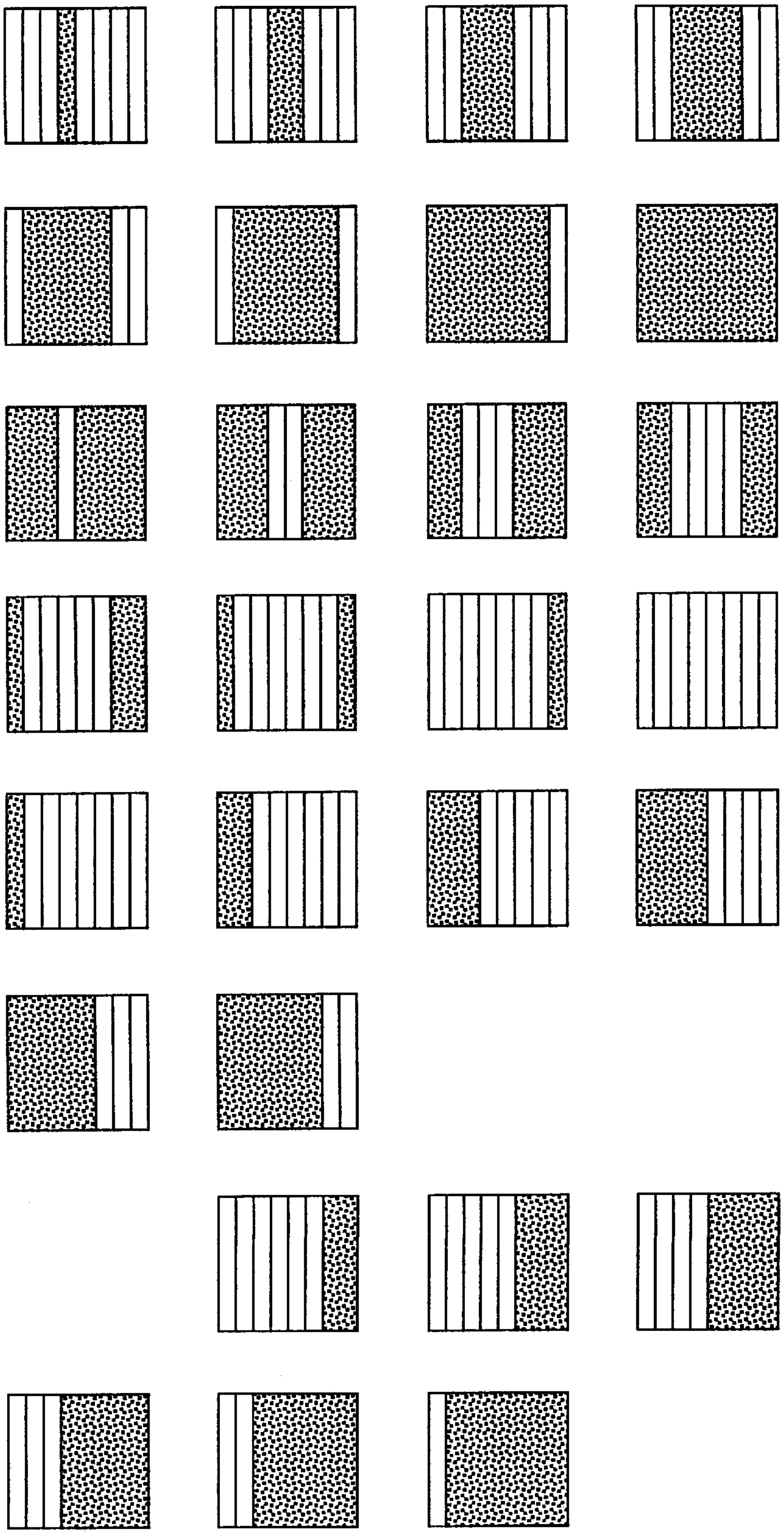
FIG. 7 shows a subdot pattern required for reducing jags in images.

A line is displayed in a jaggy form more than any other drawing elements. Besides, a line is displayed in different jaggy effects depending on its obliquity. FIG. 6 shows the relationship between an angle and a jaggy effect. The mean opinion score (described later) of,a vertical axis corresponds to the jaggy effect, i.e., a deteoration of an image caused by the jaggy. "Mark 5" indicates that jags are not recognized. Marks lower than 5 indicate a growing jaggy effect in the descending order. FIG. 6 indicates that a line offers the most outstanding jaggy effect at a little bit off 0°, 45°, and 90°. When a corrected pattern is made at these angles using 8 subdots, it can be displayed with little jaggy effects if it is formed using 28 patterns in combination. Actually, the 8 subdots can form 256 patterns, only 28 patterns (shown in FIG. 7) of which are enough to remove jags from images. That is, the size of a dot can be specified by the number of consecutive subdots (black). One inputted dot is not corrected by two or more consecutive subdots, and a dot image can be affected by the correction in its right and left dots. Therefore, a subdot pattern representing a dot has only 6 arrays: black, black-white, black-white-black, white-black-white, white-black, and white. All these patterns are shown in FIG. 7. The size and position of a dot can be controlled by combining some of these patterns. The black-white-black pattern shown in FIG. 7 in the third row is not a separated dot, but generated by the right-left, shift of adjacent subdots.

Figures 8, 9:
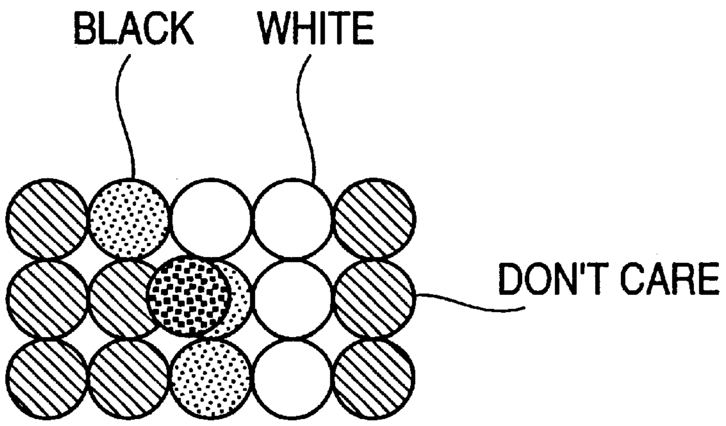
FIG. 8 is a view for explaining the evaluation levels for mean opinion values.
FIG. 9 shows an example of a pattern to be corrected according to the present invention.

The mean opinion score shown in FIG. 6 shows how to obtain an average value of marks of determination results according to the evaluation levels shown in FIG. 8 after showing ten observers variations of sample images in which a line is displayed at different obliquities.

Next, the second object of the present invention, to minimize the scale of a circuit by representing using a small number of bits the coefficient of an input connection to a neuron in the hidden layer. To achieve this, as indicated by the first and second principles shown in FIGS. 4 and 5, the smoother 10 is operated through a neural network comprising 3 layers: an input layer, an hidden layer, and an output layer, and outputting, after learning, one of three values +n, −n, and 0 (n indicates a constant), e.g. +1, −1, and 0 as a coefficient of an input connection to each neuron in the hidden layer. Then, it outputs correction data for a dot in inputted image data according to the array of inputted dot image data.

It is also possible to configure the smoother 10 operated through a neural network for outputting, after learning, two values (+1 and 0) as coefficients of an input connection to each neuron in the hidden layer, and to permit it to apply to the network both a normal signal and an inverted signal of picture element data.

A sample of a pattern to be corrected is referred to in order to describe how to achieve the second object of the present invention as follows.

In the present invention, the dot size and position of the central picture element in a window are corrected such that jags are removed from images and then outputted. Generally, all dots in a window are not involved in correcting a jaggy image, but they are limited to the central dot and some dots surrounding it. In FIG. 9, after the correction, the central dot is moved to left by ⅓ dot in the normal size. The necessary data are the second black dot and the third and fourth white dots in the first row, the third black dot and the fourth white dot in the second row, and the third black dot and the fourth white dot in the third row. The other dots can be black or white, that is, they are "don't care" dots.

A coefficient of an input connection to a neuron in the hidden layer is converged to one of three values +1, −1, or 0 when teaching is repeated by providing 0 or 1 as don't care data for the neural network in the smoother 10 shown in FIGS. 4 and 5, and proceeding the teaching with increased number of patterns. In the present invention, jags are removed from images through the neural network in which a coefficient of an input connection to a neuron in the hidden layer converges to 1, −1, or 0 after learning.

Figure 10:
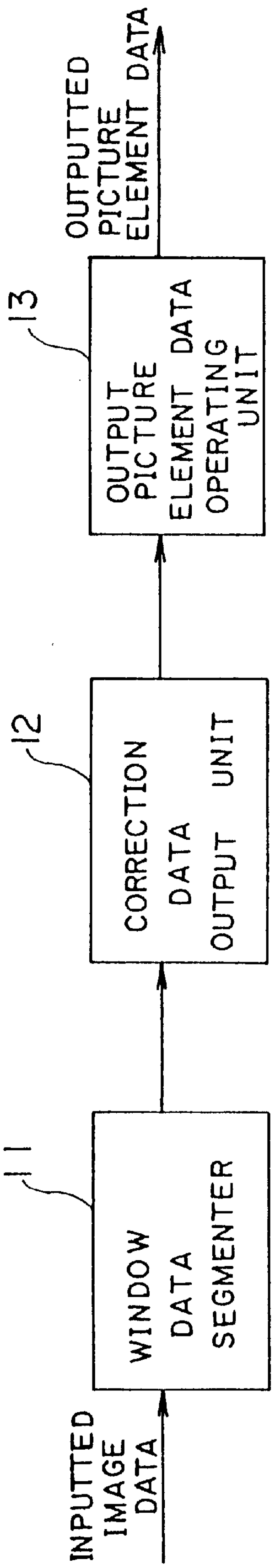
FIG. 10 is a block diagram for explaining the third principle of the present invention.

FIG. 10 is a block diagram for explaining the third principle of the present invention, which aims at simultaneously correcting the data of the central dot and its right and left adjacent dots.

In FIG. 10, a window data segmenter 11 comprises line buffers and shift registers, and segments data by one window comprising a plurality of lines each comprising a plurality of picture elements, for example, 9×7 picture elements.

A correction data output unit 12 divides each of the central picture element and its right and left adjacent picture elements into N divisions, e.g. 3 divisions according to the data of picture elements in the segmented window. All correction data comprising 9 pieces of data for picture elements comprising N divisions of 3 picture elements are outputted sequentially for the left, central, and right picture elements starting from the data for the left picture element. When the correction data for each 3-divided picture element is represented by 1 bit, a total correction data amounts to 9 bits. Therefore, if it is represented by 2 bits, a total data amounts to 18 bits.

An output picture element data operating unit 13 receives correction data for the central picture element outputted from the correction data output unit 12. The output picture element data operating unit 13 calculates output picture element data for the picture element two elements left to the central picture element in the window by using a process result obtained by itself at the time of the preceding input of correction data, that is, at the time of the input of correction data for the picture element to the left of the central picture element in a window, and correction data for the present central picture element. Namely, the output data for the picture element two elements left to the present central picture element can be outputted and printed based on the data.

In the third invention, a window comprising 7 lines each comprising 9 picture elements, that is, 9×7 picture elements, is segmented from 7-line data inputted from a bit map memory. Then, the picture element data in the window are compared with a predetermined template. If they match, correction data for 9 picture elements for three 3-divided picture elements, that is, the central and its right and left adjacent picture elements are outputted. For example, if picture element data are represented by 4 levels, each piece of correction data are represented by 2 bits, and a total of correction data for 9 picture elements are represented by 18 bits. The 6 central bits out of them corresponds to the central picture element in the window, the higher order 6 bits to the left picture element, and the lower order 6 bits to the right picture element.

The 18-bit correction data are inputted as correction data for the central picture element in a window to a register, for example, for forming the output picture element data operating unit 13.

A process result at the time of the input preceding the input of the correction data corresponding the present central point, that is, at the time of input of the correction data for the picture element left to the central picture element are stored in a shift register, for example, as a component of the output picture element data operating unit 13. The content of the shift register is shifted to left by 6 bits for the divided 3 picture elements at the time of input of correction data for the present central picture element. As a result, the 6 bit data overflowing from the shift register are transmitted to an optical modulation circuit as output picture element data because the shift register and the above described register have the same capacity.

The shift result in the shift register and the bit position corresponding to the correction data for the central picture elements stored in the above described register are ANDed, and stored again in the shift register as the present process result of the output picture element data operating unit 13. Then, the result is used in the process at the time of the next data input, that is, at the time of input of the correction data for the dot right to the central dot.

In the block diagram shown in FIG. 10 for explaining the principle of the third principle of the present invention, a neural network in the smoother 10 can replace the correction data operating unit 13. The neural network receives dot image data segmented by a window and outputs, for example, a total of 9 pieces of correction data, that is, 3 pieces each for the left, central, and right dots in this order as the correction data for the central dot in the window.

As described above, in the third principle, data are corrected simultaneously for the central dot and its left and right dots.

Figure 11:
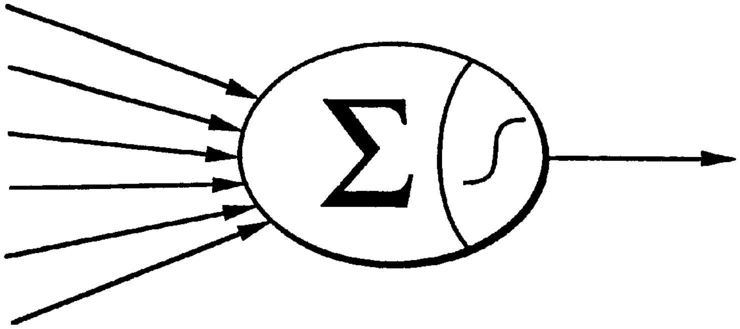
FIG. 11 is a view for explaining the operation of a neuron.

FIG. 11 shows the operation of a neuron forming the neural network. A neuron is also referred to as a unit. It multiplies a plurality of inputs by respective coefficients, adds the products together, converts the sum using an appropriate function, and then outputs the result. The output $y^n$ of the n-th neuron is obtained by the following expression.

$$y^n=f(k_0^n+k_1^n x_1^n+\ldots+k_m^n x_m^n) \tag{1}$$

where $x_i^n$ indicates the i-th input to the n-th neuron; $k_i^n$ indicates a coefficient of the input; and $k_o^n$ indicates a constant term.

Figure 12:
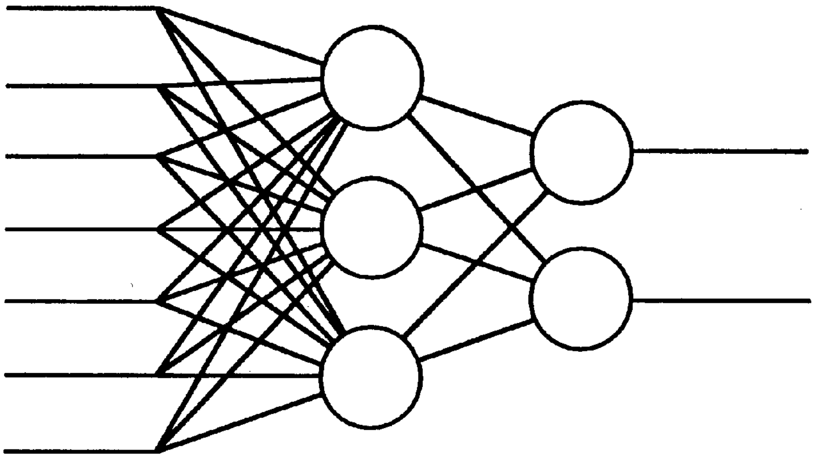
FIG. 12 shows a model of a neural network.

FIG. 12 shows a model of the neural network. A circle indicates a neuron. Input layer units (for receiving an input to the network) are omitted in this figure because they only transmit an input to the units in the hidden layer. There are 3 units in the hidden layer, and 2 neuron units in the output layer.

Figure 13:
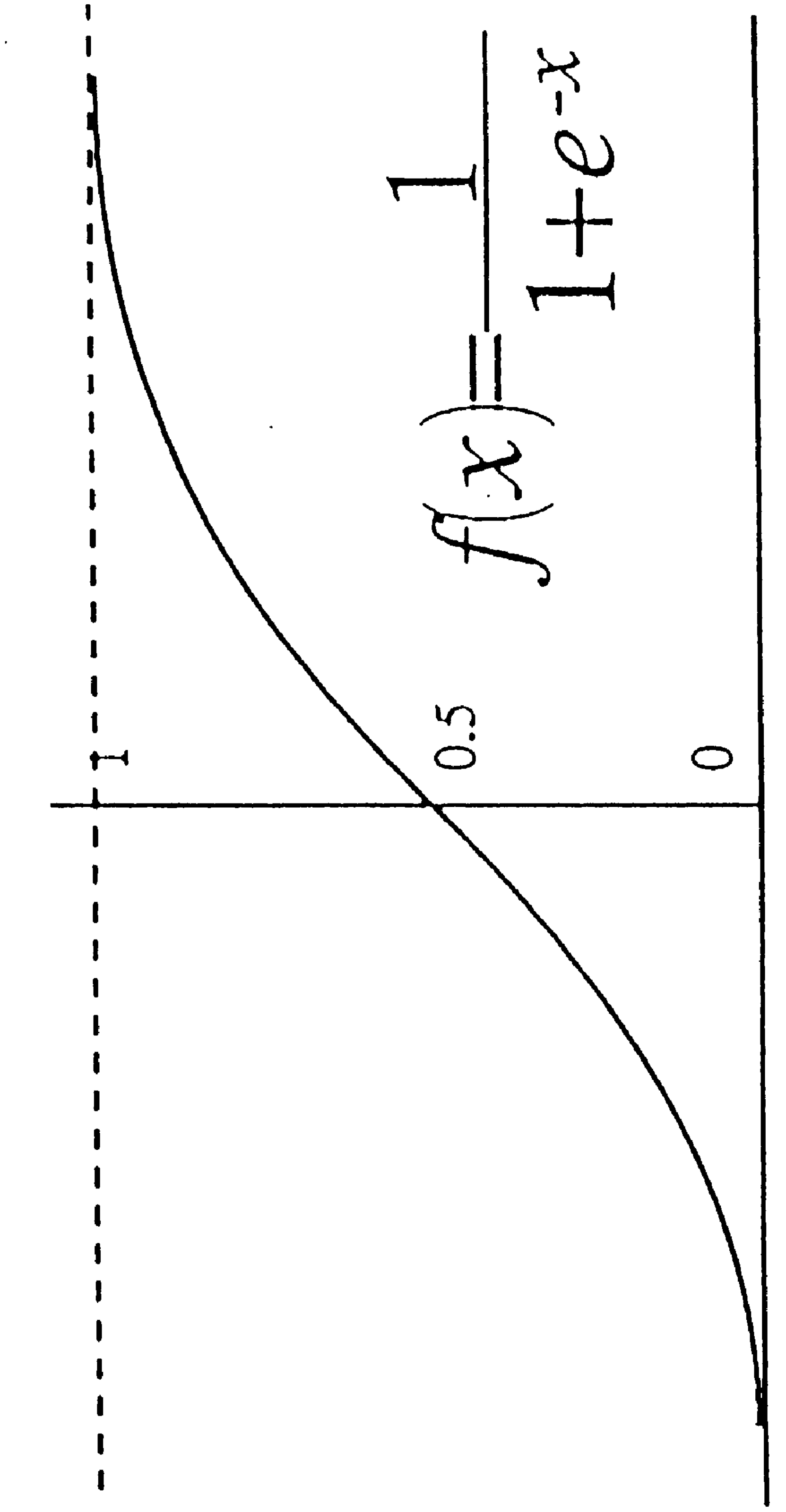
FIG. 13 shows a Sigmoid function.
Figure 14:
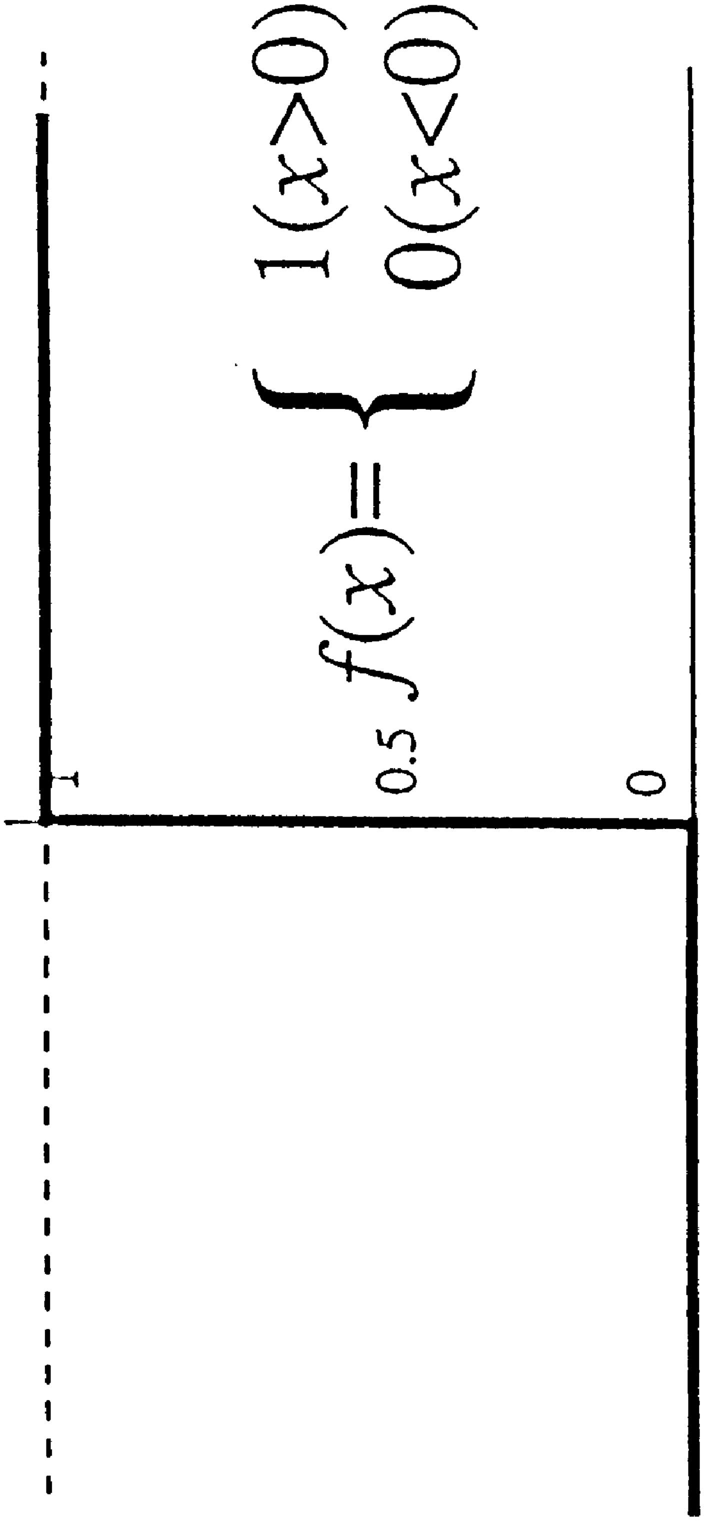
FIG. 14 shows a step function.

In FIG. 11, Sigmoid function and step function are used in converting a result of an addition. FIG. 13 shows a Sigmoid function; and FIG. 14 shows a step function. However, conversion function are not limited to these functions.

Generally, the larger number of picture elements inputted ,to a neural network, the better image correction and the larger number of correction patterns. For example, if the number of inputted picture elements is 5×5, the combination using all the picture elements is diversified to $2^{5\times5}$, that is, 33554432 variations. If it is 7×9, the combination comes in $2^{7\times9}$, that is, $9.22\times10^{18}$ variations. Thus, it is impossible to teach all image patterns to the neural network. Therefore, among all patterns, some patterns should be selected as those to be corrected and others as those not to be corrected before teaching the network. Picture elements are corrected by the network using a coefficient obtained through the teaching. If the network is going to perform an undesirable conversion, it must learn again.

In this way, picture elements can be corrected without operating for all patterns, and can also appropriately convert picture elements for an unlearned pattern to the network.

Figure 15:
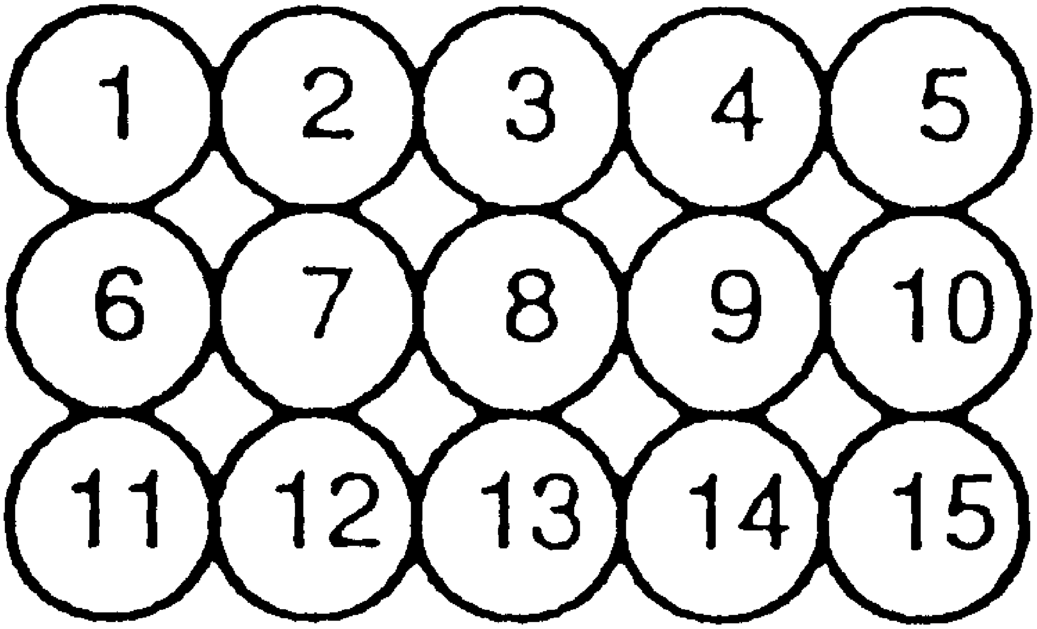
FIG. 15 shows an embodiment of assigning a picture element to the input layer unit (1)
Figure 16:
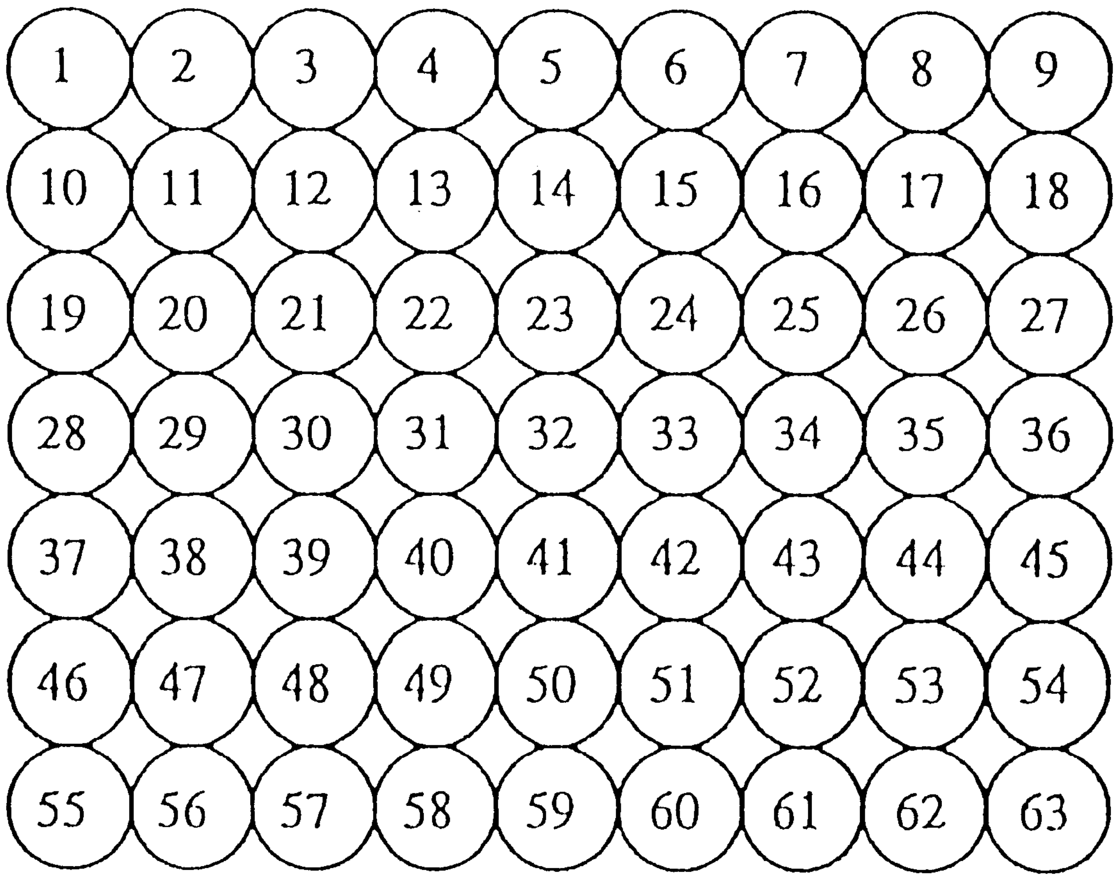
FIG. 16 shows an embodiment of assigning a picture element to the input layer unit (2)

FIGS. 15 and 16 show examples of assigning picture elements to each unit in the input layer of the neural network. In FIG. 15, the picture elements in 3 lines each comprising 5 picture elements are outputted in a window. In FIG. 16, the picture elements in 7 lines each comprising 9 picture elements are outputted in a window. A window is formed of a predetermined figure. In each of 15 units (63 units in FIG. 16) in the input layer, picture element data are set to 1 if the picture element is assigned as "black", and set to 0 if it is assigned as "white". "1" and "0"can be set inversely.

Figure 17:
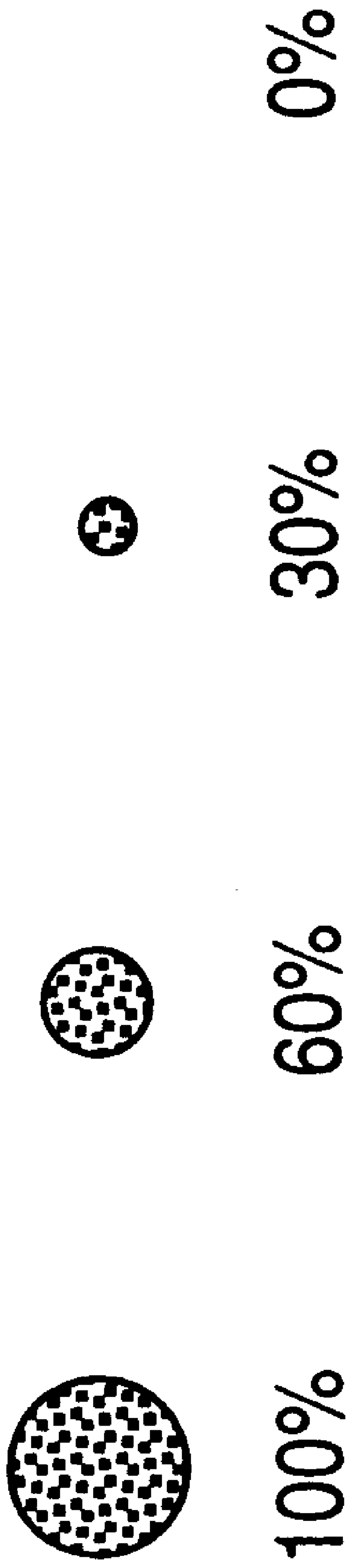
FIG. 17 shows an embodiment of the size of a picture element.

FIG. 17 shows an example of the size of a picture element after the conversion. The size can be specified by 4 levels as 100% (the maximum dot diameter), 60%, 30%, and 0% (no dot).

Figure 18:
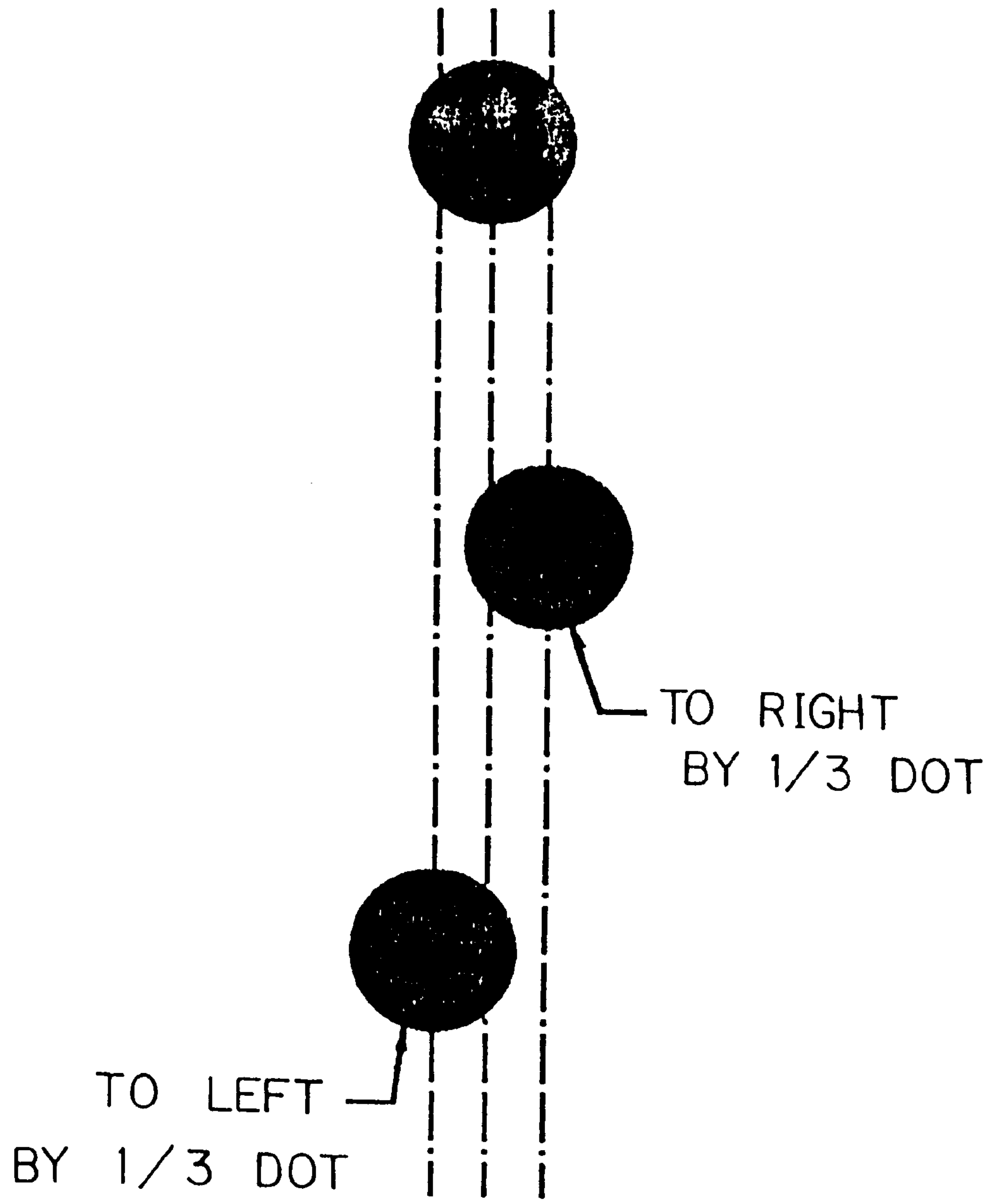
FIG. 18 shows an embodiment of the position of a picture element as conversion data.

FIG. 18 shows an example of the position of picture element, that is, a dot, specified by conversion data. The dot position can be specified for the central position, that is, its original input position, the position ⅓ dot to the left of the original input position, and the position ⅓ dot to the right of the original input position. A dot is represented by 900 dpi if the original resolution is 300 dpi.

Figure 19:
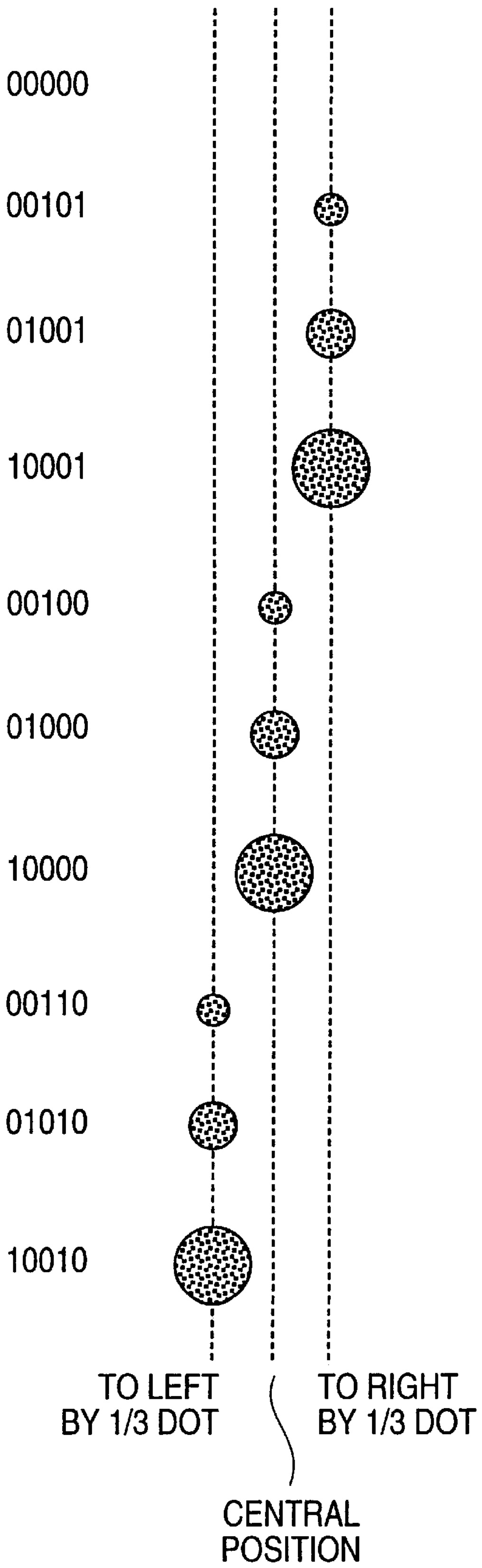
FIG. 19 shows an embodiment of the correspondence between an output value from the output layer unit and the position and size of a picture element.

FIG. 19 shows an example of the correspondence between an output value from the output layer of the network and the corresponding position and size of a picture element. In 5-bit data indicating an output value from 5 output units in the neural network, the higher 3 bits indicate the size of a dot (000 for 0%, 001 for 30%, 010 for 60%, and 100 for 100% by referring to FIG. 17). The lower 2 bits indicate the position of a dot (00 for the central position, 01 the position ⅓ dot to the right of the central position, and 10 for the position ⅓ dot to the left of the central position).

Thus, in the present invention, 3 units in the 5 units in the output layer specify the size of a dot, and 2 unit specify its position. Therefore, the output code is represented by 5 bits. The size and position of a dot can be specified by 10 values. Although each value can be represented by 4 bits, this causes the problems that the size and position of a dot cannot be independently assigned to outputs of the units in the output layer, the number of the units in the hidden layer must be increased to 30 units, and the neural network is operated at a lower speed.

Figure 20:
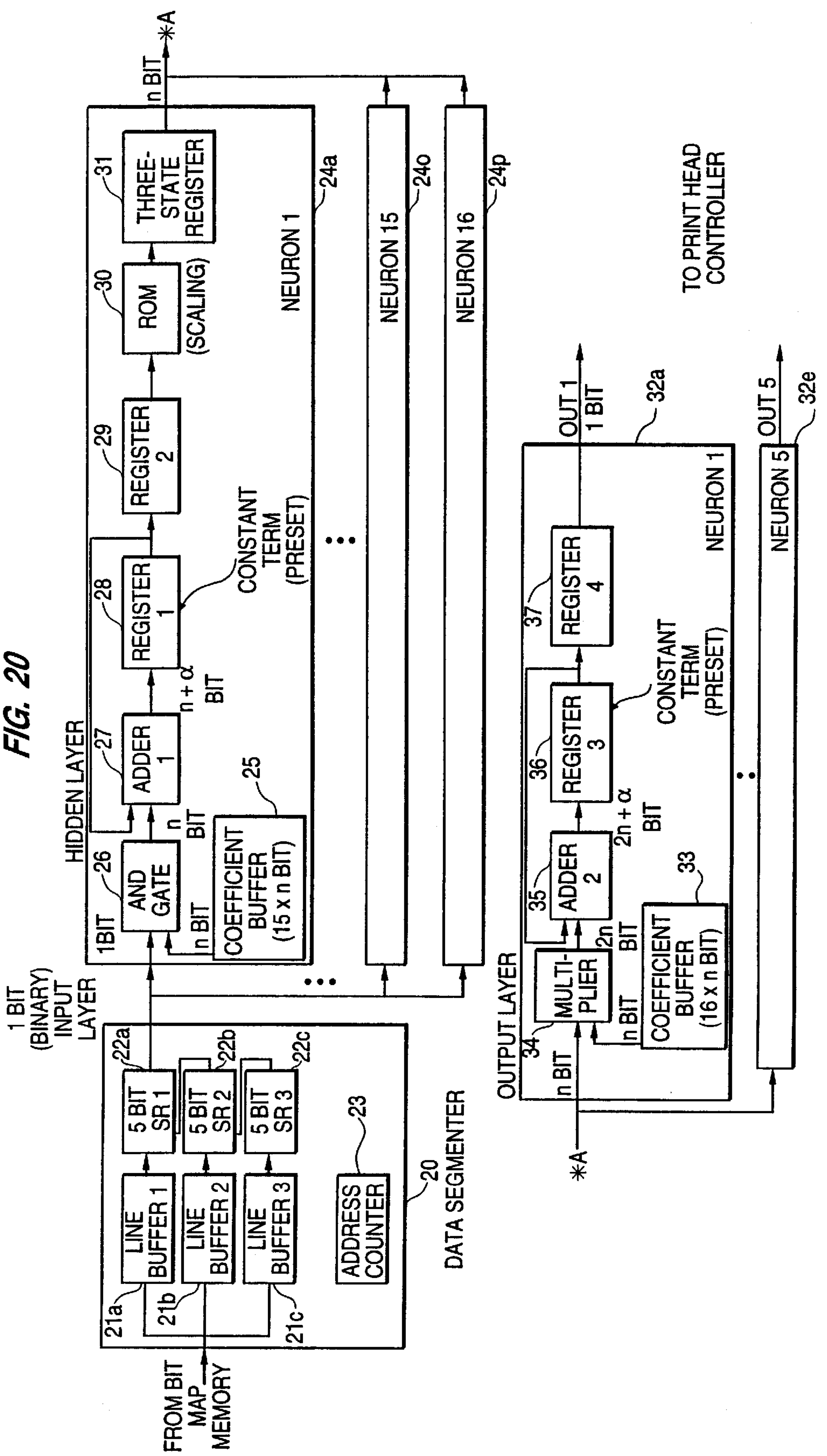
FIG. 20 is a block diagram for explaining the system configuration of the first embodiment of the image forming apparatus according to the first principle.

FIG. 20 shows the configuration of the system of the embodiment 1 of the image forming apparatus according to the first principle of the present invention. Neurons forming the neural network are configured by hardware.

Figure 21:
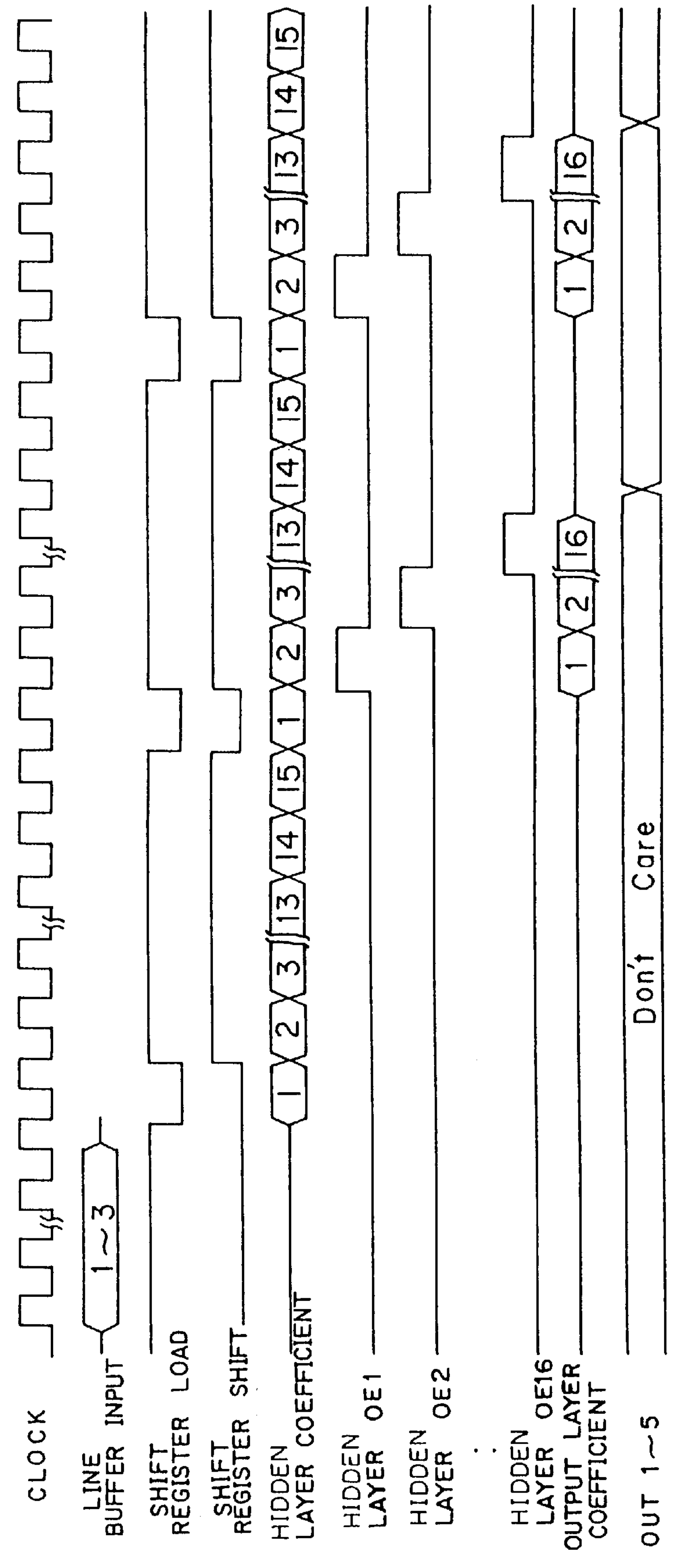
FIG. 21 is a timing chart of the operation of the system shown in FIG. 20.

FIG. 21 is a timing chart for explaining the operation of the system shown in FIG. 20. The process of inputted dot image data in 3×5 window units is described below by referring to FIGS. 20 and 21.

In FIG. 20, input data from a bit map memory are provided for a data segmenter 20. One-line data in the bit map memory are given to either of the three line buffers 21*a*–21*c*. If the present process line is given to line buffer 21*b*, the data in the lines above and below the present line are given to line buffers 21*a* and 21*c* respectively when the picture elements in the present line are processed. Thus, the picture elements in the necessary 3 lines are successfully given to line buffers 21*a*–21*c*.

The data stored in line buffers 21*a*–21*c* are loaded in 5-bit units to shift registers (SR) 22*a*–22*c* respectively. These 3 shift registers are serially connected, and the loaded data are serially processed bit by bit by the data segmenter 20. Thus, a piece of dot matrix data in a 3×5 window are outputted by the data segmenter 20 to the input layer (not shown in FIG. 20) of the neural network. The outputs from these shift registers can be processed sequentially.

Dot image data outputted from the data segmenter 20 are simultaneously provided bit by bit for 16 neurons 24*a*–24*p* forming the hidden layer of the neural network. The neurons 24*a*–24*p* in the hidden layer have the same configuration except that each neuron is assigned a different coefficient value, and are operated concurrently.

A coefficient assigned to each neuron forming the intermediate and output layers of the neural network is determined according to the result of predetermined learning. The value of a coefficient is set in coefficient buffers 25 and 33 in the intermediate and output layers before a series of jag reducing processes performed by the neural network. The constant term in expression (1) is also preset in these registers at the initialization of resisters 28 and 36.

Next, the hidden layer is explained below. Arithmetic operations performed by the hidden layer are similar to expression (1). However, since it is given an input "0" or "1", a sum of products can be obtained without performing multiplications by only incrementing the coefficient if "1" and not incrementing it if "0". That is, an inputted value determines whether or not the value stored in the coefficient buffer 25 is added. Therefore, an AND gate 26 is used as a circuit for obtaining a sum-of-products. Dot data in shift registers 22*a*–22*c* are inputted bit by bit to one of the input terminals of the AND gate. Each bit of the coefficient assigned corresponding to each dot position in a 3×5 window is inputted to the other input terminal of the AND gate 26 in synchronous with each bit outputted from shift registers 22*a*–22*c*. The AND gate 26 outputs "0" or a coefficient according to a value in each bit outputted by shift registers 22*a*–22*c*. The content of the coefficient buffer 25 is explained later. An adder 27 and a register 28 in the next step are used in adding an output from the AND gate 26. After multiplying 15 pieces of dot data by a coefficient and obtaining the sum of those multiplications, the addition result is loaded to a register 29. The content of the register 29 is set in a three-state register 31 after the conversion by a sigmoid function stored in ROM 30 in the next step.

A value set in the three-state register 31 in each neuron is scanned by sequentially setting an output ennoble (OE) as shown in FIG. 21, and sequentially inputted to the output layer. Each neuron in the output layer multiplies an output from the hidden layer by a coefficient set in each neuron in the output layer, and sets the result in the register 36 through the adder 35. A value in the register 36 is provided for the register 37 after obtaining the sum of products obtained by multiplying each output in the hidden layer by a coefficient. Since the output from the output layer as well as the input to the hidden layer is represented in binary, that is, by "1" or "0", the output from the output layer having a positive value is "1", and the output having a negative value is "0" if the slice level of the output from the output layer is set to "0". Therefore, the highest order bit (sign bit) can be outputted from the register 37 although the value set in the register 37 should be processed with a Sigmoid function. An output obtained by combining 5 output values finally corresponds to one of ten 5-bit strings shown in FIG. 19 according to the dot image data array inputted to the neural network. Accordingly, a controller of a printer drives an exposure element in an optical unit through an image quality correcting circuit such that a dot can be formed at the position of the central picture element in the window according to the combination of above described 5 output values. This process is performed on each picture element in the present process line. On finishing the process for one line, the data of the next line and the adjacent lines are provided for line buffers 21*a*–21*c* to continue the similar process. Thus, picture elements of 1-page dot data stored in the bit map memory and outputted on the printer can be corrected by sequentially repeating the above described operation.

Figure 22:
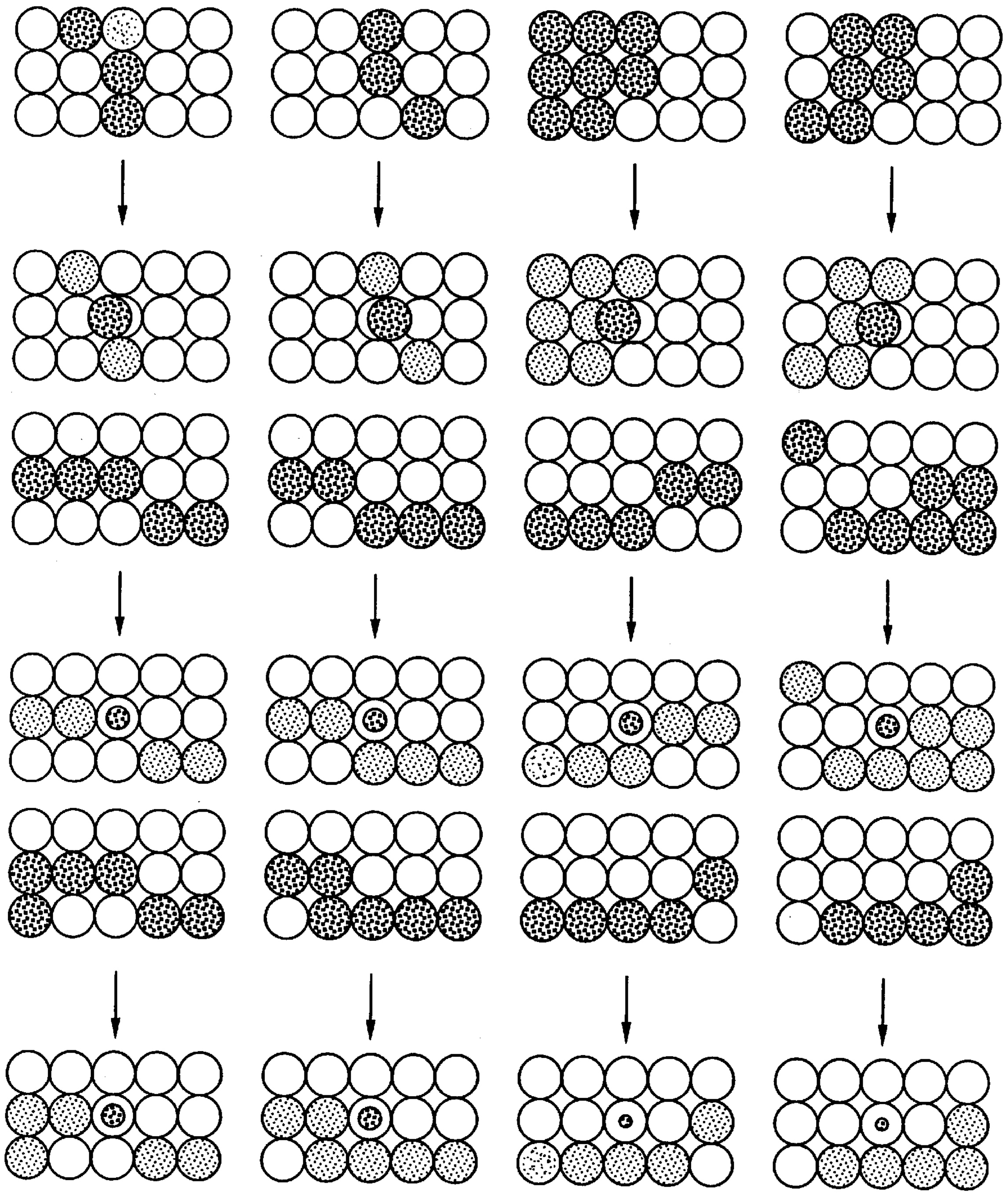
FIG. 22 shows an embodiment of a correction pattern (teaching pattern) 1.

In FIG. 20, the contents of the coefficient buffer 25 in an hidden layer neuron and of a coefficient buffer 33 in an output layer neuron are determined by a simulation, that is, a learning by the back propagation method. FIG. 22 shows an example of a correction pattern for a 3×5 dot window, that is, teaching data. In FIG. 22, an arrangement above an arrow indicates inputted data, and that below an arrow indicates a correction pattern, that is, a teaching pattern for the inputted pattern. In FIG. 22, the upper teaching patterns are for a vertical oblique line. For example, the leftmost teaching pattern indicates that the dot for the central picture element should be moved to left by ⅓ dot. In this teaching pattern, a pale black circle indicates a picture element which is not to be corrected in this process.

The middle teaching patterns in FIG. 22 indicate a process of reducing jags in a horizontal oblique line. The size of a corrected dot is 60% of the original size shown in FIG. 17. The two teaching patterns at the lower right corner indicate that a corrected dot is 30% of the original size shown in FIG. 17 in reducing the jags in a horizontal oblique line. After this correction, the jags in the horizontal oblique line can be successfully reduced by forming a 60%-size dot for the circle right to the central circle as shown in the middle teaching patterns.

Figure 23:
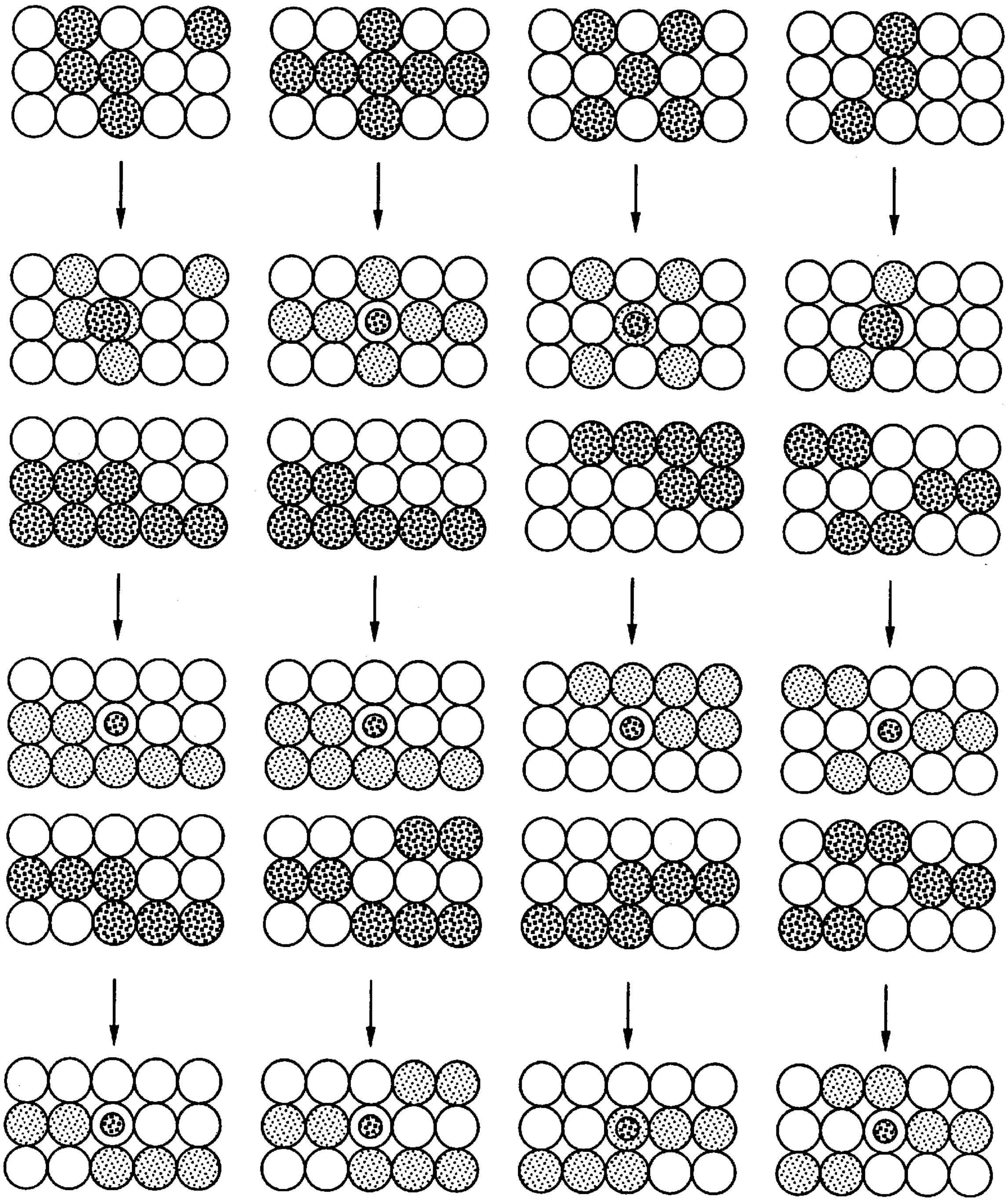
FIG. 23 shows an embodiment of a correction pattern (teaching pattern) 2.

FIG. 23 as well as FIG. 22 shows correction patterns, that is, teaching patterns, for reducing jags in images. In FIG. 23, the second teaching pattern in the upper group, for example, indicates a 60%-diameter dot at the intersection of the vertical and horizontal black lines in order to prevent an excessive toner thereon.

Figure 24:
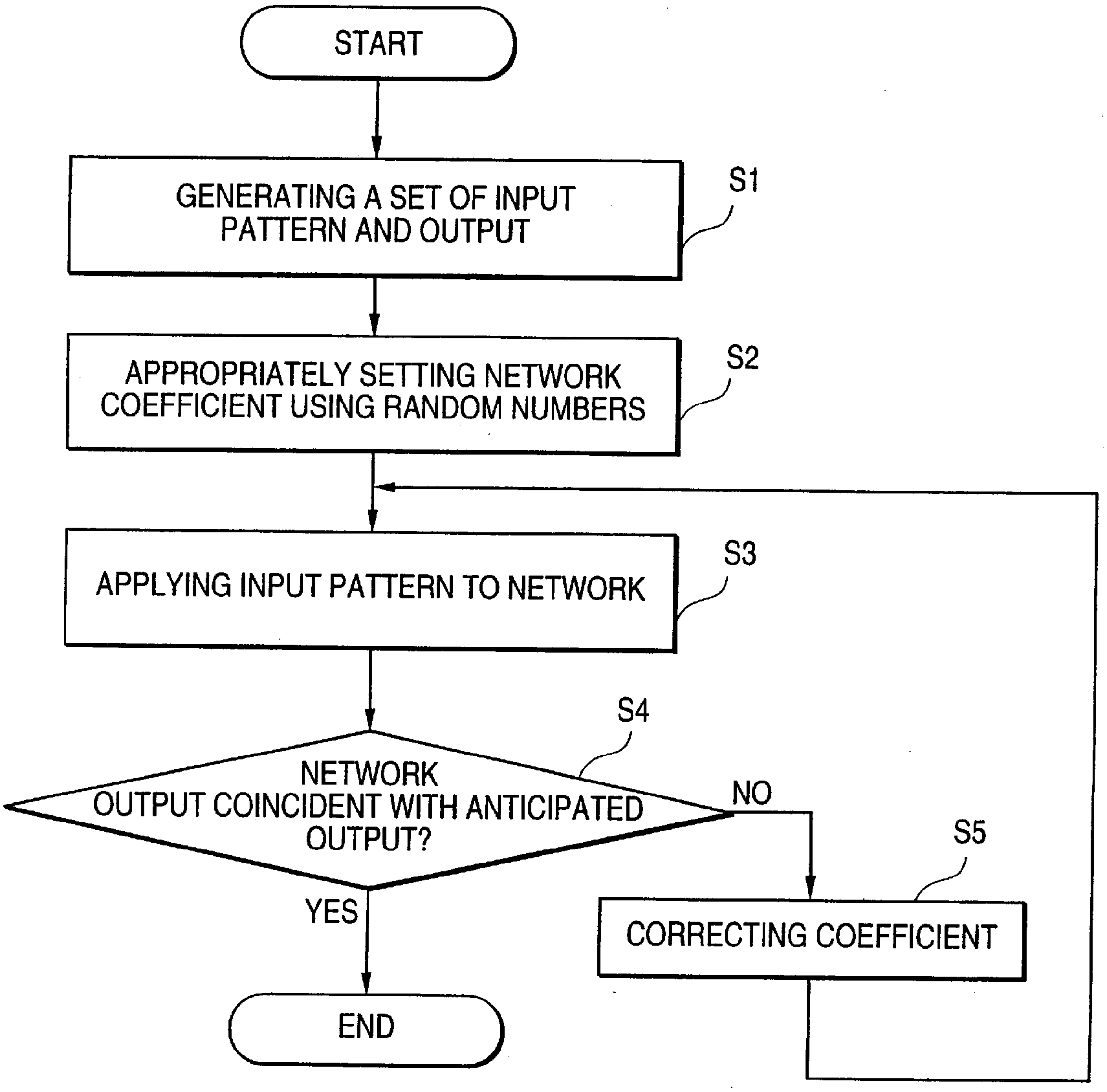
FIG. 24 is a flowchart of the embodiment of a learning process.

FIG. 24 is a flowchart for explaining an embodiment of learning by the back propagation method. In step S1, a combination of an inputted pattern and its teaching pattern is determined. In step S2, a coefficient of a neural network, that is, an initial coefficient is appropriately determined using a random number.

Next, in step S3, an inputted pattern is applied to the neural network. In step S4, determination is made as to whether or not the output of the network coincides with an anticipated output, that is, its teaching pattern. If not, the predetermined coefficient is corrected according to a predetermined expression in step S5, and the processes from the process in step S3 are repeated until a coincident result is detected in step S4.

This learning process is performed to obtain a coefficient which is used in the actual operation shown in FIG. 20, for example.

Figure 25:
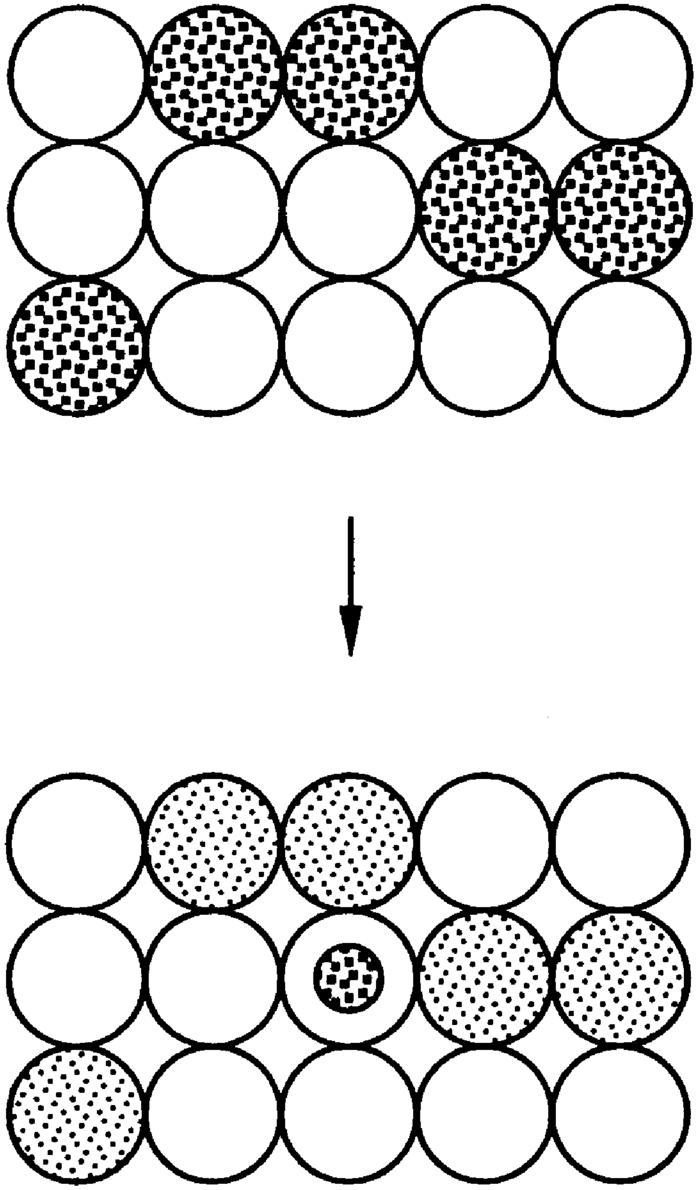
FIG. 25 shows an example of an erroneous correction during a learning process.

FIG. 25 shows an example of an erroneous correction during learning. The central picture element in the window being processed should have been assigned a 60%-size dot.

Figure 26:
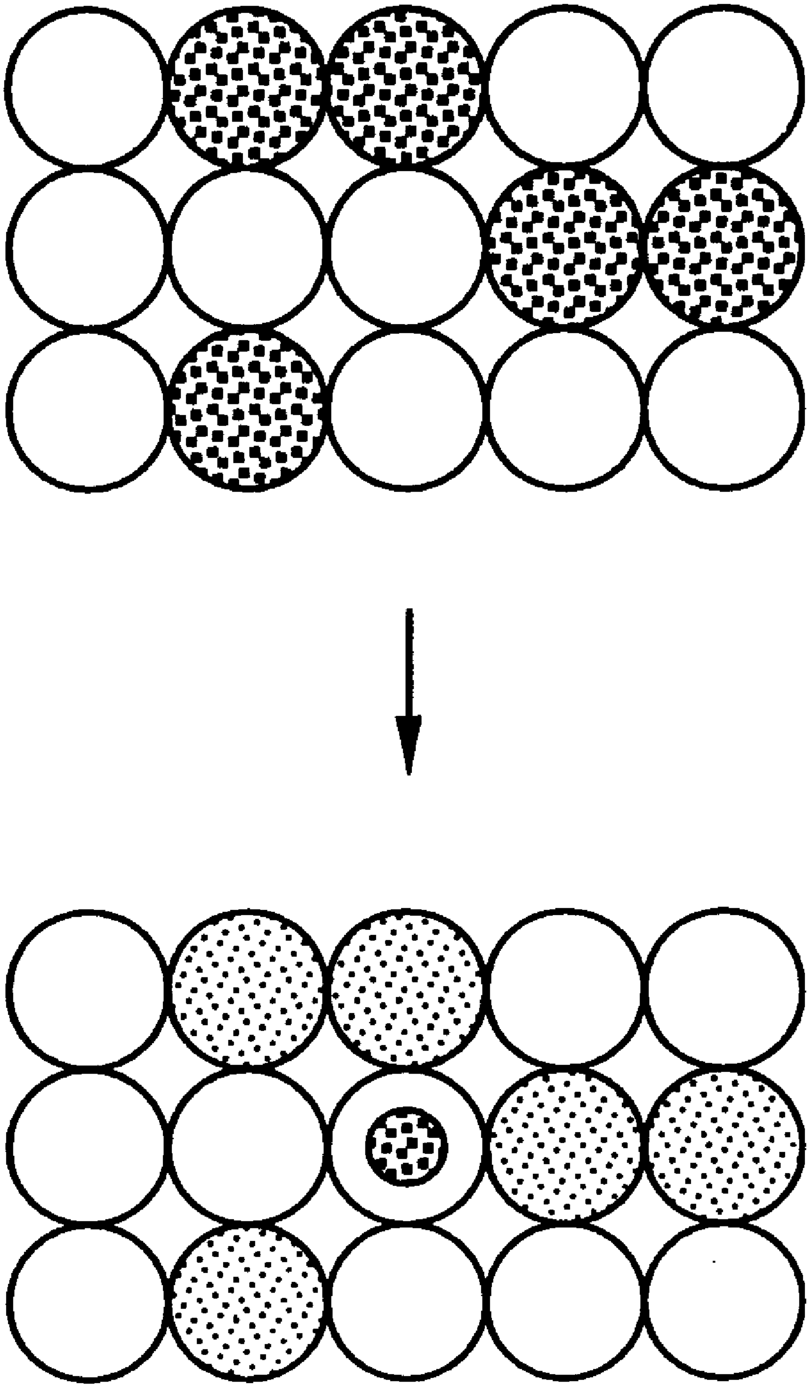
FIG. 26 shows an example of correcting an unlearned pattern.

FIG. 26 shows an example of a correction to an inputted pattern not exactly corresponding to its learning pattern. After learning, the inputted pattern shown in FIG. 25 is given a 60%-size dot formed at the center of the window as shown in FIG. 25. The same correction can be made by the neural network to an inputted pattern as shown in FIG. 26 in which a black dot in the third line is shifted to left by one dot.

Figure 27:
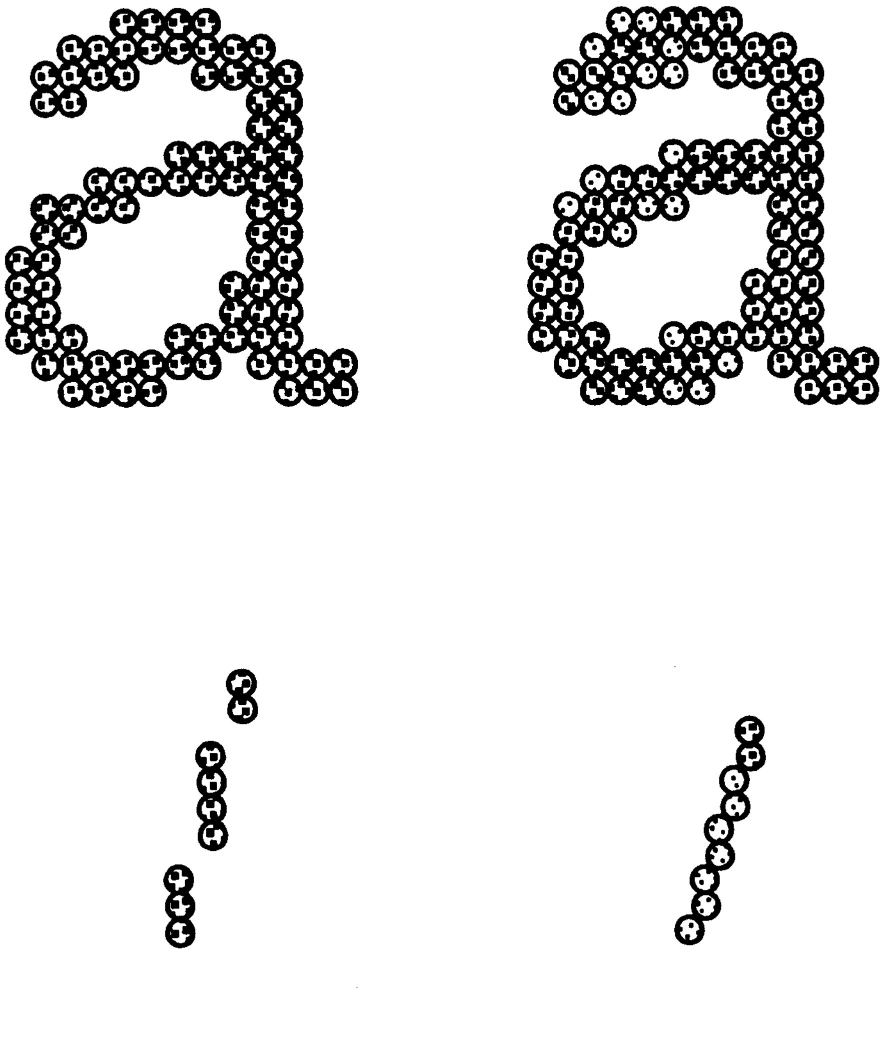
FIG. 27 shows an example of correcting a character and a straight line.

FIG. 27 shows an example of a correction of a character and a slanted straight line. A pale black dot indicates a dot having a position different from its original position, that is, having different exposure timing.

FIG. 28 shows a table containing coefficients for neurons in the hidden layer, that is, coefficients after learning. In FIG. 28, the leftmost numbers from 1 through 16 indicate 16 neurons in the hidden layer. The uppermost numbers 1 through 15 indicate 15 coefficients stored in the coefficient buffer 25. Each number corresponds to a picture element number shown in FIG. 15.

FIG. 29, like FIG. 28, shows a table of coefficients for neurons in the output layer after learning. The number of neurons in the output layer is 5, and 16 coefficients corresponding to the 16 neurons in the hidden layer are stored in the coefficient buffer 33.

Figure 30A:
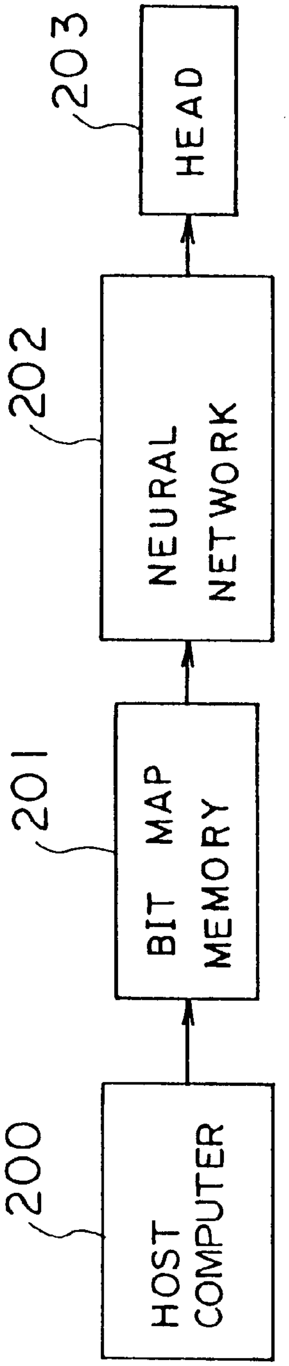
FIG. 30 shows an embodiment of a flow of image data.

FIG. 30 shows an embodiment of an image data flow. In FIG. 30A, image data are applied from a computer 200 to a bit map memory 201, and the data are applied to a neural network 202. If the neural network 202 has enough throughput, its output data are applied directly to a print head 203 of a laser printer, and image data can be corrected on real time.

Figure 30B:
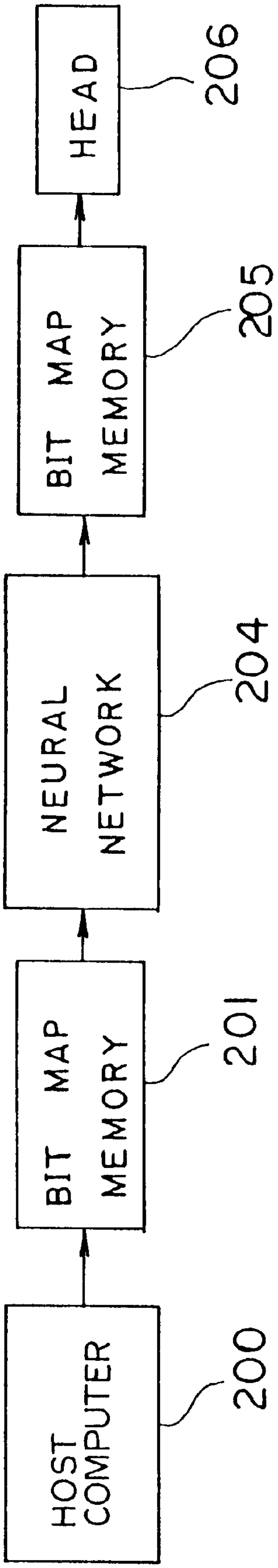

In FIG. 30B, since a neural network 204 does not have such high throughput, its output data are temporarily stored in a bit map memory 205, and then outputted to a print head 206. If the bit map memory 201 before the neural network 204 is designed for 300 dpi, the bit map memory 205 corresponds to 900 dpi. P16

Figure 31:
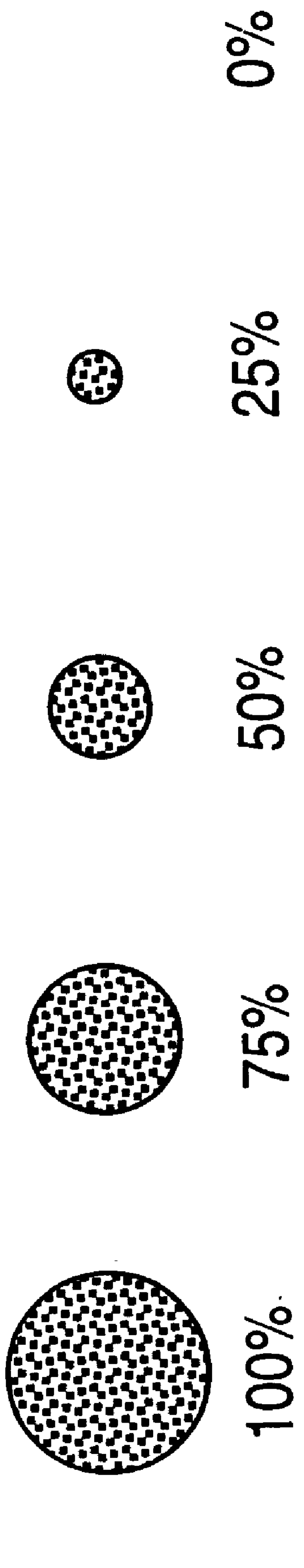
FIG. 31 shows an embodiment of the size of a 5-value picture element.

FIG. 31 shows an example of a picture element represented by 5 sizes. It is specified by 100% indicating the maximum dot diameter, 75%, 50%, 25%, and 0%.

As described above, the position of a dot is shifted by a neural network to right or left by ⅓ dot, that is, converted from 300 dpi down to 900 dpi. However, the conversion is not limited to this application, but it can be made by combining different density of picture elements. Therefore, the position of a picture element can be shifted in the vertical scanning direction as well as horizontal scanning direction. That is, if the dot position is physically fixed in the horizontal direction like in a thermal head, the form feed pitch can be made higher in the vertical scanning direction.

Figure 32:
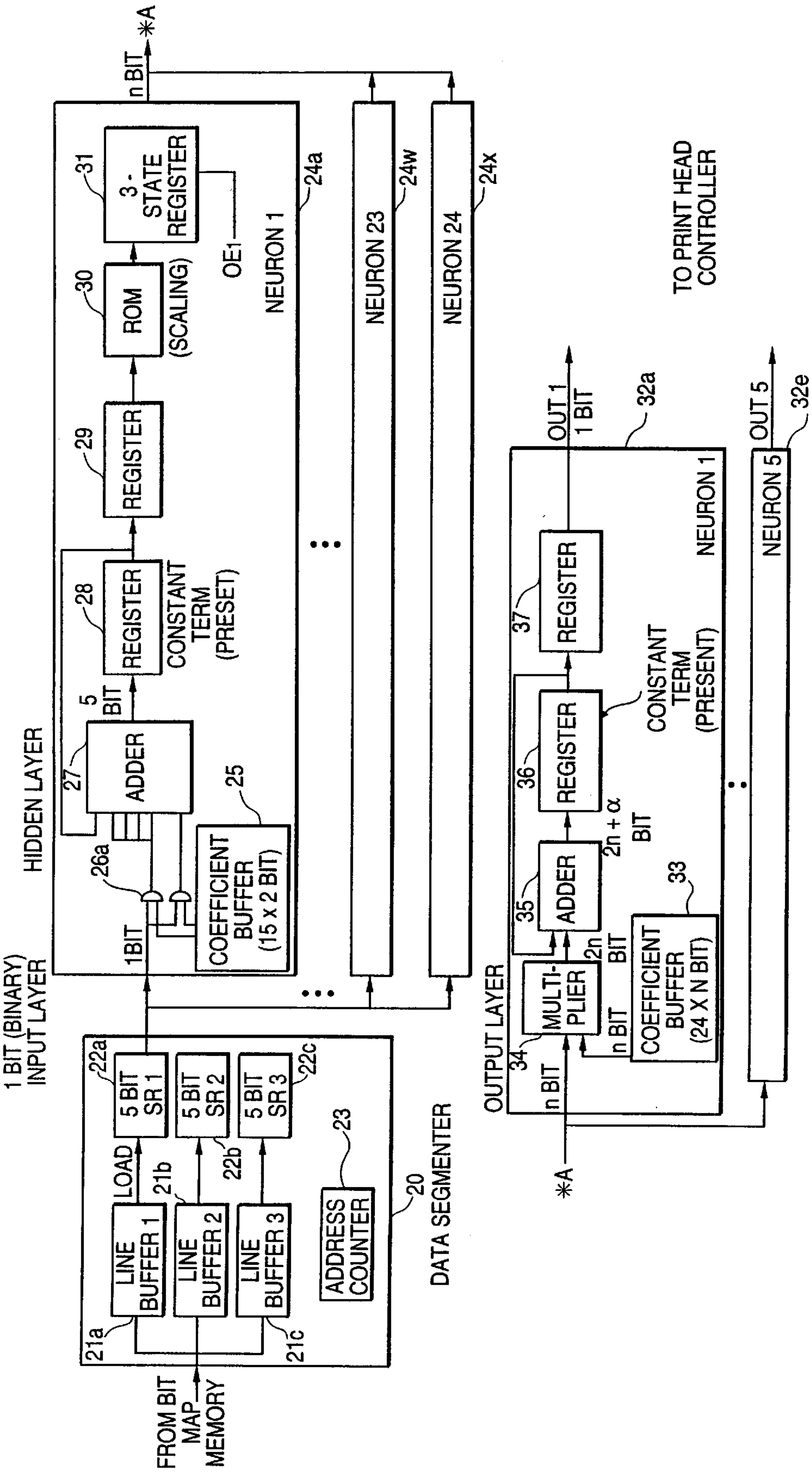
FIG. 32 is a block diagram for explaining the system configuration of the second embodiment of the image forming apparatus according to the first principle of the present invention.

FIG. 32 shows the second embodiment of the image forming apparatus of the first principle of the present invention. Different points between the embodiment shown in FIGS. 20 and FIG. 21 are described below. Since the operational timing chart of the embodiment is similar to that shown in FIG. 21, the explanation about it is omitted here. Similar operations in FIGS. 32 and 20 are assigned the same number.

In FIG. 32, the operation of the data segmenter 20 is the same as that shown in FIG. 20, and dot image data in a window are simultaneously applied bit by bit to 24 neurons 24*a*–24*x* in the hidden layer. The second embodiment corresponds to the second object of the present invention in which a coefficient of input connection to a neuron in the hidden layer is represented by a small number of bits. The operation of a neuron in the hidden layer is explained below.

The arithmetic operation performed in the hidden layer is shown by expression (1). This operation is performed by 24 neurons in the hidden layer separately and concurrently.

One-bit data of either "1" (black) or "0" (white) are applied as a picture element to each of the neurons in the hidden layer from the data segmenter. The inputted data and a coefficient stored in the coefficient buffer 25, that is, a coefficient, are applied to two AND gates 26*a* and 26*b* provided instead of the AND gate 26 shown in FIG. 20. The content of the coefficient buffer 25 is one of the values +1, −1, and 0. They are represented by 2 bits: +1 by "01", −1 by "11", and 0 by "00". The 2-bit representation of a coefficient requires the two AND gates 26*a* and 26*b*. The coefficient for a black dot (for example, the second dot in the first line shown in FIG. 9) is +1, that is, "01", and the coefficient for a white dot is 11, and the coefficient for a don't care data is 00.

Since an output from the AND gate 26*a* is a sign bit, it is applied to the adder 27 as 4 higher order bits.

The content of the adder 27 is incremented when "black" is inputted to the dot corresponding to the coefficient 01 indicating "black", and the content of the adder 27 is decremented when "black" is inputted to the dot corresponding to the coefficient 11 indicating "white". In response to 15 inputs, the output from the adder 27 comes in the range of −15 through +15, and the number of bits outputted from the adder 27 can be 5 bits including a sign bit. The adder 27 performs an addition each time 1-bit data are inputted from the data segmenter 20, and outputs the result to the register 28. When the next data are inputted, the content in the register 28 is added to the content in the adder 27 together with the outputs from the AND gates 26*a* and 26*b*, and the result is stored in,the register 28 again.

After repeating this operation for each of the 15 input data, the final result as a sum of products is stored in the register 28. The value is then stored in the register 29, and the function stored in the ROM 30 in the next step, e.g. a step function, performs a transformation, that is, a scaling, and the transformation result is stored in the three-state register 31.

The above described process is a cycle of the operation performed by the neurons in the hidden layer in response to inputted data in a window. Since the 24 neurons in the hidden layer perform their operations concurrently, the contents in the three-state registers 31 are simultaneously determined.

The output of data from the hidden layer to the output layer and the operation of the neurons in the output layer are the same as those shown in FIG. 20. Therefore, the explanation about them are omitted here.

FIG. 33 shows an embodiment of a coefficient of input connection, that is, a coefficient, to a neuron in the hidden layer. The leftmost numbers 1 through 24 indicate the numbers of 24 neurons in the hidden layer, and the uppermost numbers 1 through 15 indicate the numbers of 15 inputs, that is, the input numbers for each dot shown in FIG. 9 (the same numbers shown in FIG. 15). The constant term indicates the constant term $k_0^n$ in expression (1).

In the present invention, each of the 24 neurons in the hidden layer detects a specific correction pattern. For example, in FIG. 33, the second neuron detects the pattern shown in FIG. 9 where the second neuron indicates coefficient 1 for the input "black", −1 for the input "white", and 0 for the input "don't care". When the pattern shown in FIG. 9 is inputted, the sum of products obtained by the second neuron equals the number of dots indicating black, resulting in +3. This is added to the constant term −3, resulting in 0. By detecting the resultant 0 using a comparator, for example, instead of a scaling by the ROM 30, the output of the second neuron is 1.

Since the pattern shown in FIG. 9 contains 8 don't care dots, 256 patterns can be corrected by a neuron in the hidden layer, that is, the second neuron therein. It is not required that all the 256 corrections are learned during the learning by the neural network. Even an unlearned pattern can be corrected only by the learning of 9 patterns comprising combinations, for example, 8 white dots, only one black dot in the combination, etc. However, all dots other than don't care dots are specified to either black or white dots in a correction pattern.

Figure 34:
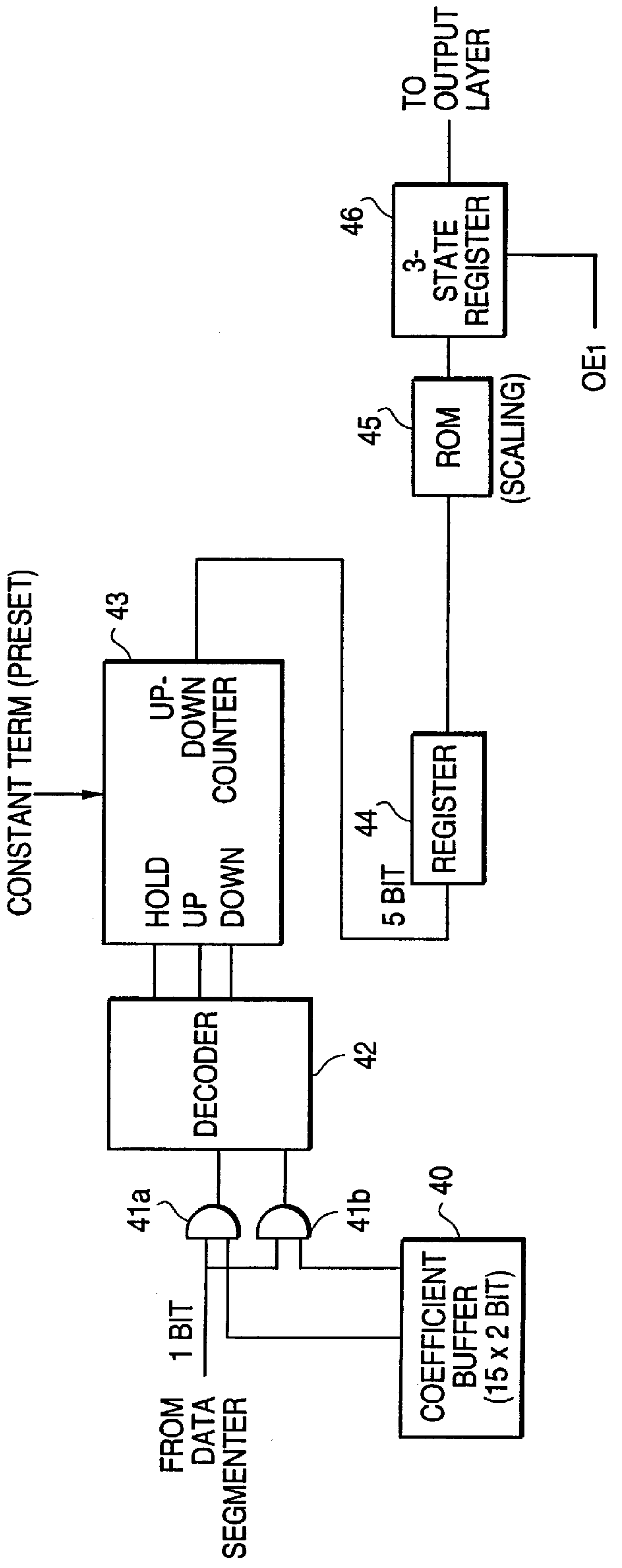
FIG. 34 is a block diagram for explaining the configuration of a neuron in the hidden layer of the third embodiment of the image forming apparatus according to the first principle of the present invention.

FIG. 34 is a configurational block diagram of the neurons in the hidden layer of the third embodiment of the image forming apparatus of the first principle. In the third embodiment, the data segmenter 20 and the neurons 32*a*–32*e* in the output layer are the same in configuration as those shown in FIG. 32.

In the third embodiment shown in FIG. 34, an up-down counter 43, instead of the adder 27, calculates a sum of products. The content in a coefficient buffer 40 is the same as that in the coefficient buffer 25 of the second embodiment. The up-down counter 43 is controlled by a decoder 42.

The decoder 42 controls the up-down counter 43 such that it counts up when the output from AND gates 41*a* and 41*b* is "01", counts down when it is "11", and holds the present count when it is "00". As shown in the second embodiment, when "black" is inputted to a black dot having coefficient 01, the content in the up-down counter 43 is counted up, and it is counted down when "black" is inputted to a white dot having coefficient 11.

After, the up-down counter 43 counts in response to 15 inputs, the content is stored in a register 44, a scaling is performed by a ROM 45, and the transformation result is outputted to the neurons in the output layer through the three-state register 46.

Figure 35:
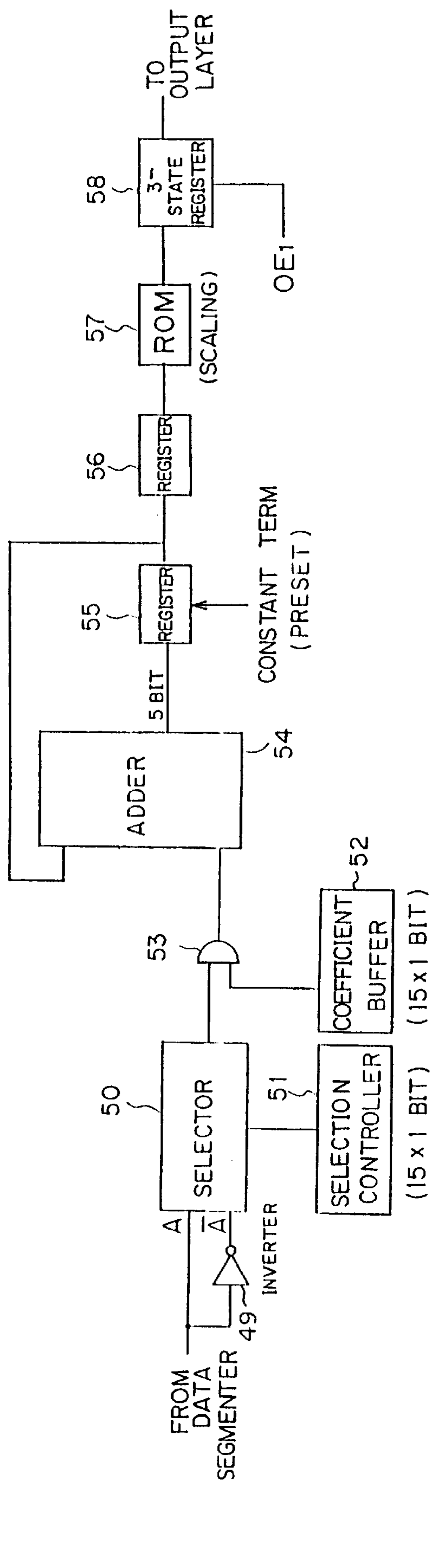
FIG. 35 is a block diagram for explaining the configuration of the neuron in the hidden layer of the fourth embodiment of the image forming apparatus according to the first principle of the present invention.
Figure 37:
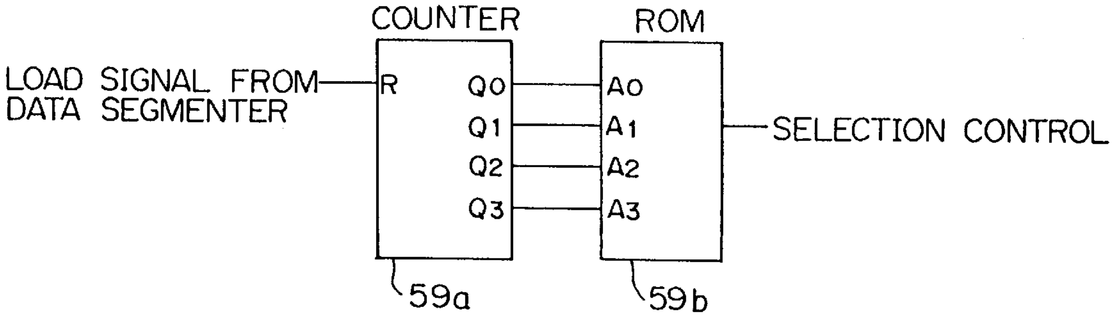
FIG. 37 is a block diagram for explaining the configuration of the selection controller.

FIG. 35 is a configurational block diagram of the neurons in the hidden layer of the fourth embodiment of the first principle. In this embodiment, the data segmenter and the neurons in the output layer are the same in configuration as those of the second embodiment. However, unlike the above described embodiments, two inputs A and $\overline{A}$ are applied in response to the input from the data segmenter in the fourth embodiment. The input A indicates a non-interted input which is an input as is, and the input $\overline{A}$ indicates an inverted input obtained through an inverted 49. The two inputs A and $\overline{A}$ are applied to a selector 50, either of which is selected according to a control signal from a selection controller 51. The selection result is applied to an AND gate 53 together with the content of a coefficient buffer 52, and the output from the AND gate is applied to an adder 54. An input to the adder 54 is, like in the first embodiment, added to the content in a register 55, and the result is stored in a register 55. This operation is repeated for each of the 15 inputs, and the final sum of products are stored in a register 56. Then, a ROM 57 performs a scaling, and the transformation result is applied to a neuron in the output layer through a three-state register 58.

FIG. 36 shows an embodiment of a selection control signal applied to the selector 50 and a coefficient stored in the coefficient buffer 52 as shown in FIG. 35. The selection controller 51 outputs a selection control signal value "0" to select a non-interted input A for the position of a black dot, and "1" to select an inverted input $\overline{A}$ for the position of a white dot.

In the coefficient buffer 52, the coefficient is set to 1 for the non-interted input A indicating a black dot position and for the inverted input $\overline{A}$ indicating a white dot position. Otherwise, the coefficient is set to 0, that is, for a don't care dot position. The coefficient and the value of a selection control signal shown in FIG. 36 are applied to the correction pattern shown in FIG. 9. A dot number indicates an input number, and the coefficient is set to 0, that is, the value of the selection control signal for a don't care dot is 0 to select a right signal.

Figure 38:
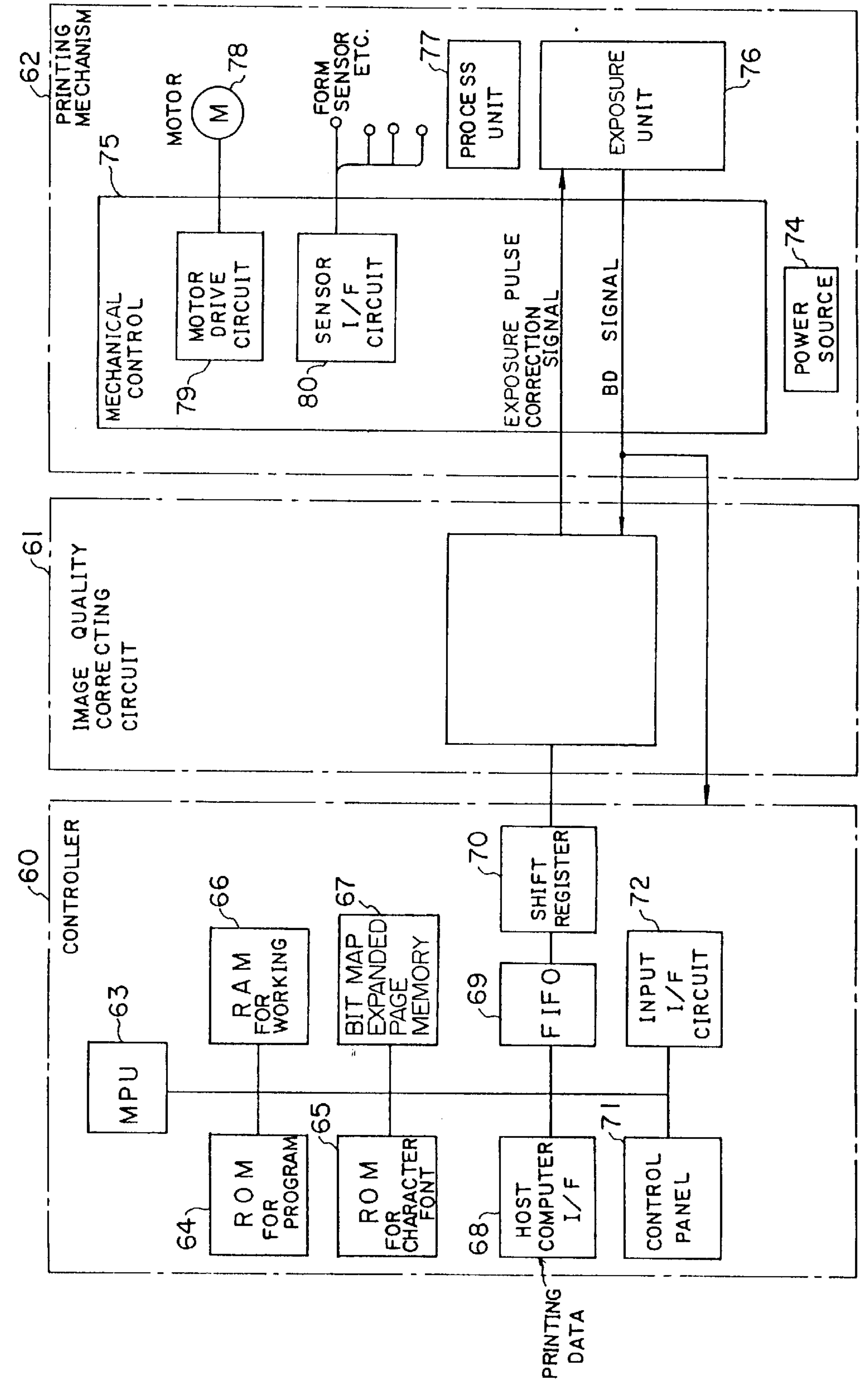
FIG. 38 is a block diagram for explaining the general configuration of the printer as an image forming apparatus.

FIG. 38 is a block diagram for explaining the configuration of the selection controller 51 shown in FIG. 35. The selection controller comprises a counter 59*a* and a read only memory (ROM) 59*b*. The counter 59*a* is reset when image data are loaded from the line buffer 21 to the shift register 22. Its value is stepped up each time 1-bit data are applied from the shift register 22 to a neuron in the hidden layer shown in FIG. 35 through the input layer. The output value of the counter 59*a* is applied as an address signal to the ROM 59*b*. According to this address, the ROM 59*b* outputs a selection control signal described above by referring to FIG. 36. That is, an address in the ROM 59*b* corresponds to the dot number shown in FIG. 36. As described above, a neuron in the hidden layer corresponds to a pattern to be detected, and the dot position of white/black/don't care is predetermined. A selection control signal is outputted according to this position.

The fourth embodiment shown in FIG. 35 is different from the third embodiment shown in FIG. 34 in an addition result performed by the adder 54 when inputted data coincide with a pattern to be detected. In the third embodiment, the maximum value of the addition result indicates the number of dots to generate a black picture element. In the fourth embodiment, it indicates the number to generate black and white picture elements. For example, when the pattern shown in FIG. 9 is detected, the addition result obtained by the up-down counter in a neuron in the hidden layer indicates "3" in the third embodiment. By contrast, in the fourth embodiment, the result indicates "7".

In the fourth embodiment shown in FIG. 35, since the coefficient in the coefficient buffer 52 occupies only 1 bit, this embodiment reduces the scale of the sum-of-products operating circuit more effectively than the second embodiment shown in FIG. 32 and the third embodiment shown in FIG. 34 each having a 2-bit coefficient.

The general configuration of an image forming apparatus, or a printer, is described below. In this connection, the explanation is given about the generation of an actual exposure pulse from the correction data, outputted from the above described neural network, of the size and position of the central dot in a window.

FIG. 38 is a general configurational block diagram of the printer. The printer comprises a controller 60, an image quality correcting circuit 61, and a printing mechanism 62. Among them, the image quality correcting circuit 61 is described later.

The controller 60 comprises a processor MPU 63 for controlling the whole mechanism, a ROM 64 for storing a program, a character font ROM 65, a working RAM 66, a bit map expanded page memory RAM 67, a host computer interface 68 for receiving printing data, etc. from a host computer, a first-in-first-out (FIFO) memory 69 for storing printing data, etc., a shift register 70, a control panel 71, and an input interface circuit 72.

The printing mechanism 62 comprises a power source 74 for supplying electric power, a mechanical controller 75, an optical unit 76, a process unit 77, a motor 78, etc. The mechanical controller 75 comprises a motor driving circuit 79, a sensor interface circuit 80, etc. The optical unit 76 comprises a laser diode for emitting a laser light, a polygon mirror for deflecting and scanning the laser light, an f-θ lens for performing a scanning operation along the surface of a photoconductive object by the laser light at a constant speed, a photosensor for detecting the arrival of the scanning light at the end of the starting side of the area scanned by the scanning light through the polygon mirror, etc. The process unit 77 also contains a photoconductive drum on which a scanning light emitted from the optical unit 76 is irradiated to form a electrostatic latent image, a developer for generating a toner image from the electrostatic latent image, a transfer charger unit for transferring the toner image to a print form, a cleaner for removing the residual toner on the photoconductive drum, a fuser stabilizing roller for stabilizing the toner image on the print form, etc. The motor 78 revolves the photoconductive drum and the thermal stabilizing roller. A detection output of the photosensor in the optical unit 76 is outputted as a beam detect (BD) signal to the controller 60 and the image quality correcting circuit 61. The exposure pulse signal whose pulse width is corrected is outputted by the image quality correcting circuit 61 and applied to the laser diode in the optical unit 76.

A bit map memory 201 to a RAM 67 for bit map expansion; a neural network 202 to a neuro 84; and a head 203 to a laser diode in the optical unit 76.

Figure 39:
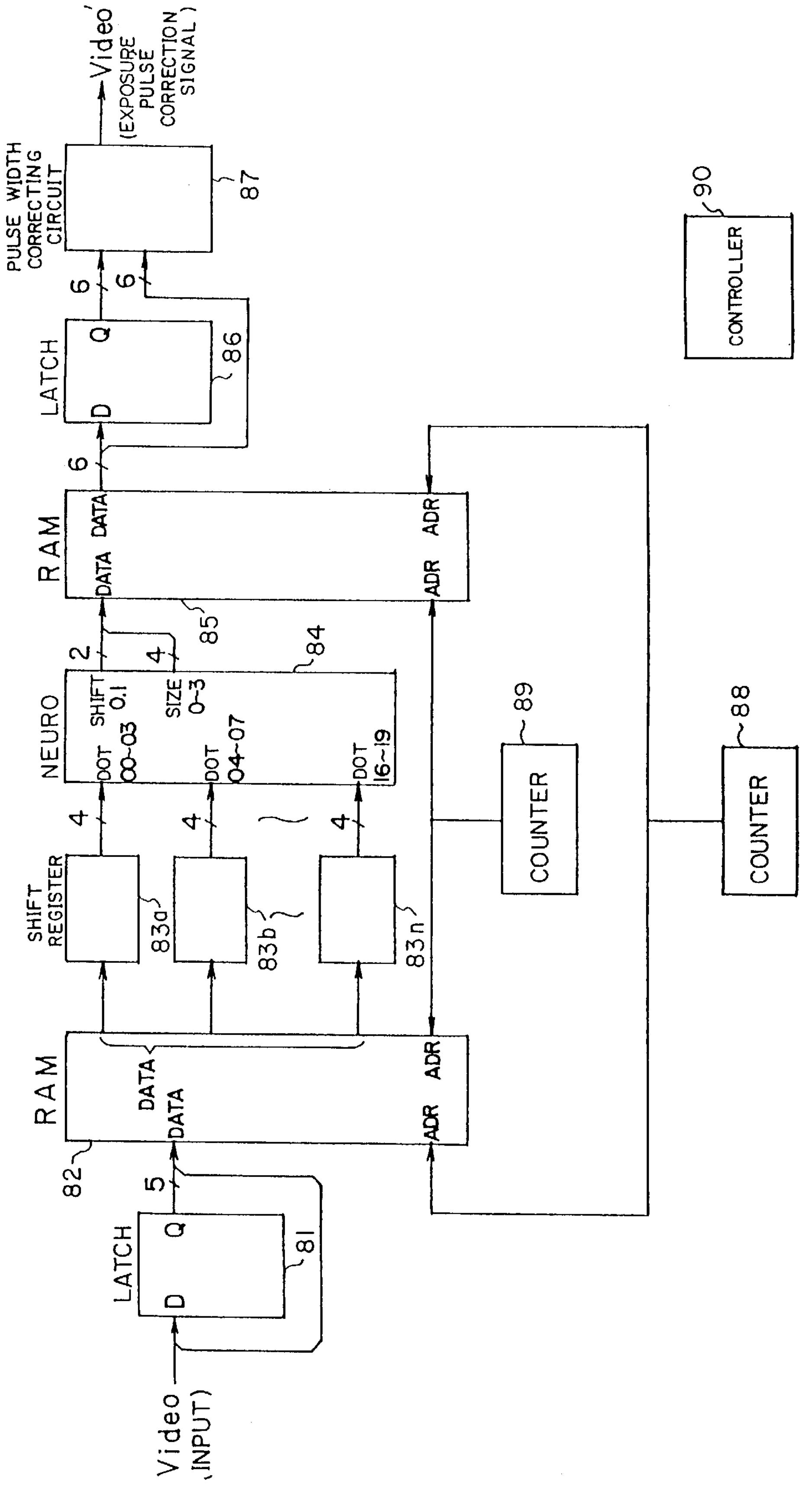
FIG. 39 is a block diagram for explaining the detailed configuration of the image quality correcting circuit.

FIG. 39 is a detailed configurational block diagram of the image quality correcting circuit shown in FIG. 38. The image quality correcting circuit comprises a latch circuit 81 for receiving a video signal, that is, an input image signal from the controller 60, a two-port random access memory (RAM) 82 positioned after the latch circuit 81, shift registers 83*a*–83*n* for performing a serial/parallel conversion on data outputted from the RAM 82 to produce window data, a neural network (neuro) 84 for receiving by a unit in the input layer an output from the shift registers and outputting correction data for the central picture element in a window, a two-port RAM 85 for storing an output from the neural network 84, a latch 86 for receiving an output from the two-port RAM 85, a pulse width correcting circuit 87 for outputting an exposure pulse correction signal to the optical unit 76 in the printing mechanism 62 according to the output from the two-port RAM 85 and the latch 86, a counter 88 for controlling the read/write address of the two-port RAM 82 on the side of the latch 81 and of the RAM 85 on the side of the latch 86, a counter 89 for controlling the write/read address of the RAM 82 on the side of the shift register and of the RAM 85 on the side of the neural network, and a general controller 90.

Figure 40:
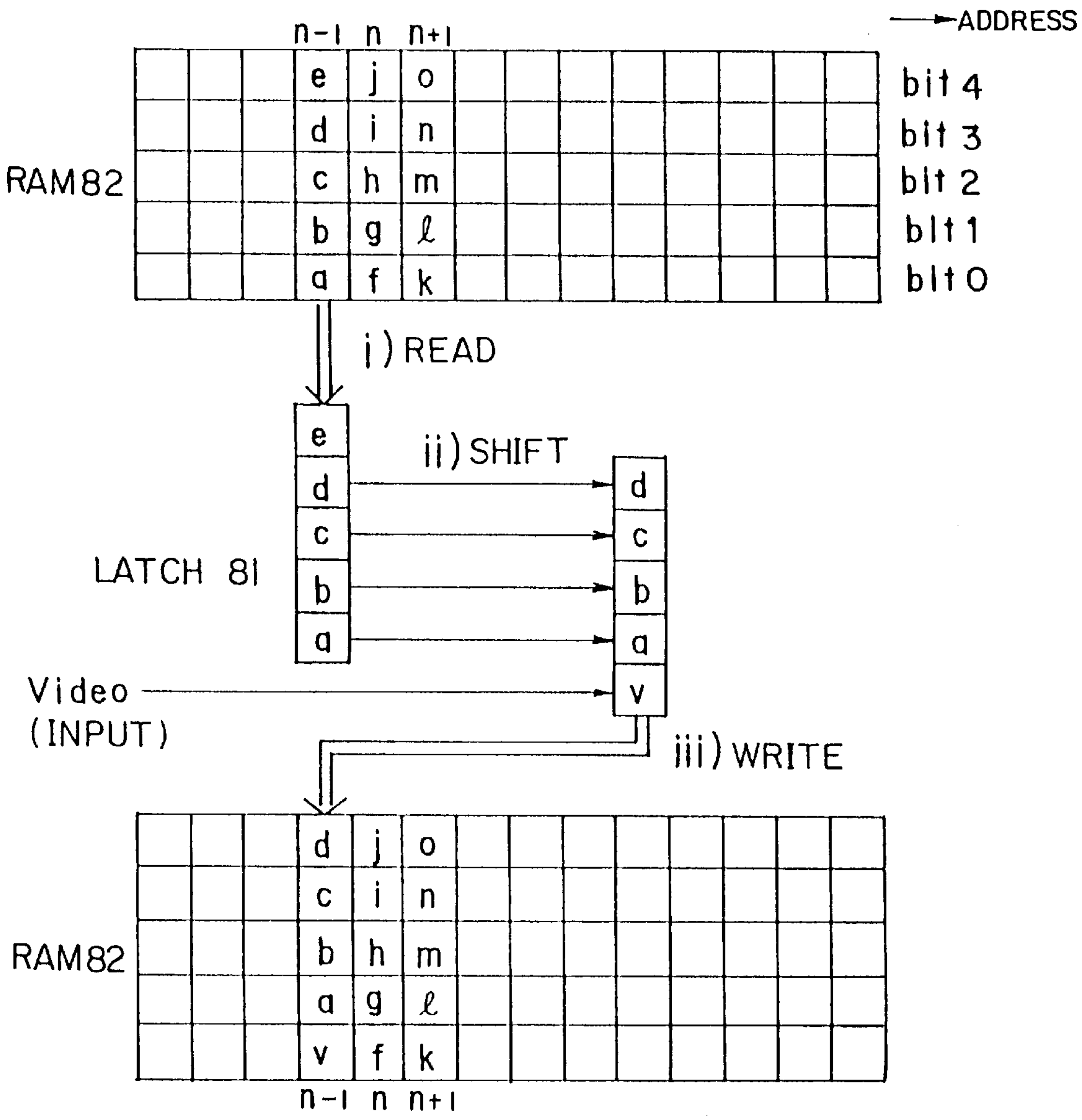
FIG. 40 illustrates the input of 1-line image data.

FIG. 40 is a block diagram for explaining the 1-line data input from the controller 60 to the RAM 82. The data input is described by referring to the connection chart indicating the connection between the latch 81 and the two-port RAM 82. In the following explanation, the size of a window for outputting correction data for the central picture element is 5×4.

Figure 41:
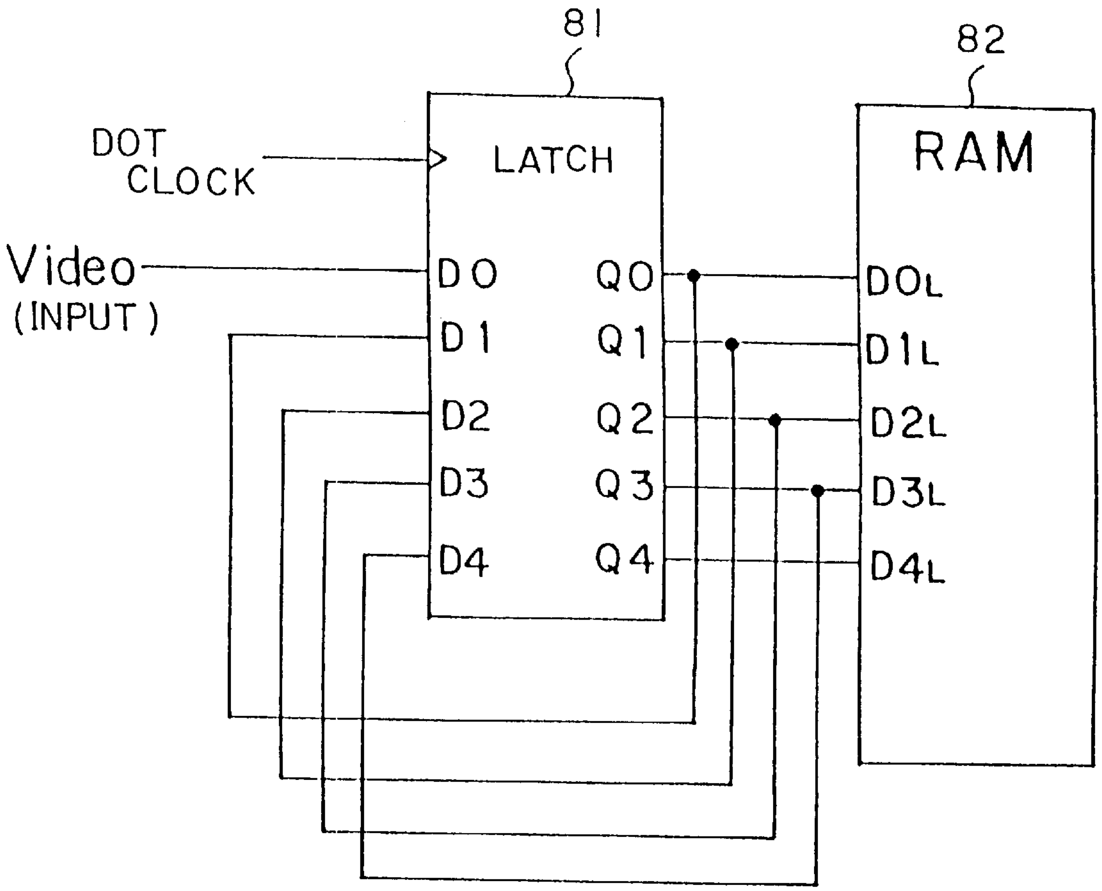
FIG. 41 shows the connection between the latch on the input side of the image data and the RAM.

In FIG. 40, the content of the above described RAM 82 indicates the current value. For example, bits 0–4 at addresses n−1 store data "a,b,c,d,e". Each of bits 0–4 corresponds to 1-line data in an image. The data in bit 0 are stored last in the RAM 82. After a predetermined time passes from BD (beam detection), the contents of the RAM 82 are sequentially read from address 0 and inputted to the latch 81. At this time, the RAM 82 and the latch 81 are connected such that data are shifted bit by bit as shown in FIG. 41. For example, "e" are overflown from the data at address n−1, and thus the data "a,b,c,d" are stored.

At this time, the data "v" at address n−1 are inputted from the side of the controller 60 to the input Do to the latch 81. These data are stored in the RAM 82 again through the latch 81. The 1-line data inputted by repeating this operation for 1 line are stored in the RAM 82 at the position of bit 0. The data stored at bits 1–4 indicate the data stored in a line newly stored according to the order of bit numbers. Data are stored from left to right starting with the data closest to the start-of-print position in each line according to the addresses of the RAM 82. The data in the RAM 82 are cleared by continuously writing "0" while scanning the out-of-area space prior to printing.

As shown in FIG. 39, the neural network 84 processes the data in a window comprising 5 lines each comprising 4 picture elements, for example, preceded by the data input from the RAM 82 to the shift registers 83*a*–83*n*.

Figure 42:
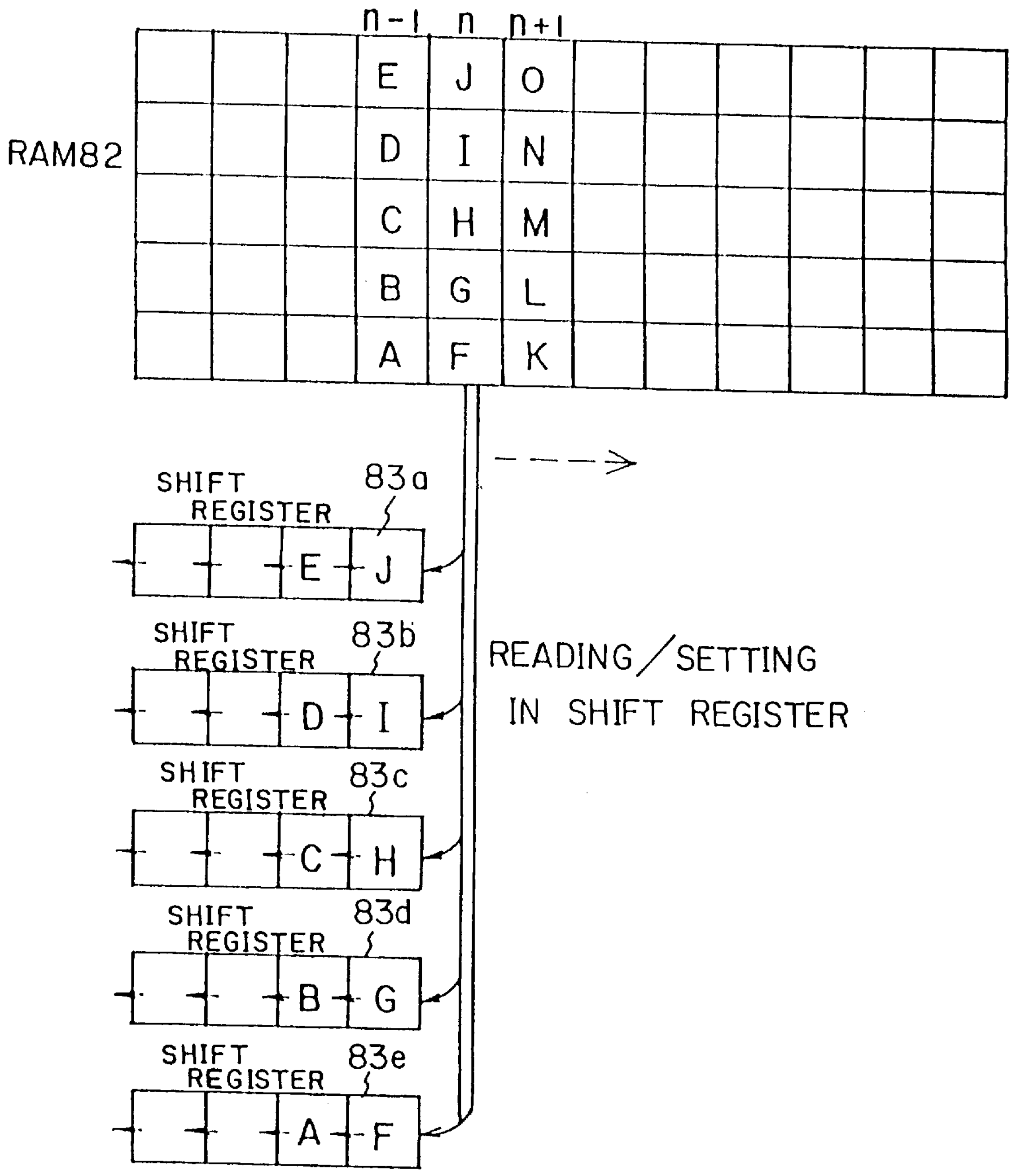
FIG. 42 illustrates the data input to the shift register.

FIG. 42 is a block diagram for explaining the data input to the shift register. Assuming that a window to be processed starts with address n−1 in the RAM 82, the data "A,B,C,D, E" at bits 0–4 at the address are inputted to 5 shift registers respectively. Next, the data at address n are inputted to 5 shift registers. At this time, the data positioned at address n−1 are shifted in the shift registers.

Figure 43:
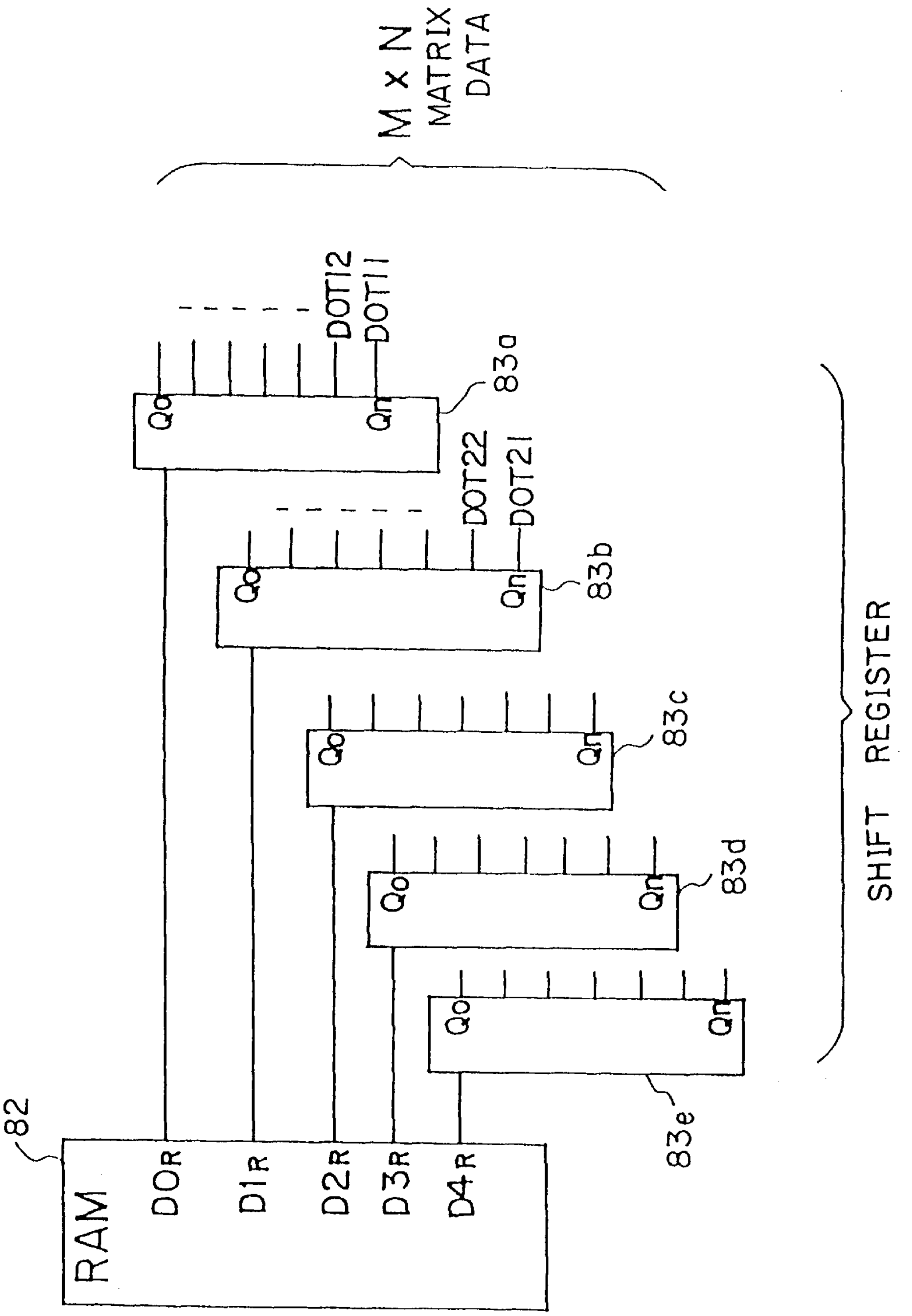
FIG. 43 shows the connection between the RAM on the input side of the image data and the shift register.

FIG. 43 shows the connection between the RAM 82 and the shift registers 83*a*–83*n*. The data are sequentially outputted from the RAM 82 in serial in bit units in the order of address, applied to the shift registers corresponding to the bit positions, and stored after sequentially shifted downwards in FIG. 43.

When data in a window are stored in the shift registers, the shift registers 83*a*–83*n* output data to the neural network as shown in FIG. 39. Since the data are outputted in parallel, each of the shift registers converts data in serial/parallel.

The input/output of data to the shift registers is performed at the process speed of the neural network. In FIG. 39, it is controlled by a count value generated by the counter 89. Since common neural networks do not process data at a very high speed generally, data are applied to the neural network 84 at the timing regardless of, for example, the image data input to the RAM82, that is, the data input performed at the timing specified by a count value generated by the counter 88. The data in the shift registers 83*a*–83*n* are cleared at the beginning of each line.

The process result of the neural network 84, that is, the correction data of the size and position (shift) of a dot for the central picture element, is outputted to the latch 86 and the pulse width correcting circuit 87 through the RAM 85. The RAM 85 is used, like its input side, to adjust the timing between the neural network 84 and the exposure pulse correction signal output. In this embodiment, the correction data for the central picture element outputted by the neuro 84 comprise a total of 6 bits: 4 sizing bits and 2 position (shift) bits.

Figure 44:
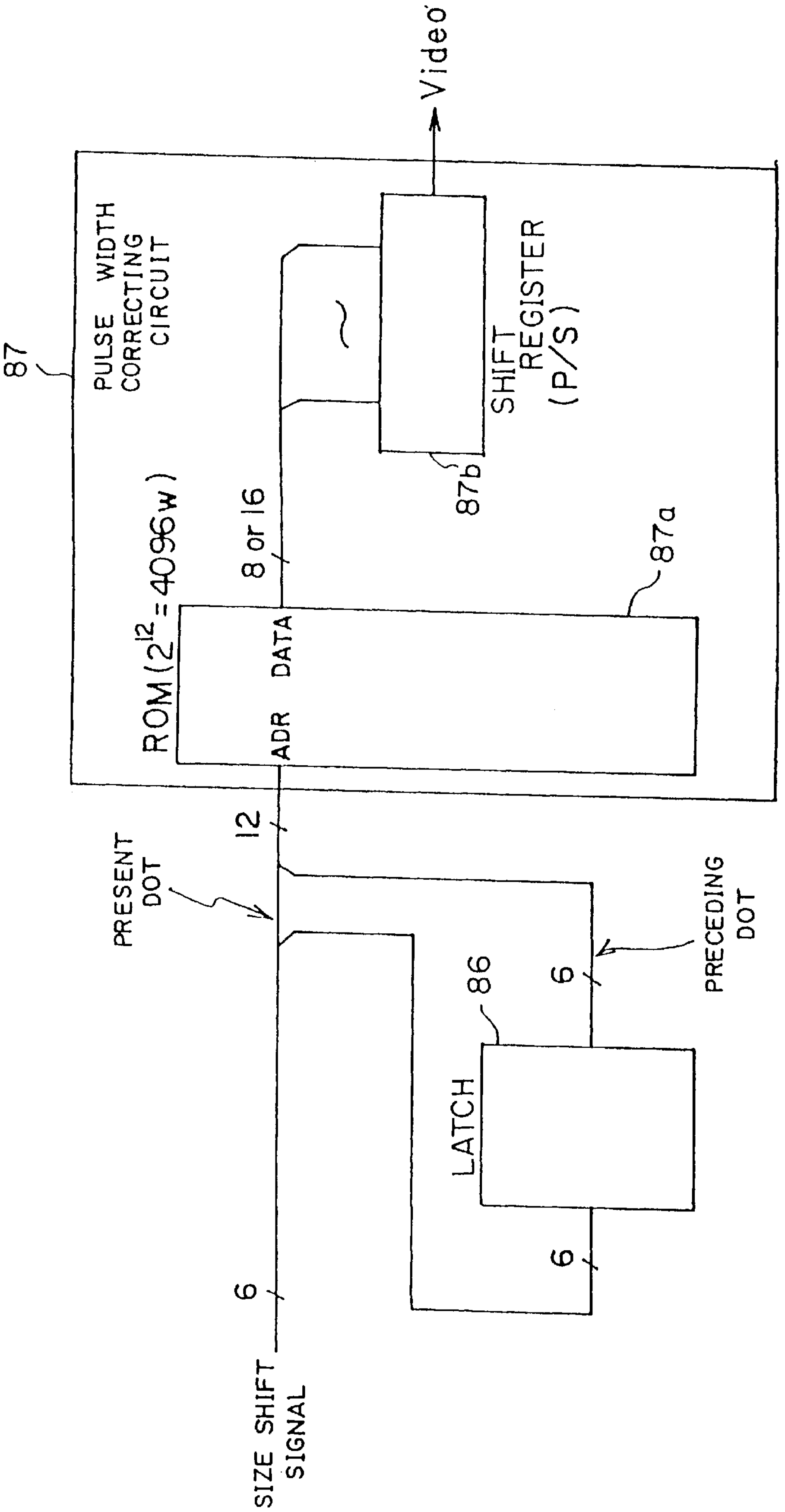
FIG. 44 is a block diagram for explaining the configuration of the pulse width correcting circuit.

FIG. 44 is a configurational block diagram of the pulse width correcting circuit 87 shown in FIG. 39. The pulse width correcting circuit 87 comprises the read only memory (ROM) 88 and the shift register 89. The ROM 88 receives as an address a total of 12 bits (6-bit output from the latch 86 and 6-bit output directly from the RAM 85 without the latch 86). The shift register 89 receives the output from the ROM 88 and outputs an exposure pulse correction signal after performing a parallel/serial conversion on the inputted data. The output from the RAM 88 comes in 16 bits when a subdot pattern comprises 16 subdots.

FIG. 45 shows an example of a exposure pulse according to the specified size and shift of dots. FIG. 45A shows an exposure pulse for a dot of 8/8 in size and positioned in the center, that is, a dot of the maximum size at the original position. At this time, the exposure signal indicates "1" in its 8 bits. When a dot is 2/8 in size and positioned in the center as shown in FIG. 45B, the exposure pulse correction signal indicates "1" in its 4th and 5th bits in center and "0" in the other bits.

FIG. 45C shows a right-shifted dot of 8/8 in size, and its correction signal indicates "0" in its 1st–3rd bits, and "1" in its 4th–8th bits. Since this signal is issued for the present window, and the values are all "1" in its 8 bits as shown in FIG. 45A when the original dot size is specified as 8/8, the value of 1 for the remaining 3 bits must be outputted when an exposure pulse correction signal is outputted for the next window. For a right-shifted dot of 4/8 in size as shown in FIG. 45D, a rightmost overflowing bit must be outputted when a correction signal for the next window is outputted.

Figure 46:
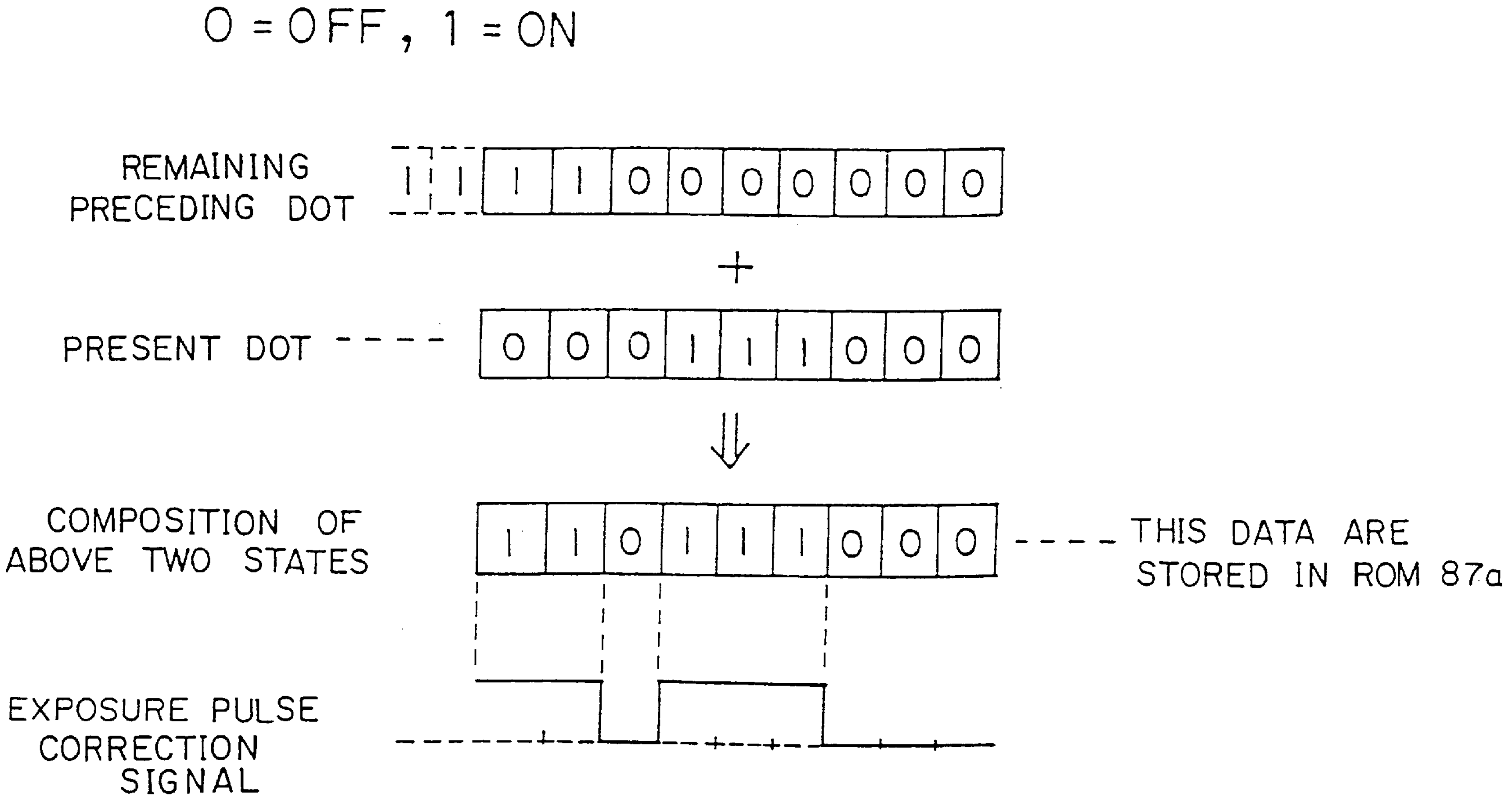
FIG. 46 shows an example of a exposure pulse correction signal by combining the remaining data of the dots in the preceding window and the dot data in the present window

FIG. 46 shows an example of an exposure pulse correction signal after combining the present dot data and the remaining data for the preceding window dots. As shown in FIG. 44, a read address of the ROM 88 comprises size and shift specification data for the central dot in the preceding window stored in the latch 86 and size and shift specification data for the central dot in the present window applied directly from the RAM 85. The ROM 87*a* stores an exposure pulse correction signal outputted after combining the data according to the address, and the data are outputted as a serial signal to the optical unit 76 through the shift register 87*b*.

Figure 47:
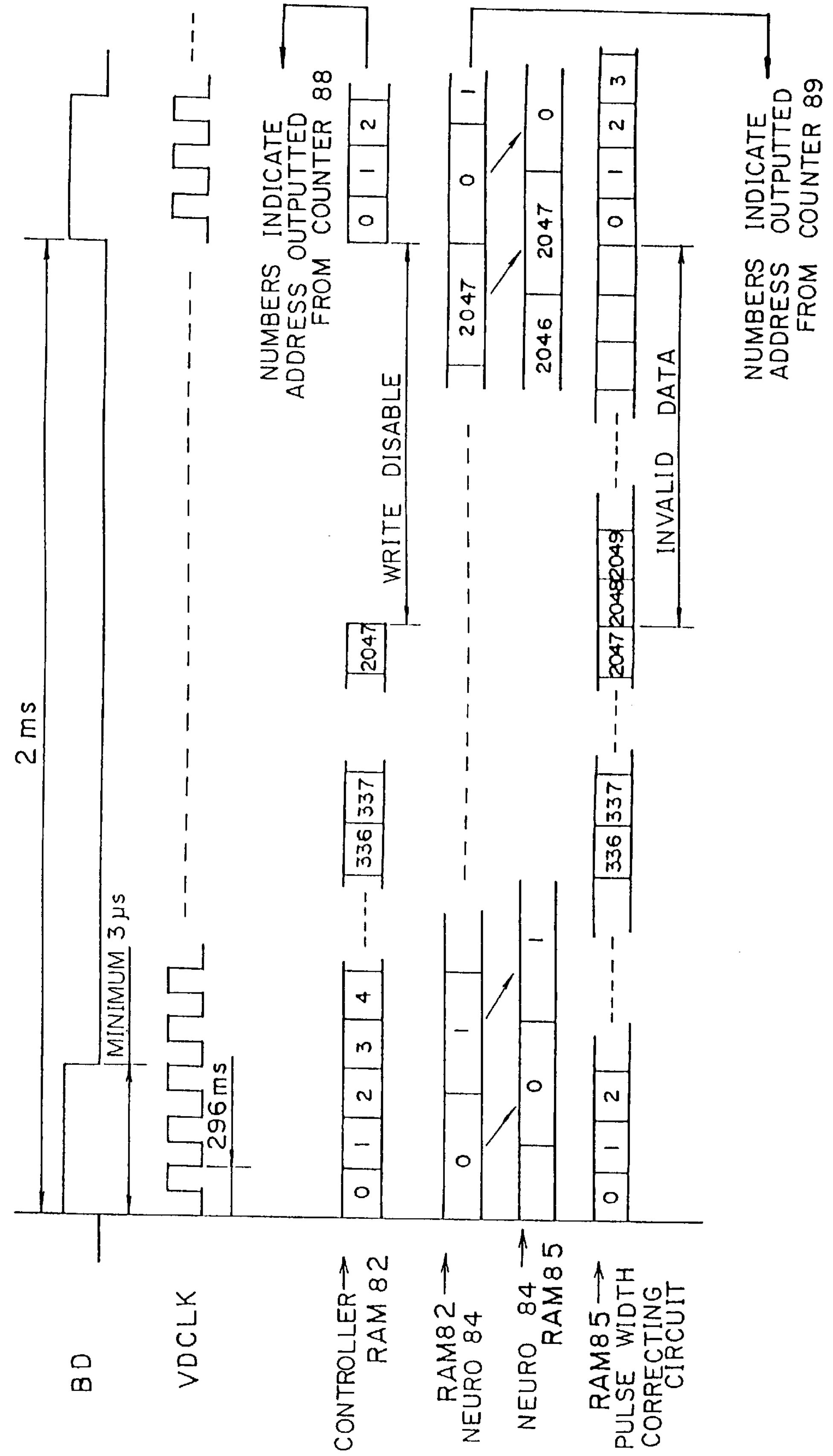
FIG. 47 is a timing chart of the operation of the image quality correcting circuit.

FIG. 47 is an operational timing chart for the image correcting circuit. When a beam detection signal (BD) indicating that the start of printing paper is detected is inputted, the counters 88 and 89 shown in FIG. 39 are reset, and data are inputted from the controller 60 shown in FIG. 38 to the RAM 82 shown in FIG. 39 according to a video data clock (VDCLK). At this time, a line address is specified by the counter 88. When 1-line data are written, any writing operation is disabled until the next BD signal is inputted to prevent out-of-area data from being written. Addresses 0 through 2047 indicate write addresses for one line.

Data are outputted from the RAM 82 to the neuro 84 when a BD signal is inputted. The input is performed at the timing later than that of the data input to the RAM 82. Size-and-shift data of a dot are outputted to the RAM 85 each time a process for a window is completed by the neuro 84. They are outputted according to a count value provided by the counter 89. At this time, the RAM 85 stores size-and-shift data of a dot as correction data for one line, and the data are outputted to the latch 86 and the pulse width correcting circuit 87 at the timing of the data input from the controller to the RAM 82, that is, according to a count value outputted by the counter 88.

Next, explanation is given below about the second principle of the present invention, that is, an embodiment in which a subdot pattern is outputted as correction data for the central dot in a window. The subdot pattern described by referring to FIG. 7 corresponds to an exposure pulse correction signal described by referring to FIG. 45, that is, an exposure pattern. The black portion in the subdot pattern indicates the position where a exposure pulse is ON.

Figure 48:
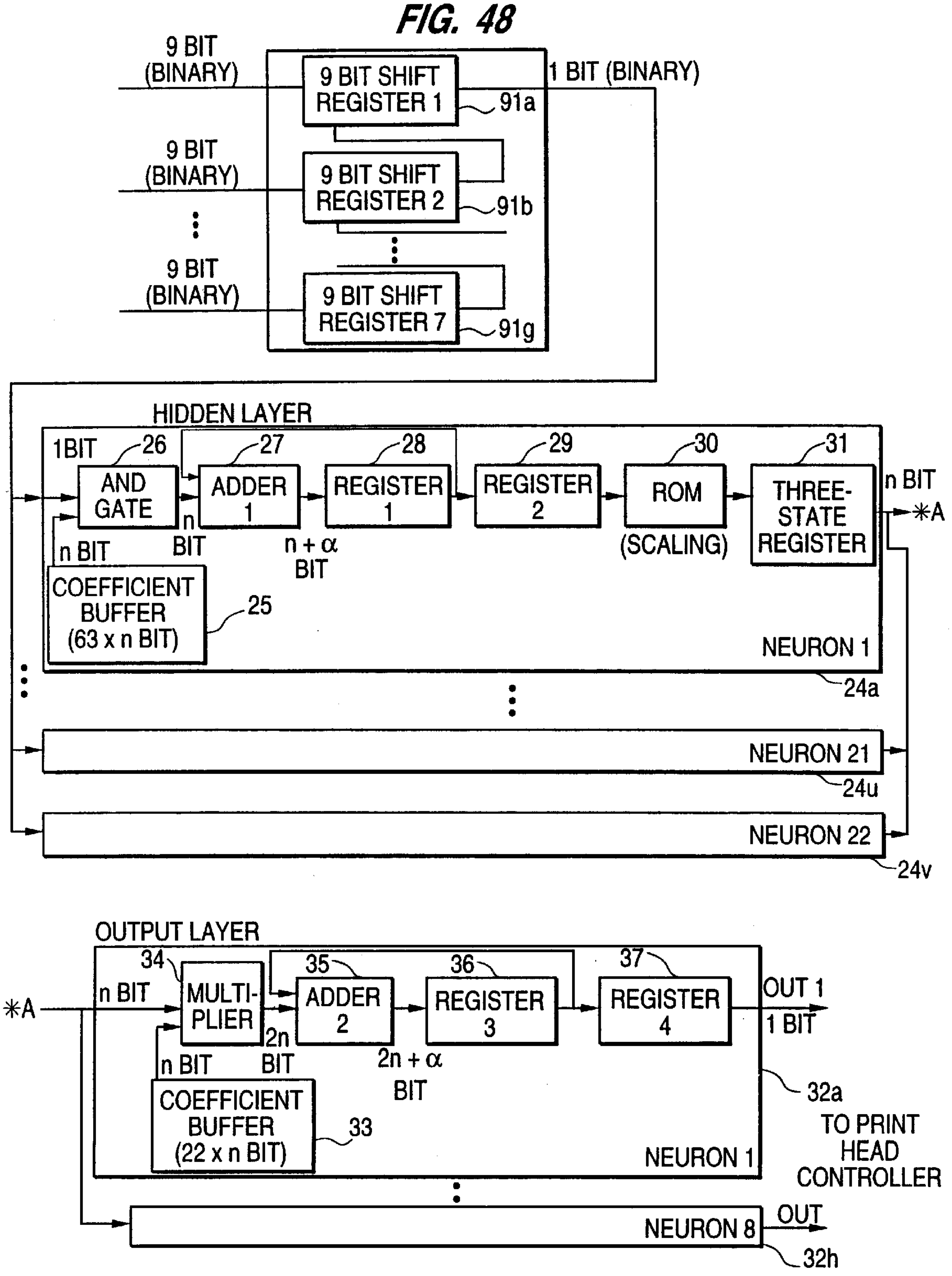
FIG. 48 is a block diagram for explaining the system configuration of the first embodiment of the image forming apparatus according to the second principle of the present invention.
Figure 49:
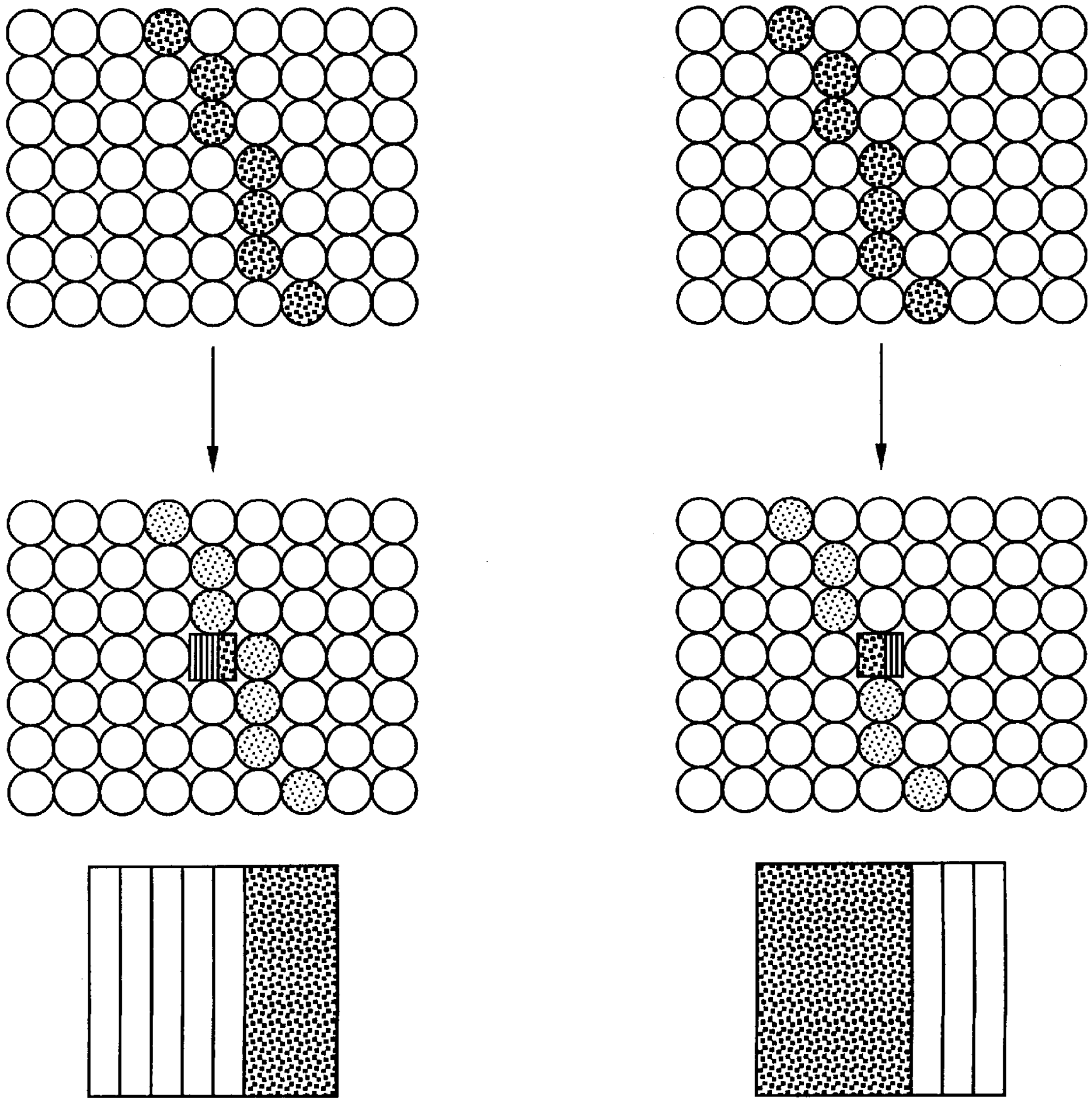
FIG. 49 shows the embodiment of correction patterns (teacher patterns) 1.
Figure 50:
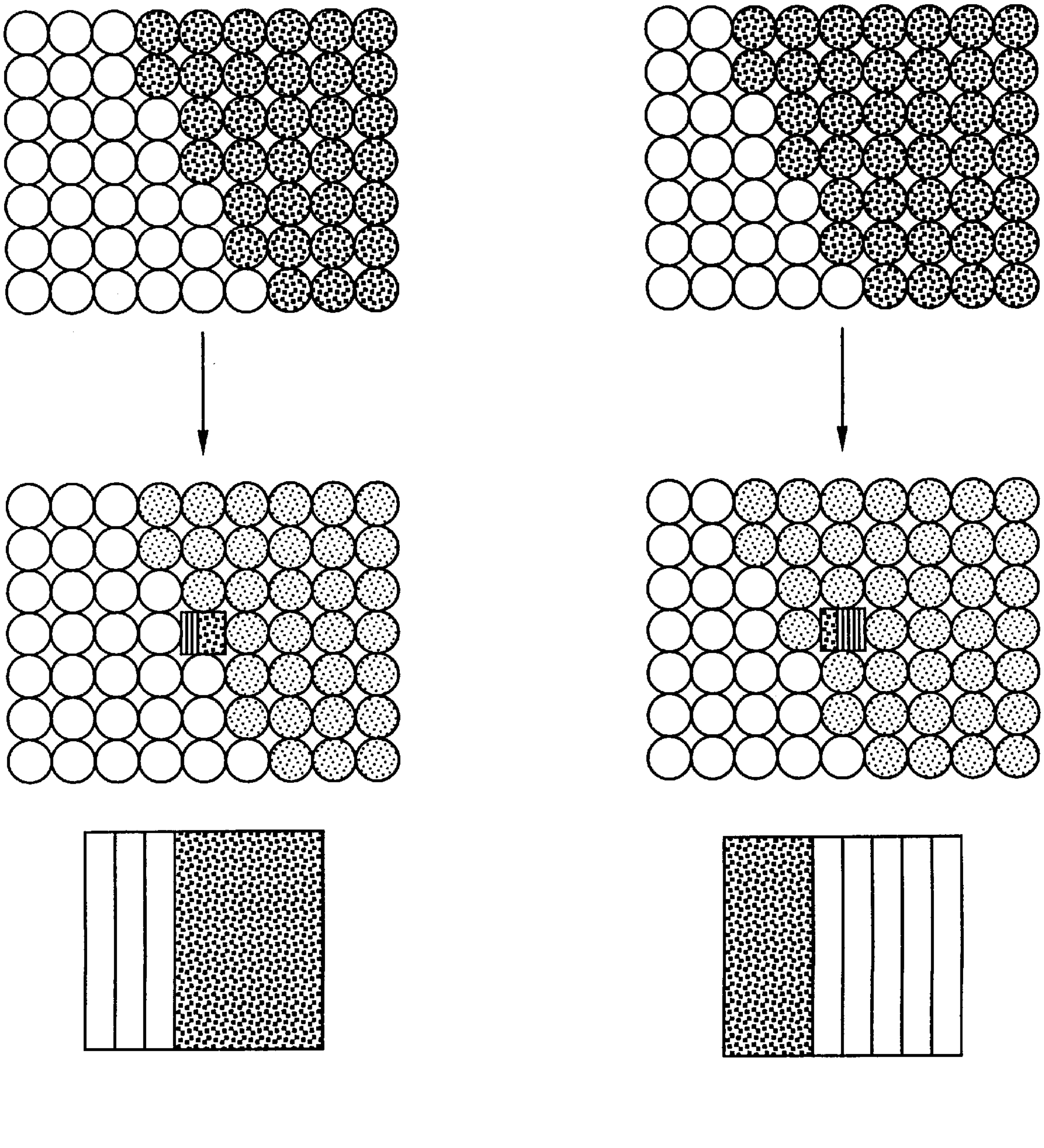
FIG. 50 shows the embodiment of correction patterns (teacher patterns) 2.
Figure 51:
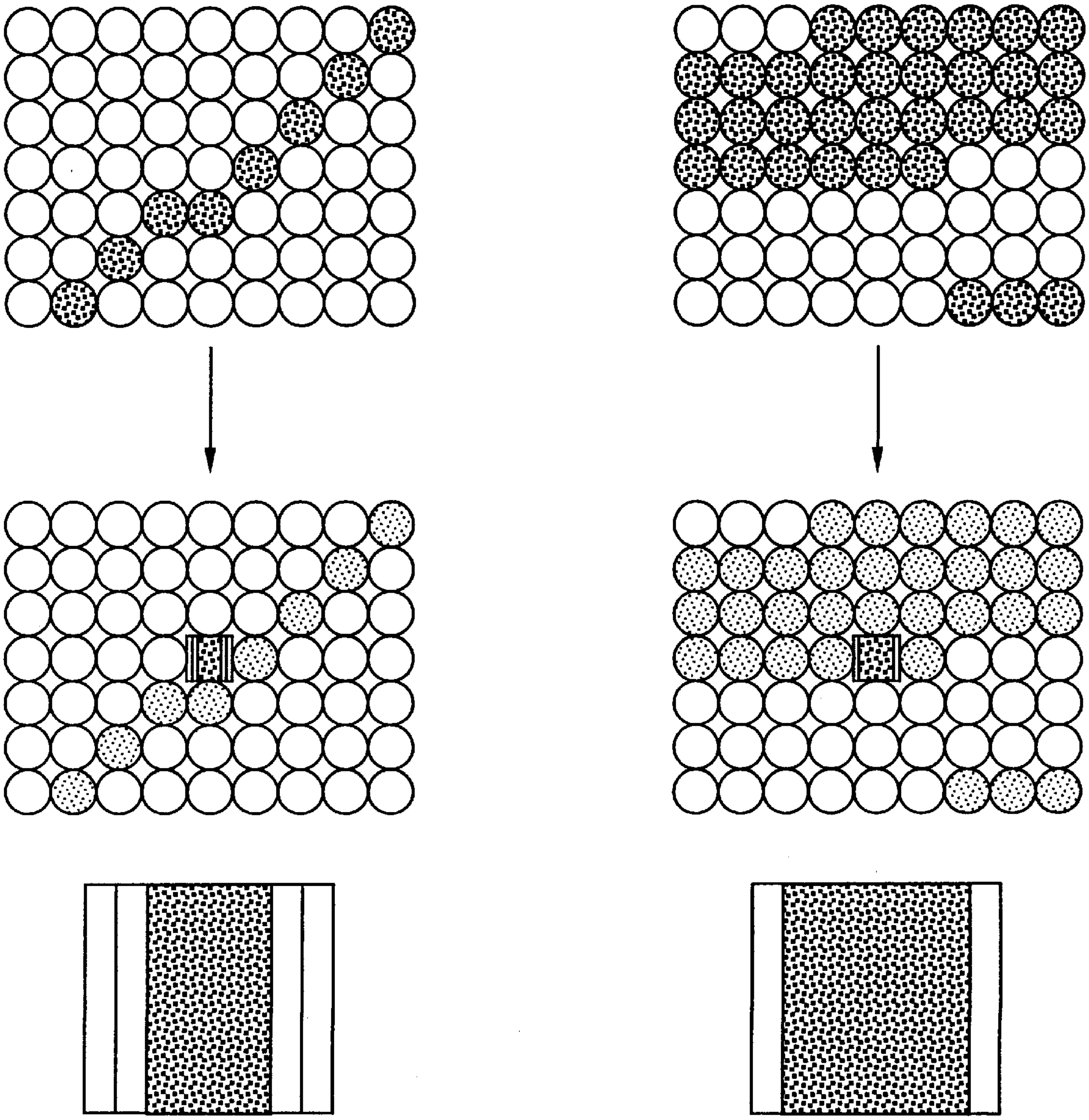
FIG. 51 shows the embodiment of correction patterns (teacher patterns) 3.
Figure 52:
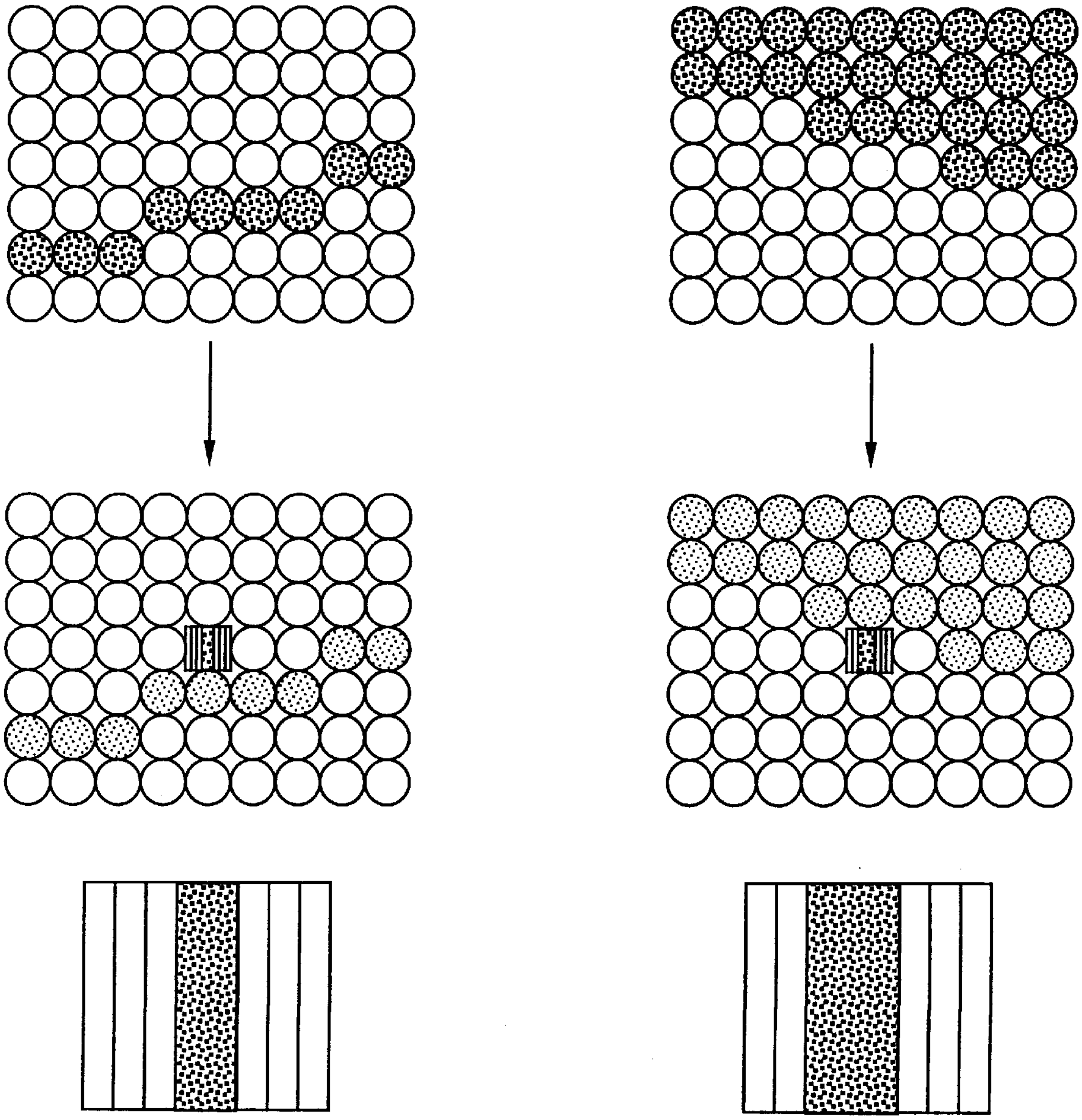
FIG. 52 shows the embodiment of correction patterns (teacher patterns) 4.

FIG. 48 shows a system configuration of the first embodiment of the image forming apparatus according to the second principle of the present invention. A neuron forming a neural network is realized by hardware like in the first principle of the present invention.

Since the system shown in FIG. 48 is similar to the embodiment of the first principle shown in FIG. 20 in configuration, the explanation is given by emphasizing different points between them. In this embodiment, a window comprises 7 lines each comprising 9 picture elements, and 63 dots of image data are provided bit by bit from connected 9-bit shift registers 91*a*–91*g*, a part of the data segmenter, for all neurons in the hidden layer through the neurons (not shown) in the input layer. A presetting to a neuron of a constant term in expression (1) is omitted in the drawing.

In the hidden layer, the system shown in FIG. 48 differs from the embodiment shown in FIG. 20 in that the number of neurons is 22 and the number of coefficients in the coefficient buffer 25 is 63 in the hidden layer, and in that the number of neurons is 8 and the number of coefficients in the coefficient buffer 33 is 22 in the output layer. The operational timing chart for the system is similar to that shown in FIG. 21, and thus the explanation is omitted here.

In the above described configuration, a neural network comprising input, intermediate, and output layers performs an arithmetic operation using each picture element and coefficient data each time 7×9 dots in which the central picture element is set as a picture element to be corrected, that is, a total of 63-picture-element data, are inputted. Then, a neuron in the output layer performs an arithmetic operation using output data from a neuron in the hidden layer and coefficient data stored in the coefficient buffer 33. Eight neurons in the output layer outputs the optimum subdot pattern corresponding to a pattern of the array of picture elements in dot image data inputted to the neural network. The pattern is outputted to the print head controller (not shown in the figure) as the data indicating the central picture element in a 7×9 window. The optimum subdot pattern is one of the 28 pattern shown in FIG. 7.

FIGS. 49–59 show the relationship between a pattern applied to the neural network in the embodiment shown in FIG. 48 and a teaching pattern for the inputted pattern. Patterns above each arrow are inputted patterns and those below it are teaching patterns and enlarged subdot patterns.

As shown in FIG. 49A, the central picture element in a 7×9 window of a teaching pattern is converted to black at its 3 rightmost subdots out of 8 subdots although the central picture element in the inputted pattern is white. As shown in FIG. 49B, an inputted pattern made by shifting bit by bit the inputted pattern shown in FIG. 49A to left by 1 dot indicates "black" in the central picture element in the inputted pattern. However, the rightmost 3/8 subdots of the central picture element are converted to white.

Accordingly, the jags shown in FIGS. 49A and 49B can be removed from the inputted pattern by having the teaching pattern shown in FIGS. 49A and 49B successfully learned.

FIG. 50A shows an example in which a central picture element to be displayed as black is converted to white at its leftmost 3/8 subdots. FIG. 50B shows an example in which a central picture element to be displayed as black is outputted as is. FIG. 51A shows an example in which a central picture element to be displayed as white is converted to black at its 4 central subdots. FIG. 51B shows an example in which a central picture element to be displayed as black is converted to white at its subdots at both ends. In the example shown in FIG. 51B, when a picture element one element to the right of the central picture element is determined to be the central picture element, 2 subdots each on both ends, that is, a total of 4 subdots, out of 8 subdots are converted to white. The next picture element to the right is white, but converted to black at its 2 central subdots, and each dot is corrected such that its size is gradually varied.

FIGS. 52A and 52B show an example in which a central picture element to be displayed as white is converted to black at some of its central subdots out of 8 subdots. FIGS. 52A and 52B shows an example similar to that shown in FIG. 51B in which picture elements adjacent to the central picture element are converted such that they are displayed as small dots.

Figure 53:
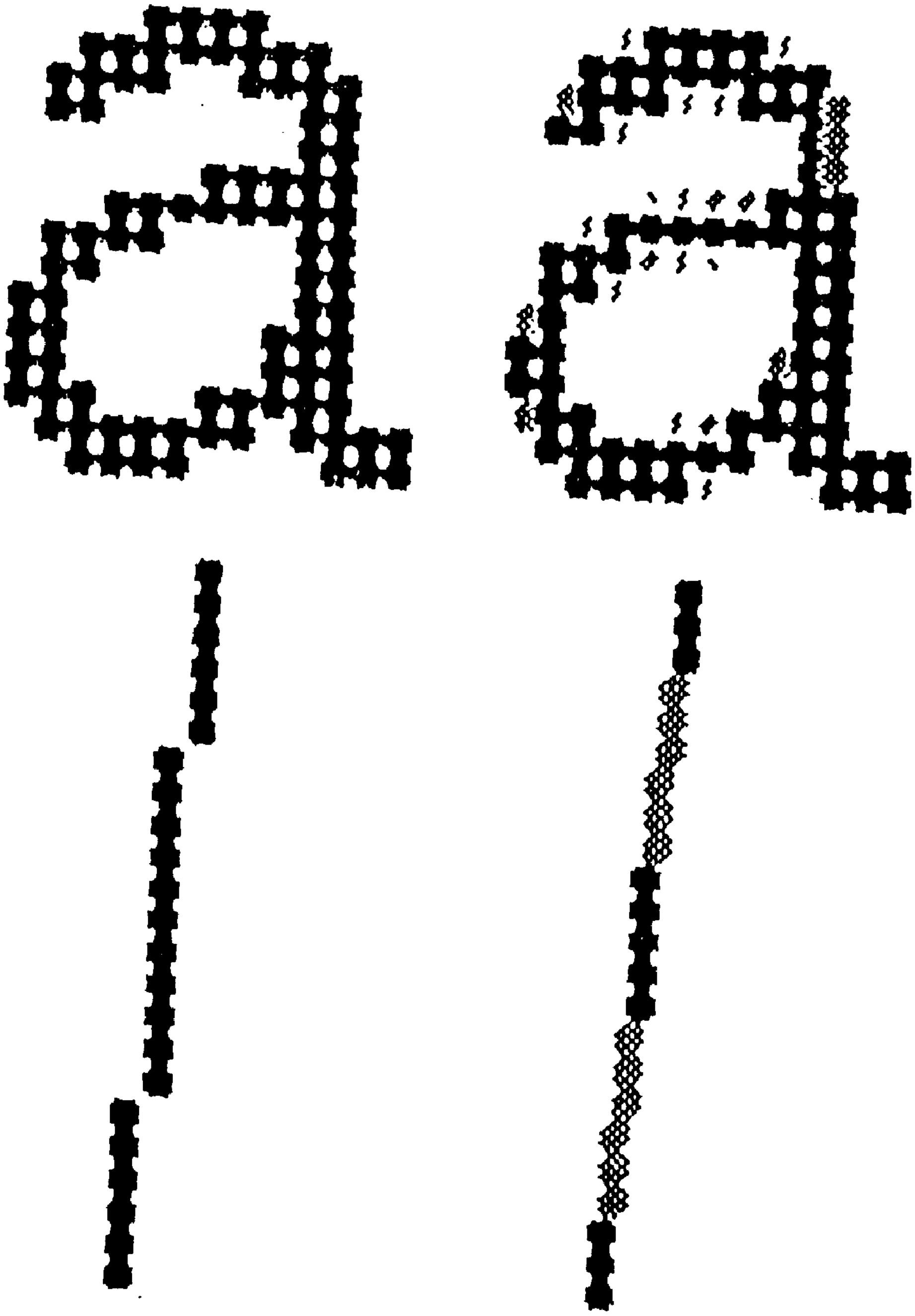
FIG. 53 shows an example of correcting a character and a straight line.

FIG. 53 shows a pattern obtained by performing a correction shown in FIGS. 49–52 on a character and a straight line. Pale black dots indicate that the position and size, that is, the exposure timing, of a dot is corrected.

Figure 54:
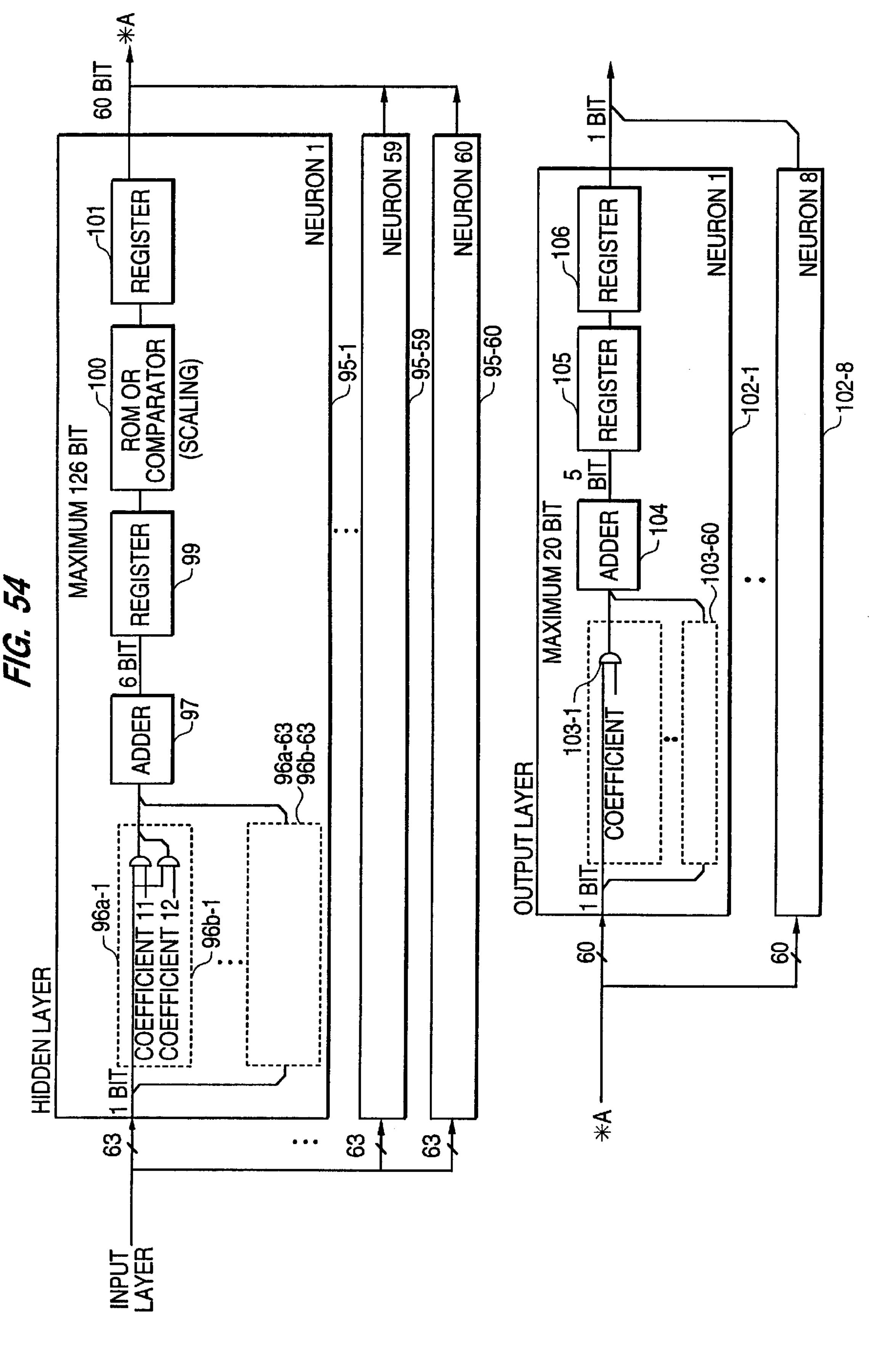
FIG. 54 is a block diagram of the hidden and the output layers of the second embodiment of the image forming apparatus according to the second principle of the present invention.
Figure 55:
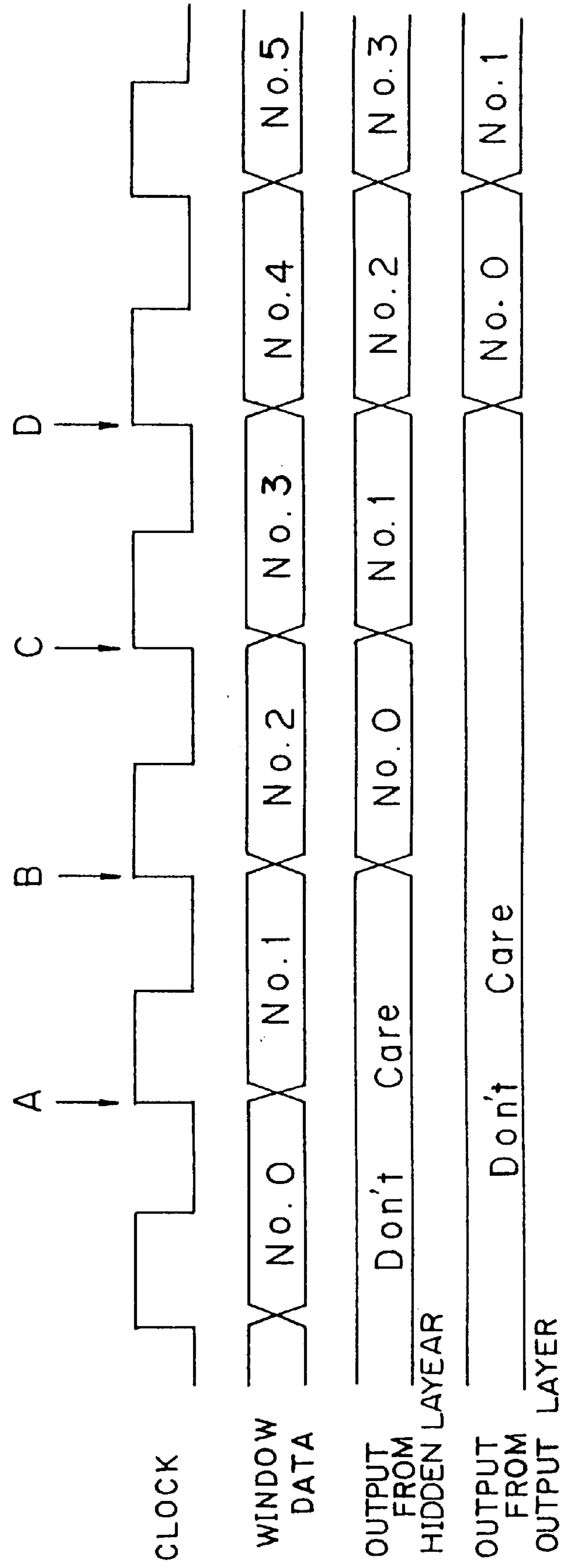
FIG. 55 is a timing chart for explaining the operation of the second embodiment according to the second principle of the present invention.
Figure 56:
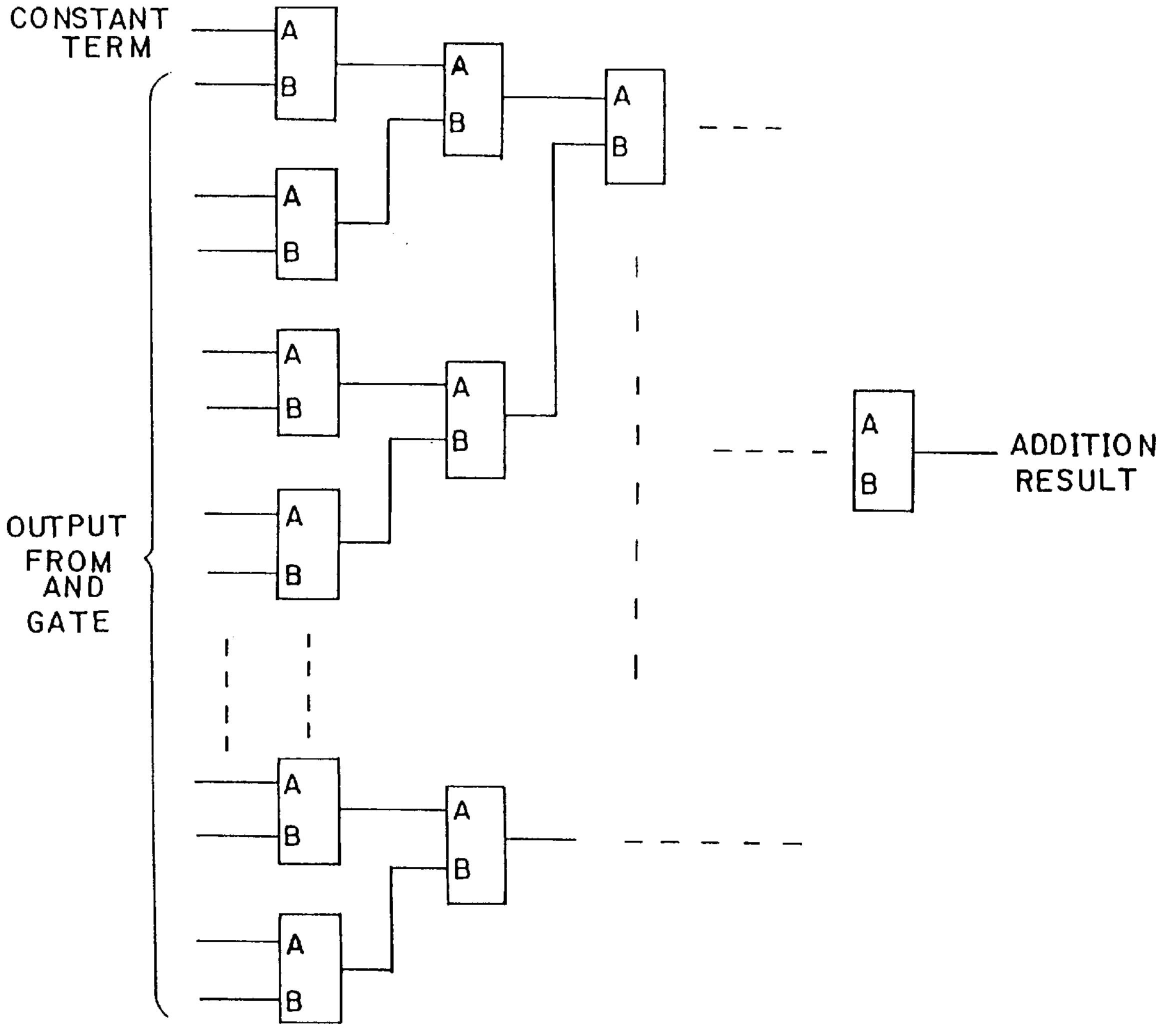
FIG. 56 is a block diagram for explaining the configuration of an adder in a neuron shown in FIG. 54.

FIG. 54 shows a system configuration of the second embodiment of the image forming apparatus according to the second principle of the present invention. The number of coefficients in the hidden layer in the neural network is 2 bits, different from that of the embodiment shown in FIG. 48. This configuration can be realized by that the coefficient of the input connection to a neuron in the hidden layer in the neural network can be converged to one of the three values: +1, −1, or 0 as described above by referring to FIG. 32 showing the second embodiment according to the first principle of the present invention. That is, the coefficients can be represented by a 2-bit number: 01 for +1, 11 for −1, and 00 for 0 with a higher bit set as a sign bit. Among these coefficients, a black picture element, a white picture element, and a don't care picture element are set to 01, 11, and 00 respectively.

The number of neurons in the hidden layer is set to 60 and correction can be made to 60 inputted pattern. The number of neurons in the output layer is set to 8 such that 8 subdots can be outputted as in the embodiment shown in FIG. 48.

The operation with the system configuration of the second embodiment is described below.

First, data (1 for black and 0 for white) of each picture element in a 7×9-dot window, that is, 63-bit picture element data, are stored from the data segmenter (not shown in FIG. 54) to the shift register before the hidden layer. Then, the 63-bit picture element data in the shift register are simultaneously applied to each of the neurons 95-1–95-60 in the hidden layer of the neural network through the neurons in the input layer not shown in the figure.

Two AND gates 96*a* and 96*b* are provided in each of neurons 95-1–95-60 for one picture element. Accordingly, each of neurons 95-1–95-60 comprises a total of 126 AND gates 96*a*-1–96*b*-63. A 2-bit coefficient obtained by a learning for each picture element posit ion is inputted to AND gates 96*a*–96*b*, each bit being inputted to each terminal. Therefore, AND gates 96*a* and 96*b* multiply picture element data by a coefficient.

As shown in FIG. 32, the neurons in the hidden layer are provided for detecting a specific pattern. Since a coefficient is set to 00 for a don't-care picture element in the pattern, the output from AND gates 96*a* and 96*b* is always 0, thereby never affecting the result of an addition. Accordingly, AND gate circuits for don't care picture elements can be omitted from neurons 95-1–95-60 including their connection lines. This means that the number of bits applied to an adder 97 is 126 bits at maximum, but it can be reduced depending on the number of omitted AND gates.

The content in the adder 97 is incremented if image data to be displayed as black, that is, "1" is applied to an AND gate in which "01" is set as its coefficient. The adder 97 is decremented if "black", that is, data "1" is applied to an AND gate in which "11" is set as its coefficient. The adder 97 comprises a plurality of adders for adding outputs from adjacent AND gates and those for adding outputs from adjacent adders, all these adders being configured in the form of a pyramid. It is determined after checking the correction patterns that about 20 bits out of 63 bits of picture elements should be either white or black. Therefore, an output from the adder 97 is within the range −20–+20, and the number of bits outputted from the adder 97 can be only 6 bits including a sign bit. The sum of products for the 63-bit inputted data is provided for a register 99, and processed by a Sigmoid function or a step function, that is, a scaling. The transformation result is stored in a register 101. An output from each neuron in the hidden layer can be represented by 1 or 0, that is, by 1 bit to output the existence of a specific pattern.

The above described process corresponds to one cycle of the operation of neurons in the hidden layer performed on 1-window data. Since 60 neurons 95-1–95-60 in the hidden layer are operated concurrently, the content in the register 101 is determined simultaneously for all neurons in the hidden layer.

The operation of neurons 102-1–102-8 in the output layer is almost the same as that of neurons in the hidden layer. That is, outputs of a total of 60 bits from 60 neurons 95-1–95-60 in the hidden layer are simultaneously inputted to 8 neurons 102-1–102-8 in the output layer. Each of neurons 102-1–102-8 in the output layer is provided with 60 AND gate circuits 103-1–103-60. A coefficient of 1 or 0 is inputted to one of the input terminals of each AND gate circuit 103. Each AND gate circuit 103 multiplies an output received from a neuron in the hidden layer by this coefficient. The result is added by an adder 104. The addition result of each of the neurons 102-1–102-8 in the output layer is stored in registers 105 and 106 in neurons 102-1–102-8, and synchronously outputted in 8-bit units to a print head controller.

A coefficient inputted to one input terminal of the AND gate 103 in a neuron in the output layer occupies 1 bit because a neuron in the hidden layer corresponds to a pattern to be detected. That is, if an inputted image pattern is set in a neuron in the hidden layer, a value anticipated as an output from a neuron in the output layer is used "as is" as a coefficient value. This can be realized by a 1-bit output from a neuron in the output layer and by an exclusive pattern assigned to a neuron in the hidden layer.

FIG. 58 is an operational timing chart for explaining the second embodiment shown in FIG. 57. If 63 bits of window image data are applied simultaneously to neurons 95 in the hidden layer as shown in FIG. 58, the adder 97 obtains an addition result from these input data, the result is stored in the register 99 at the timing A, the scaling result obtained by the ROM 100 is stored in the register 101 at the timing B, and thus the output from the neuron in the hidden layer is determined. Each of the neurons 102 in the output layer performs an arithmetic operation using the determined output from the neurons in the hidden layer, the result is stored in the register 105 at the timing C, and the determined output from the neurons in the output layer is transmitted to the print head controller at the timing D.

Figure 59:
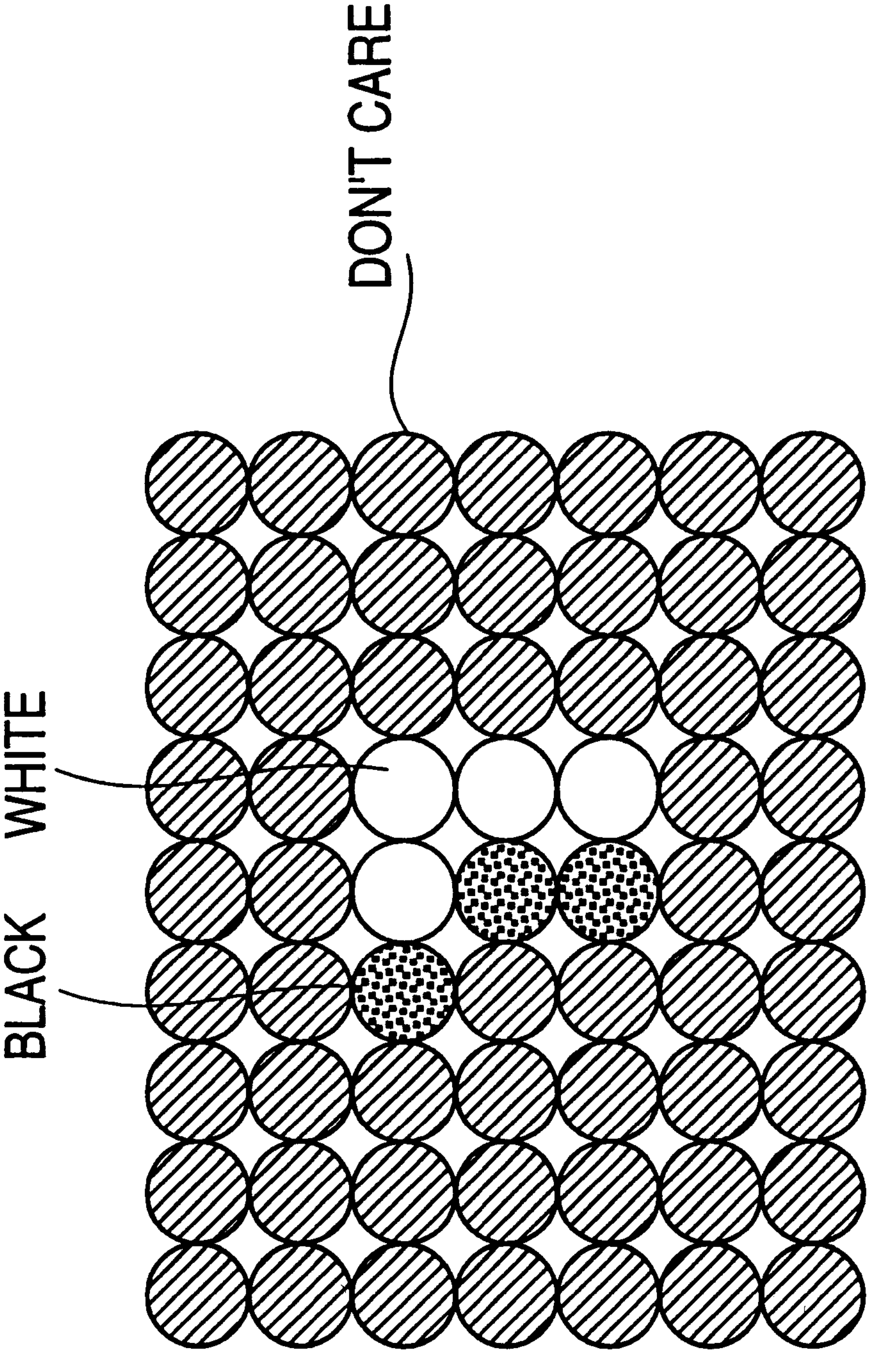
FIG. 59 shows an example of a pattern to be corrected.

FIG. 59 is a block diagram for explaining the configuration of the adder 97 in a neuron in the hidden layer and the adder 104 in a neuron in the output layer shown in FIG. 57. As shown in FIG. 59, a plurality of adders (for obtaining a sum of A and B) are connected in the form of a pyramid in which a constant term in expression (1) and, for example, an output from sixty AND gates 103-1–103-60 in a neuron when the adders are in a neuron in the output layer are applied to the adder in the first stage. The addition results are converged through a plurality of adders, and the final result is outputted from the adder in the top stage.

FIGS. 57 and 58 shows the coefficient of input connection to neurons 95-1–95-60 in the hidden layer, that is, a coefficient, after learning. The leftmost numbers 1–60 indicate a number of a neuron in the hidden layer; the numbers 1–63 in the uppermost line indicate a total of 63 inputs, that is, a number of input to each dot shown in FIG. 16 and a constant term $k_o^n$ in expression (1). For readability, signs + and − are not used except in the constant term. Thus, 2 indicates a coefficient 0; 0 indicates a coefficient −1; and 1 indicates a coefficient +1.

The pattern shown in FIG. 59 indicates a pattern detected by one of the 60 neurons in the hidden layer, for example, the 25th neuron shown in FIGS. 57 and 58. Since this pattern contains 56 don't care dots, the 25th neuron can perform a correction on $7\times10^{16}$ patterns.

The learning process is not required for all the above described patterns in the learning process in the neural network. For example, an unlearned pattern can be corrected by repeating a learning process for 57 patterns containing all 56 don't care dots indicating "white" or containing any one dot indicating "black". In this case, the similarity of an inputted picture element pattern to its teaching pattern can be restricted optionally according to the transformation characteristic of a Sigmoid function or a step function.

Figure 60:
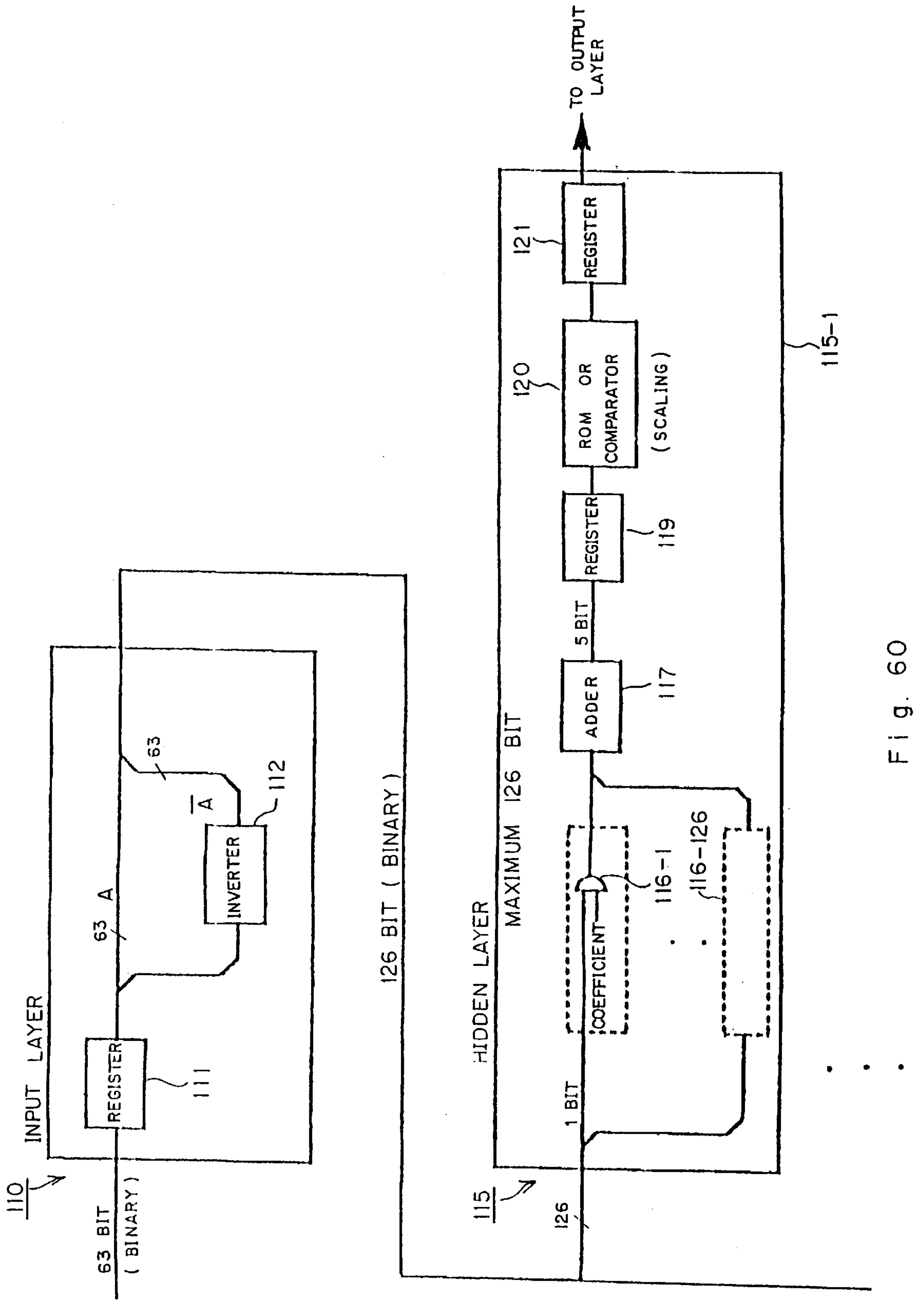
FIG. 60 is a block diagram for explaining the configuration of a neuron in the input and the hidden layers of the third embodiment of the image forming apparatus according to the second principle of the present invention.

FIG. 60 shows the system configuration of the third embodiment of the image forming apparatus according to the second principle of the present invention. In this embodiment, the configuration of and after the output layer is the same as that of the second embodiment shown in FIG. 54. Therefore, the explanation and figures involved are omitted here. The embodiment shown in FIG. 60 is different from that shown in FIG. 54 in that in response to 63-bit inputted dot image data from the data segmenter (not shown in FIG. 60), a total of 126 bits comprising a non-interted input A which is an inputted dot image data value as is, that is, an output from a register 111, and an inverted image *A which is obtained by inverting the inputted dot image data value by, for example, an inverter 112 are applied in parallel to neurons 115-1–115-60 in the hidden layer, and in that a binary number 1 or 0 occupying 1 bit is applied as a coefficient to 126 AND gates 116-1–116-126 in 60 neurons 115-1–115-60 in the hidden layer. Therefore, 126-bit data are outputted from the input layer 110 and 126-bit data are determined simultaneously and outputted to neurons 115-1–115-60 in the hidden layer.

A constant used in this embodiment of a picture element to be displayed as black is "1" for a non-interted input A, and that of a picture element to be displayed as white and don't-care is "0" for an inverted input * A. That is, since each bit for a non-interted input A and an inverted input *A is simultaneously and independently inputted in parallel to each neuron, the above described settings are effective, causing no problems at all. Defining a coefficient as described above enables the coefficient for each of the 60 neurons in the hidden layer to be represented by 1 bit.

An output from an AND gate for a coefficient 0 and a non-interted input A or an inverted input *A always results in "0", never affecting the result of an addition at all. Therefore, an AND gate including its connection line can be omitted for inputted data having a coefficient of 0.

Since the coefficient occupies 1 bit without a sign, an output from an adder 117 is within the range of 0–20, and the number of output bits of the adder 117 is 5.

Figure 61:
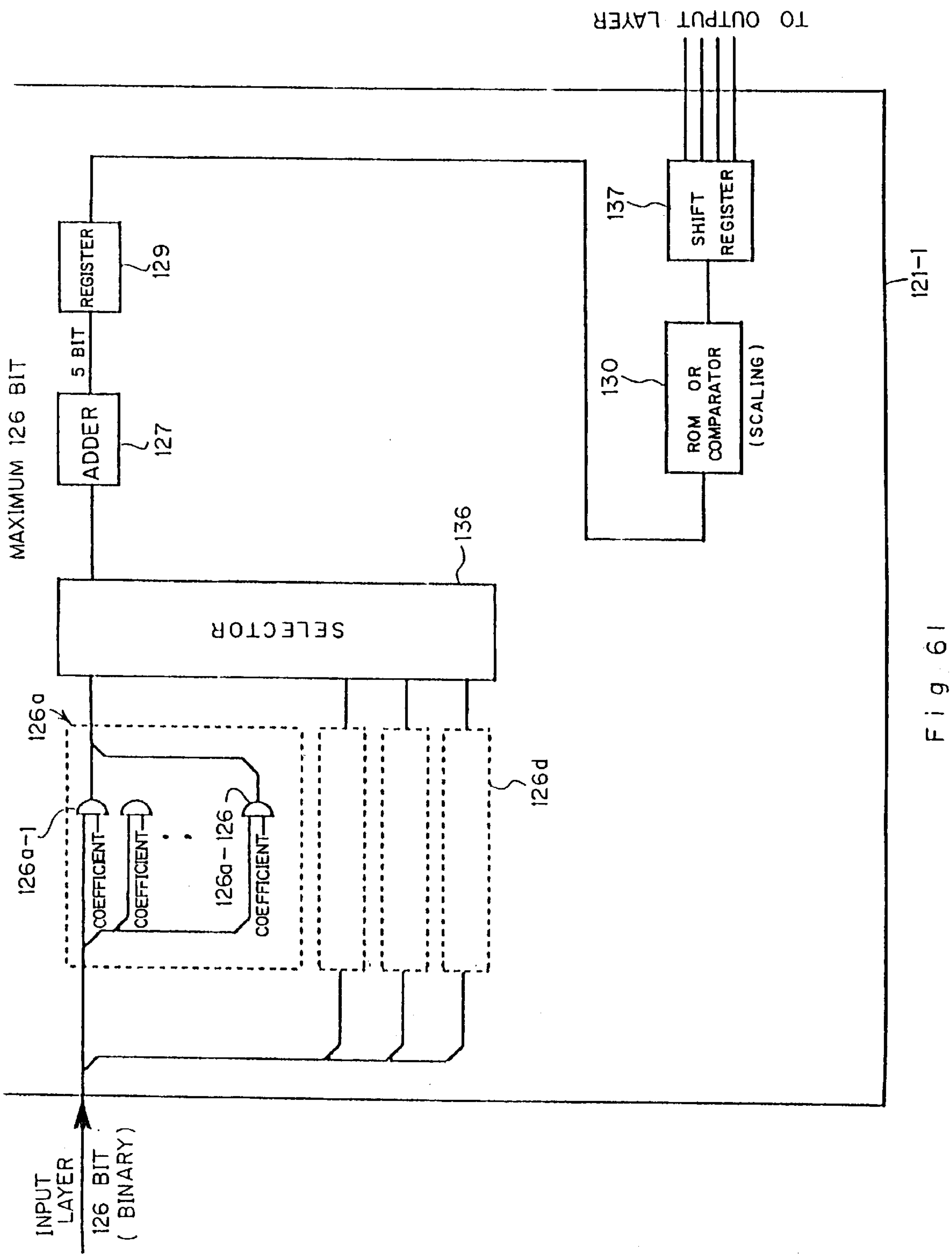
FIG. 61 is a block diagram for explaining the configuration of a neuron in the hidden layer of the fourth embodiment of the image forming apparatus according to the second principle of the present invention.

FIG. 61 shows the system configuration of the fourth embodiment of the image forming apparatus according to the second principle of the present invention. The input layer shown in FIG. 61 is the same as the input layer 110 shown in FIG. 60. The input layer applies to each of the neurons in the hidden layer of the neural network a total of 126 bits of the non-interted input A and the inverted input *A of 63-bit inputted dot image data provided by the data segmenter (not shown in FIG. 61). The neural network is provided with 15 neurons 121-1–121-15 in the hidden layer. Each of the neurons 121-1–121-15 is provided with 4 AND gate groups 126*a*–126*d* as shown in FIG. 61. A coefficient corresponding to the above described 126-dot pattern is applied to AND gate group 126*a*. A coefficient corresponding to a pattern obtained by inverting this pattern up to down is applied to AND gate group 126*b*. A coefficient corresponding to a pattern obtained by inverting this pattern right to left is applied to AND gate group 126*c*. A coefficient corresponding to a pattern obtained by inverting this pattern up to down and right to left is applied to AND gate group 126*d*. Like in the hidden layer shown in FIG. 60, the coefficients are applied to each of the AND gate groups 126*a*-1–126*d*-126 in 1 bit. AND gates can be omitted here including their connection lines for inputted data whose coefficient is 0.

Figure 64:
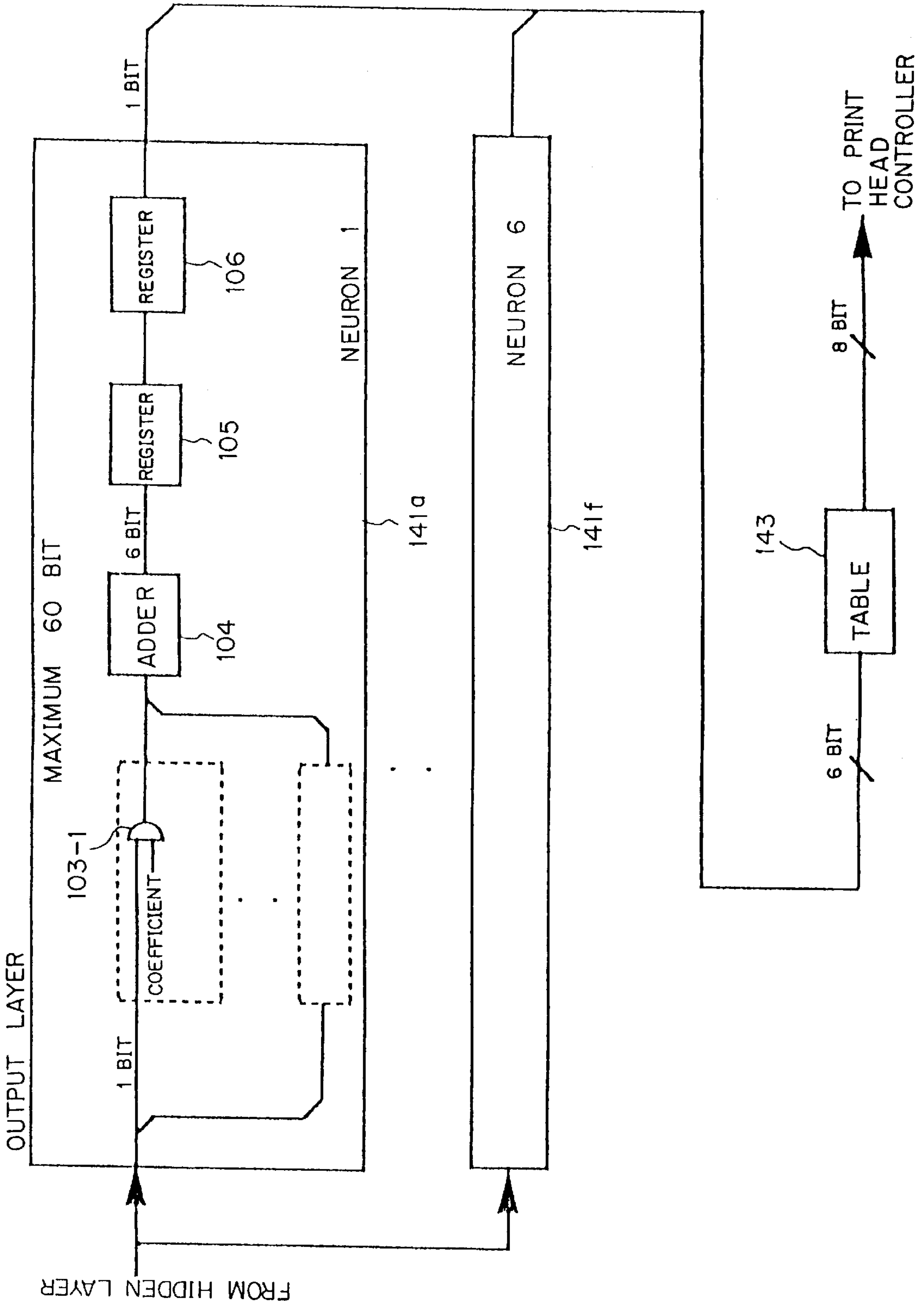
FIG. 64 is a block diagram for explaining the configuration of and after the output layer of the fifth embodiment of the image forming apparatus according to the second principle of the present invention.
Figure 65:
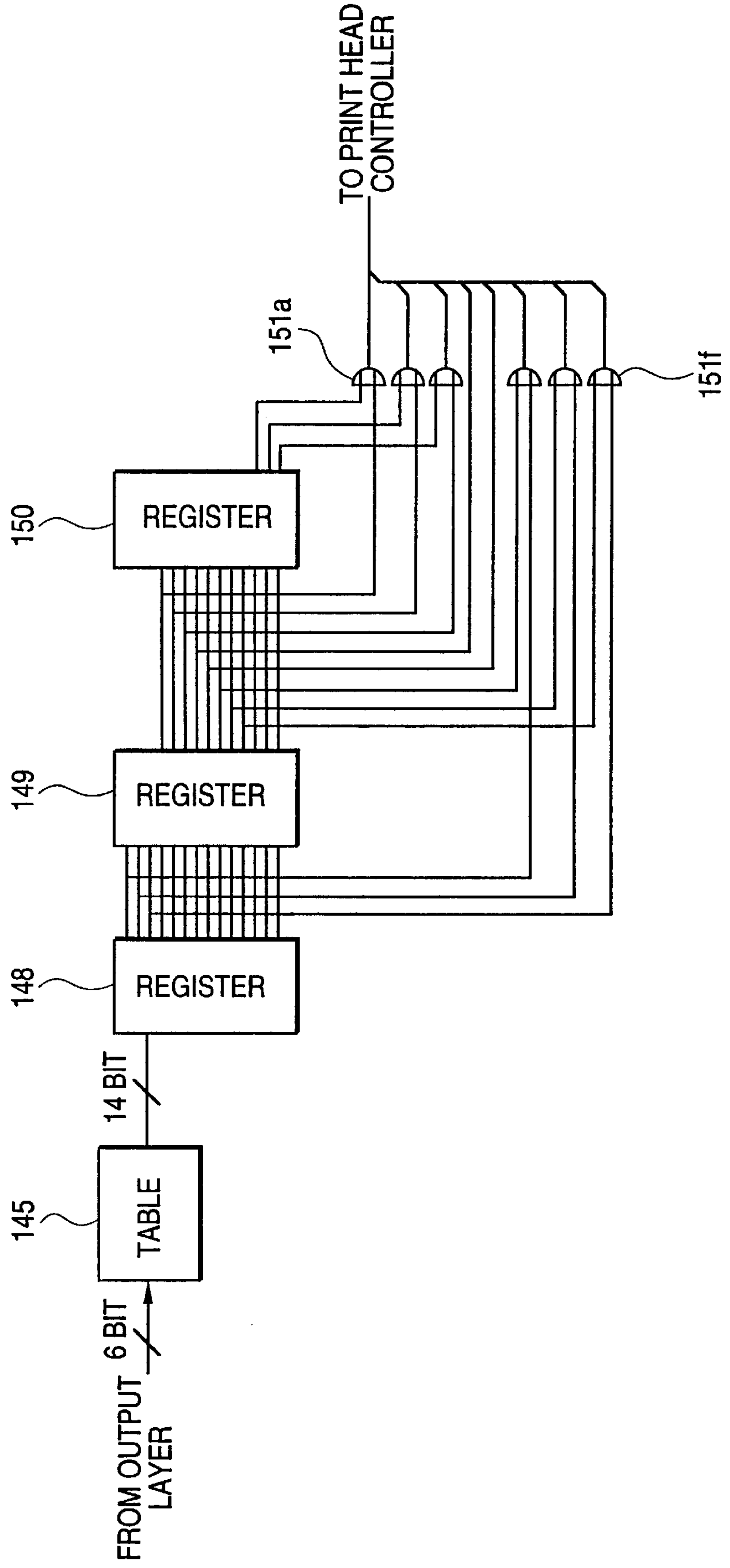
FIG. 65 is a block diagram for explaining the configuration of the neuro output unit of the sixth embodiment of the image forming apparatus according to the second principle of the present invention.

For example, as in the third embodiment shown in FIG. 64, the addition of a constant term in expression (1) can be omitted in the fourth embodiment shown in FIG. 65. This can be realized by absorbing the value of the constant value by modifying the threshold of a step function when it is used in a scaling operation by the ROM 130.

Figure 62:
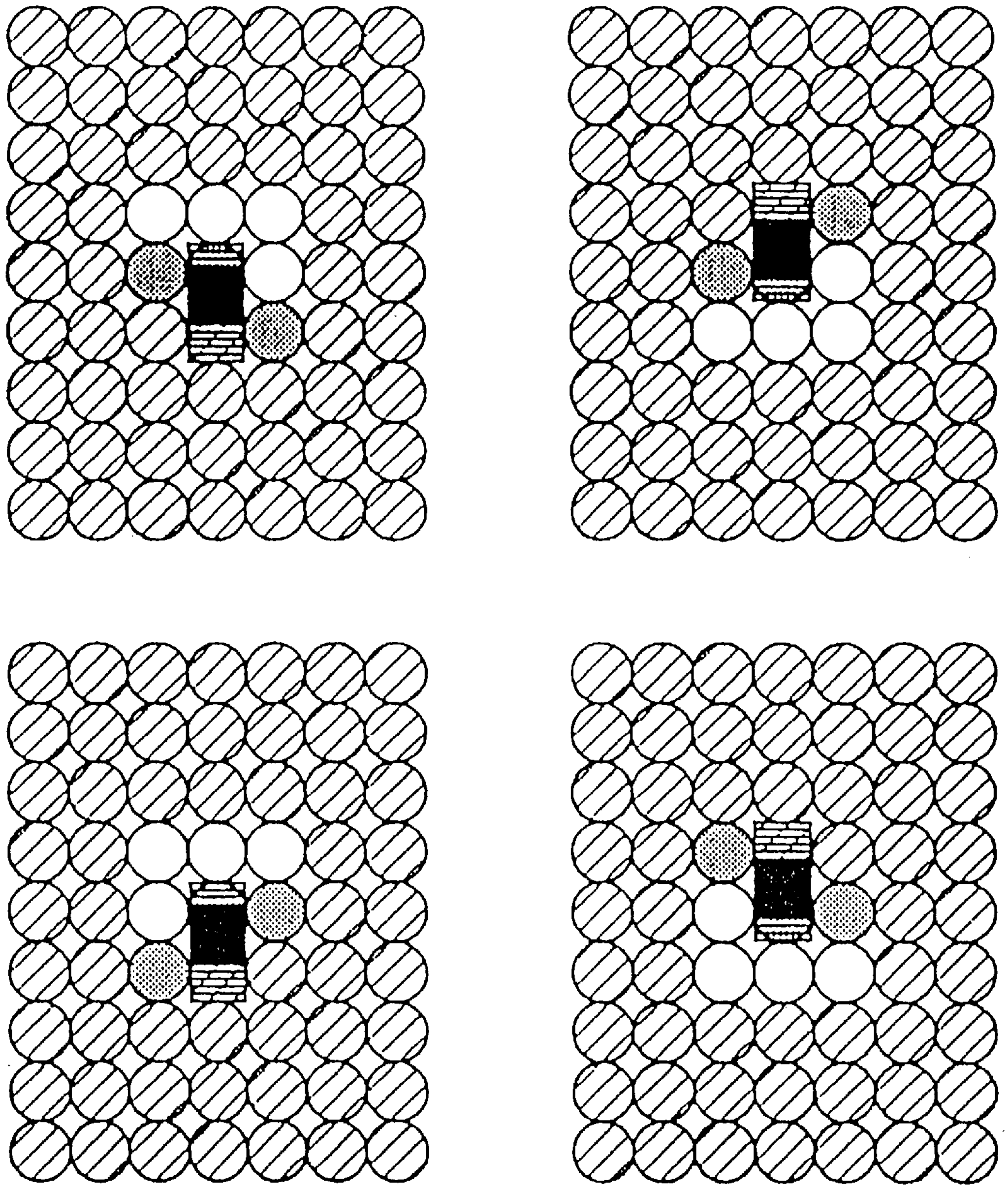
FIG. 62 shows a conversion result of a corrected pattern.

FIG. 62 shows dot patterns processed by each of AND gate groups 126*a*–126*d* and their correction results (teaching patterns) by referring to the patterns shown in FIG. 59. As indicated in FIG. 62, the correction result for each pattern is similar to the others, thereby requiring the standardization of circuits. That is, in FIG. 61, the circuits after the adder 127 can be used in a time divisional manner.

Four patterns shown in FIG. 62 are the same in dot size after correction and differ in shift direction only. Therefore, they can be easily referred to when processed separately.

Figure 66:
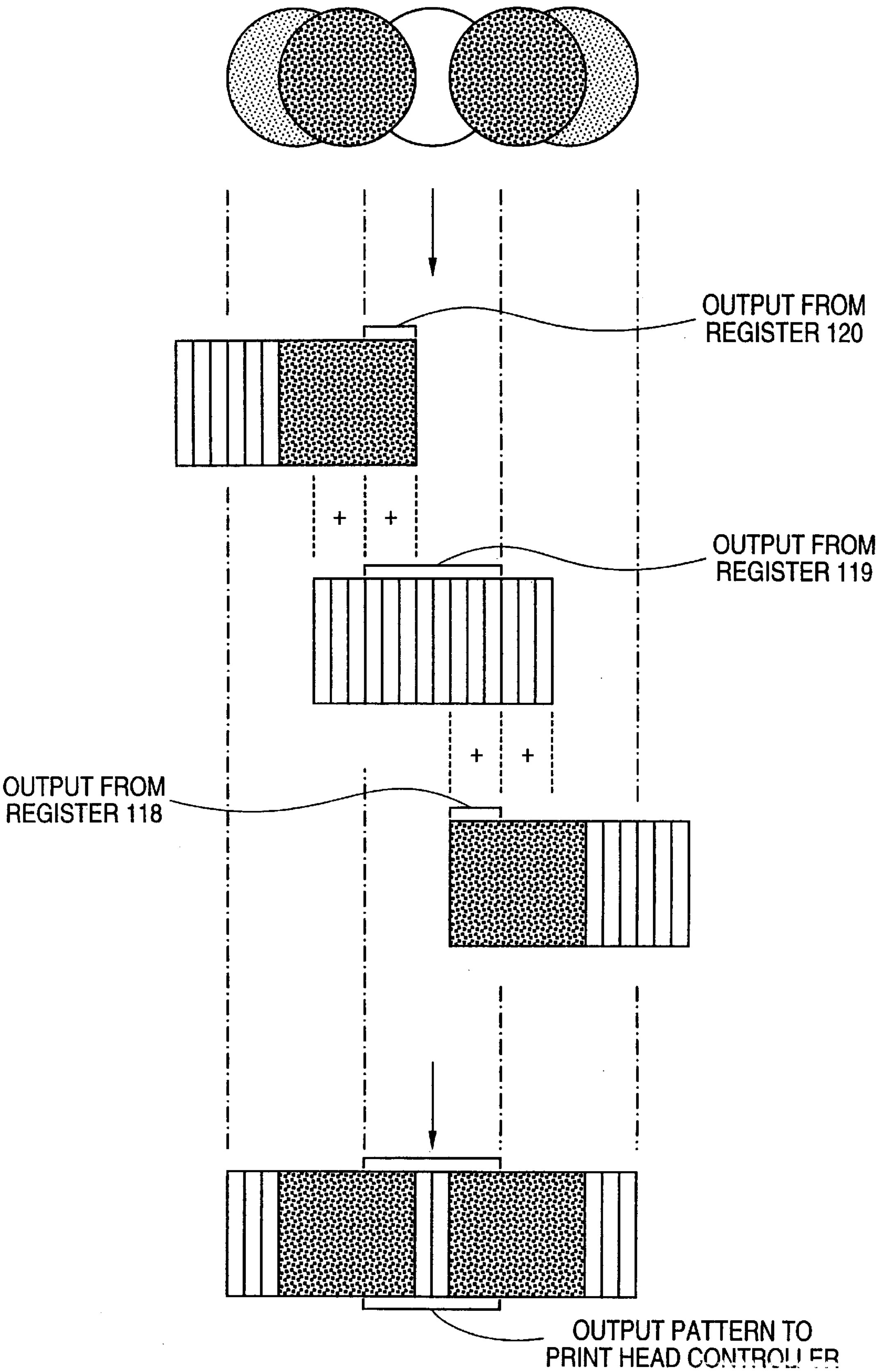
FIG. 66 is a descriptive view of generating a subdot.

That is, in the subdot pattern for the central dot in a window in FIG. 66, the size of a dot is not changed, but its position is shifted only.

Figure 63:
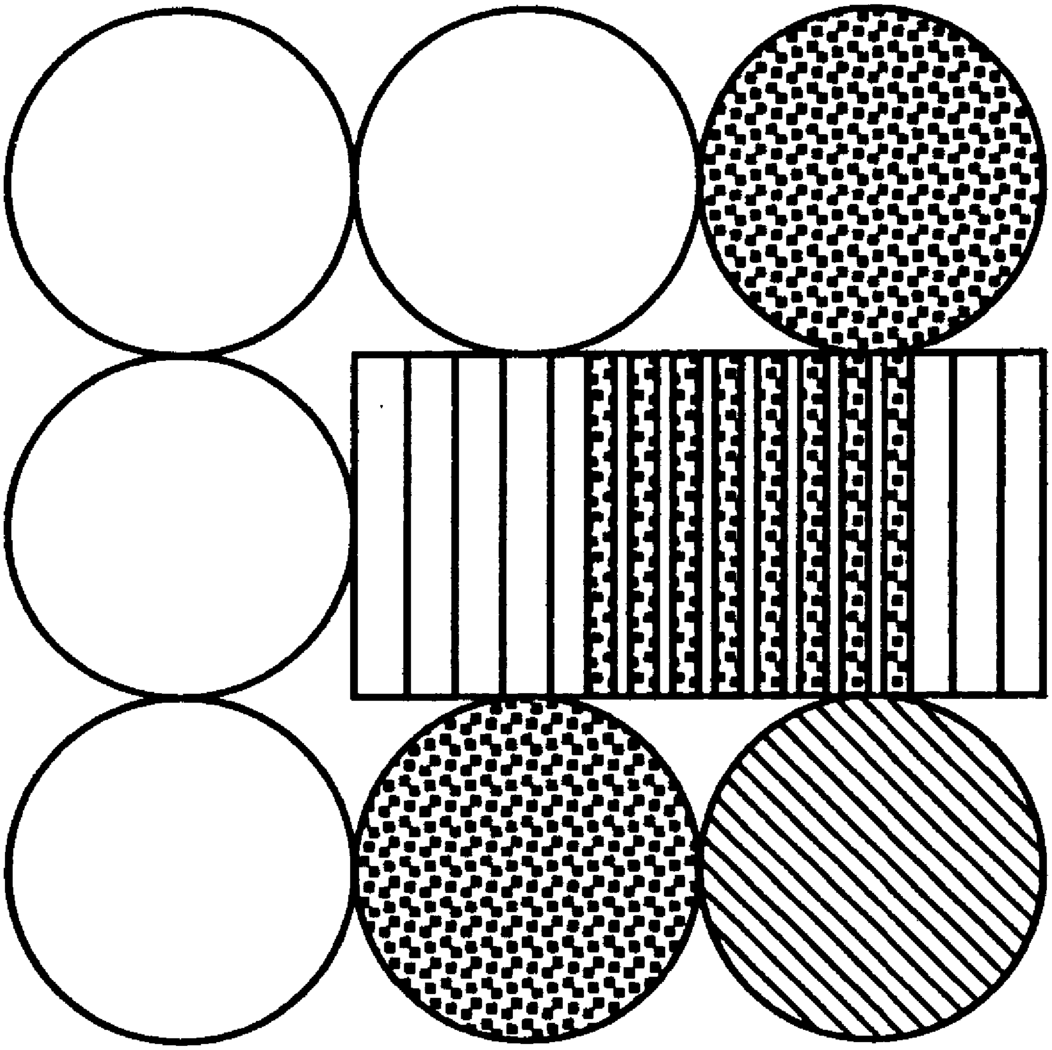
FIG. 63 is an enlarged view of the subdot pattern shown at the lower left corner in FIG. 62.

FIG. 63 shows an enlarged view of the subdot pattern shown at the lower left corner in FIG. 62. The enlarged views for the other 3 patterns can be obtained only by inverting it respectively. In FIG. 63, the subdot pattern corresponding to the inputted data for the central picture element in a window indicates all black for 8 subdots each being shifted to right by 3/8 dot. In FIG. 62, two subdot patterns are indicated because actual printing position for one dot covers 2-dot areas due to the shift to right or left.

In FIG. 61, first, a selector 136 applies only an output from AND gate group 126*a* to an adder 127. The sum is stored in a shift register 137 after scaled by a via register 129, and a ROM or a comparator 130 using a step function. The scaling results for the 4 patterns can be stored in the shift register 137 by selectively outputting the outputs from AND gate groups 126*a*–126*d* after the operation performed by the selector 136.

Thus, in the embodiment shown in FIG. 61, since 4-bit outputs can be obtained through each of 15 neurons 121-1–121-15 in the hidden layer, a total of 60 bits are applied from units 121-1–121-15 in the hidden layer of the neural network to its output layer (not shown in FIG. 61). In this embodiment, the configuration of and after the output layer is the same as that of the second embodiment shown in FIG. 54.

FIG. 64 shows the configuration of and after the output layer of the fifth embodiment of the image forming apparatus according to the second principle of the present invention.

It is different from other embodiments in that it has an output layer in which the number of neurons, that is, 6 neurons 141*a*–141*f*, is smaller than that of subdot divisions while, in the other embodiments, the number of neurons in the output layer is equal to that of subdot divisions (8) forming one dot of an inputted dot image. In this embodiment, neurons 141*a*–141*f* are used for learning, and a table 143 is referred to through the output from the output layer to obtain a subdot pattern shown in FIG. 7. Since much learning time is required for generating a subdot pattern directly by the neural network, this embodiment uses an output from the neural network as a kind of code associated with a correction operation, resulting in the same output as that of the first principle. That is, when the number of neurons in the output layers is 6 as shown in FIG. 64, 2 neurons out of 6 represent the positions of dots, and the remaining 4 neurons represent the dot size. The combination of the output from these 6 neurons refers to the table 143 so that 8 subdot signals can be generated and outputted. The detailed configuration of each of neurons 141*a*–141*f* in the output layer can be the same as that of the neurons in the output layer shown in FIG. 54 if the configuration of the input and intermediate layers are those shown in FIG. 54, 60, or 61. The table 143 stores the correspondence data between the outputs and the corresponding subdot patterns shown in FIG. 7 and the patterns.

Therefore, the print head controller generates a pulse signal which indicates "ON" for the value of "1" in 8 subdots in the time width forming a picture element. A static latent image can be formed on a photoconductive drum.

FIG. 65 shows the configuration of the neuro output processor in the sixth embodiment of the image forming apparatus according to the second principle of the present invention.

It is different from the embodiment shown in FIG. 64 in that a 14-bit correction signal is generated by applying an output from 6 neurons in the output layer to a conversion table 145. That is, a conversion result can be effective covering 2 dot areas in inputted dot image data when a conversion is performed from 1 dot to a plurality of subdots for a pattern other than some teaching patterns shown in FIGS. 49–52. In the embodiment shown in FIG. 49, each pattern is learned separately. However, there can be only one teaching pattern if the neural network shown in FIG. 65 outputs a code associated with a correcting operation. That is, patterns must be made for the number of necessary pattern forms such that the number of bits covering the adjacent dot areas is added to the right and left of the bit configuration.

In this embodiment, a conversion table 145 is configured such that the number of subdots covering its right and left subdots is 3, thereby generating a 14-bit pattern. An output of the table 145 is sequentially applied to registers 148–150. Since the scanning direction in a segmented window is the same as that of a laser light of an electronic photograph printer, that is, an output unit, a content of a register 150 indicates the subdot information of the preceding, that is, the left, picture element assuming that the content of the register 149 indicate data of the central picture element. Thus, the content in register 148 indicates the subdot information of the following, that is the right, picture element. Accordingly, the subdot information covering the preceding and the right picture elements and the subdot information covering the following and the left picture elements are ANDed by OR circuits 151*a*–151*f* as the subdot information at a predetermined position. FIG. 66 shows this as a descriptive pattern.

FIG. 70 shows how the inputted dots "black, white, black" in this order are shifted. The leftmost black dot is shifted to right by 3/8 dot, and the rightmost black dot is shifted to left by 3/8 dot. FIG. 70 shows how the subdot pattern for the originally white dot in the center is outputted to a print head controller. The output pattern to be outputted to the print head controller is indicated, in the center at the bottom in FIG. 70, as a portion segmented by a dashed line.

Figure 69:
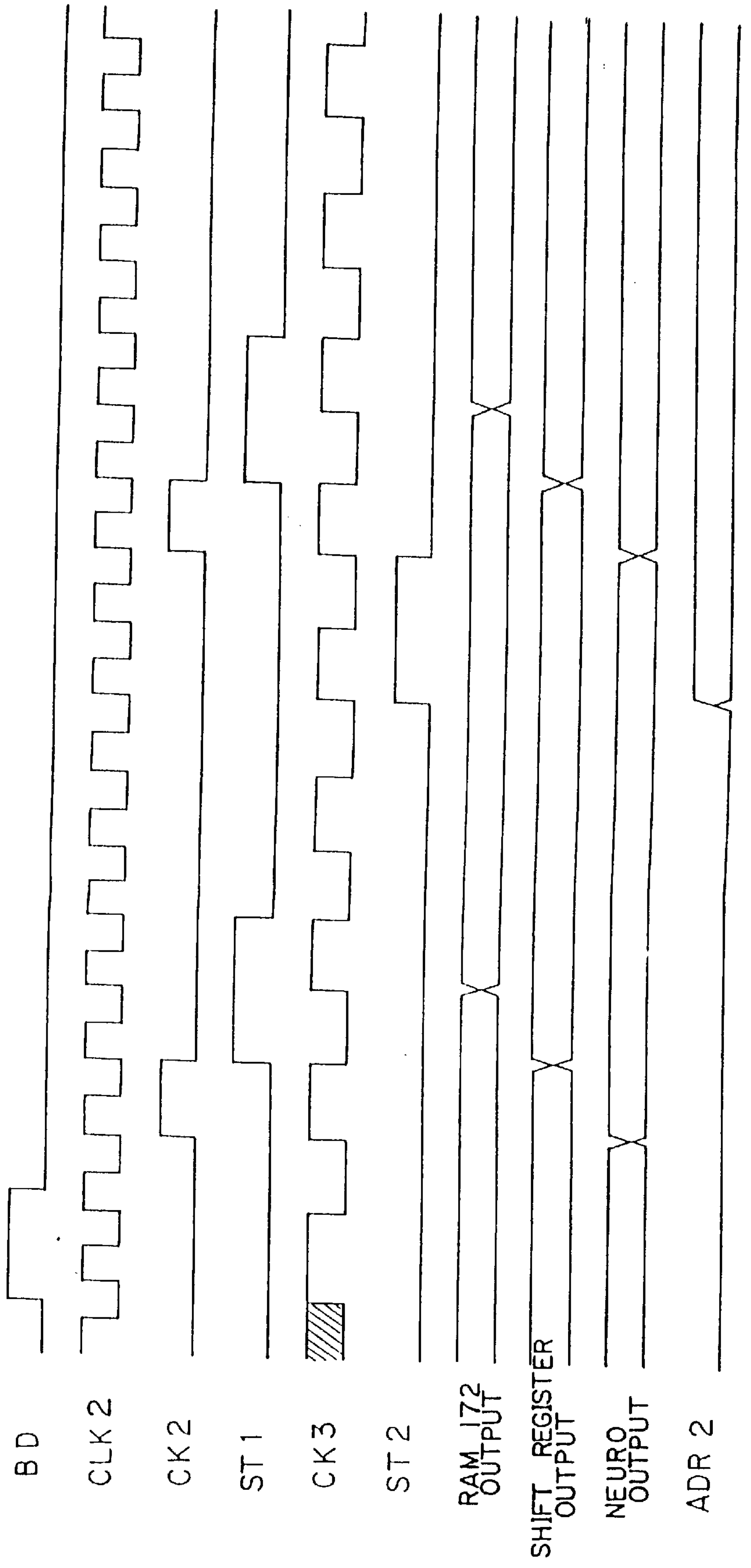
FIG. 69 is a timing chart 2 of the operation of the image quality correcting circuit shown in FIG. 67.

The register 150 shown in FIG. 69 outputs 3 rightmost subdot patterns in the subdot patterns at the top (all black) in FIG. 70; the register 149 outputs the central 8 subdot patterns in the second row (all white); the register 148 outputs 3 leftmost subdot patterns in the third row (all black). The logical sum of these data is obtained by OR gates 151*a*–151*f*, and the result is outputted to a print head controller.

In the above described example, 1 dot is divided into 8 subdots. However, the dot can be divided into a different number of subdots. Additionally, it can be divided in the vertical scanning direction as well as the horizontal scanning direction.

Figure 67:
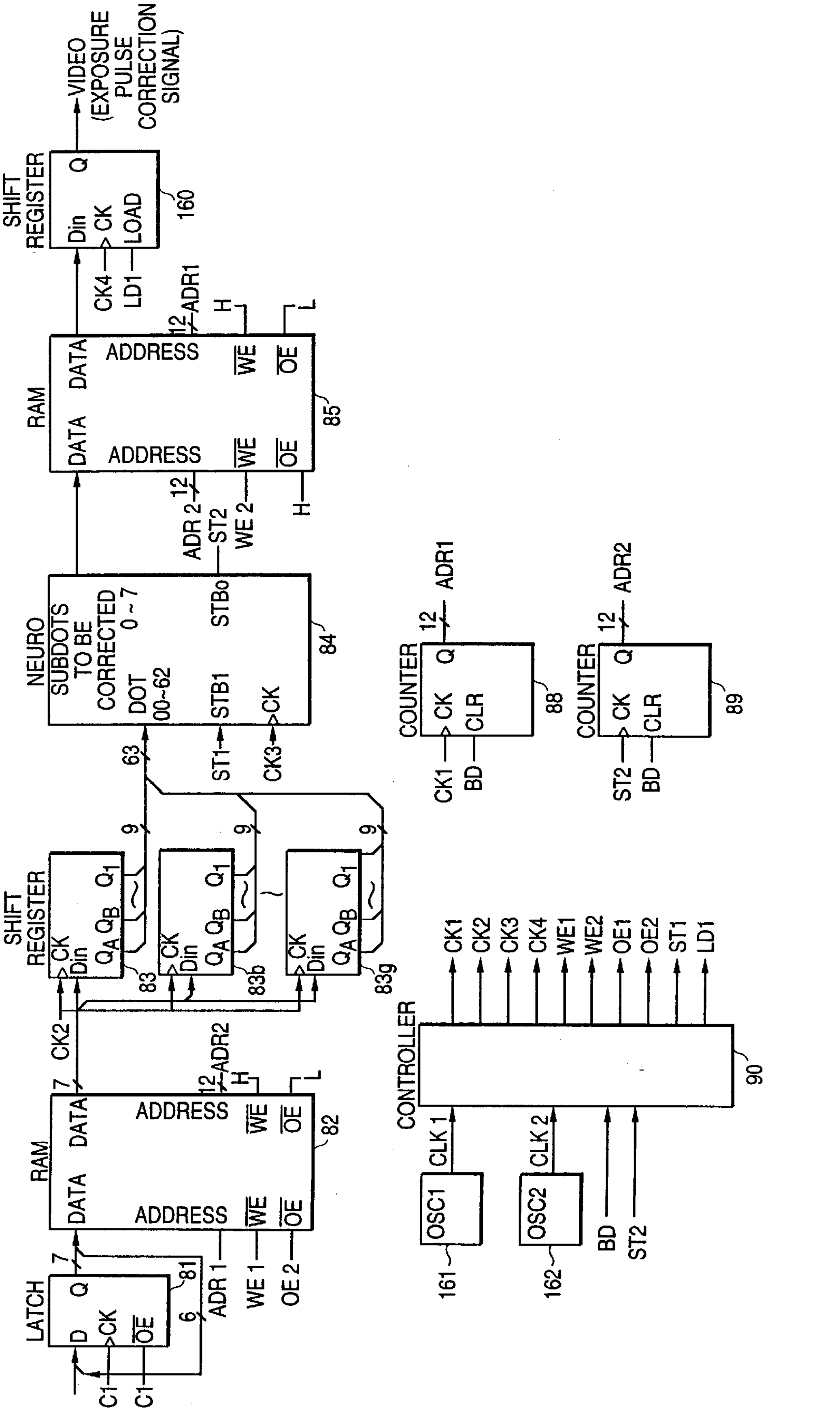
FIG. 67 is a block diagram for explaining the detailed configuration of the image quality correcting circuit according to the second principle of the present invention.

FIG. 67 shows the embodiment of the image quality correcting circuit in a printer shown in FIG. 38 according to the second principle of the present invention. The configuration of this circuit is similar to that shown in FIG. 39 except that 7×9 dot data are inputted to the neuro 84 and that the subdot pattern data outputted from the RAM 85 are converted in serial/parallel by a shift register 160 and transmitted as an exposure pulse correction signal to the printing mechanism as is. FIG. 67 shows two oscillators 161 and 162 for generating a clock signal.

Figure 68:
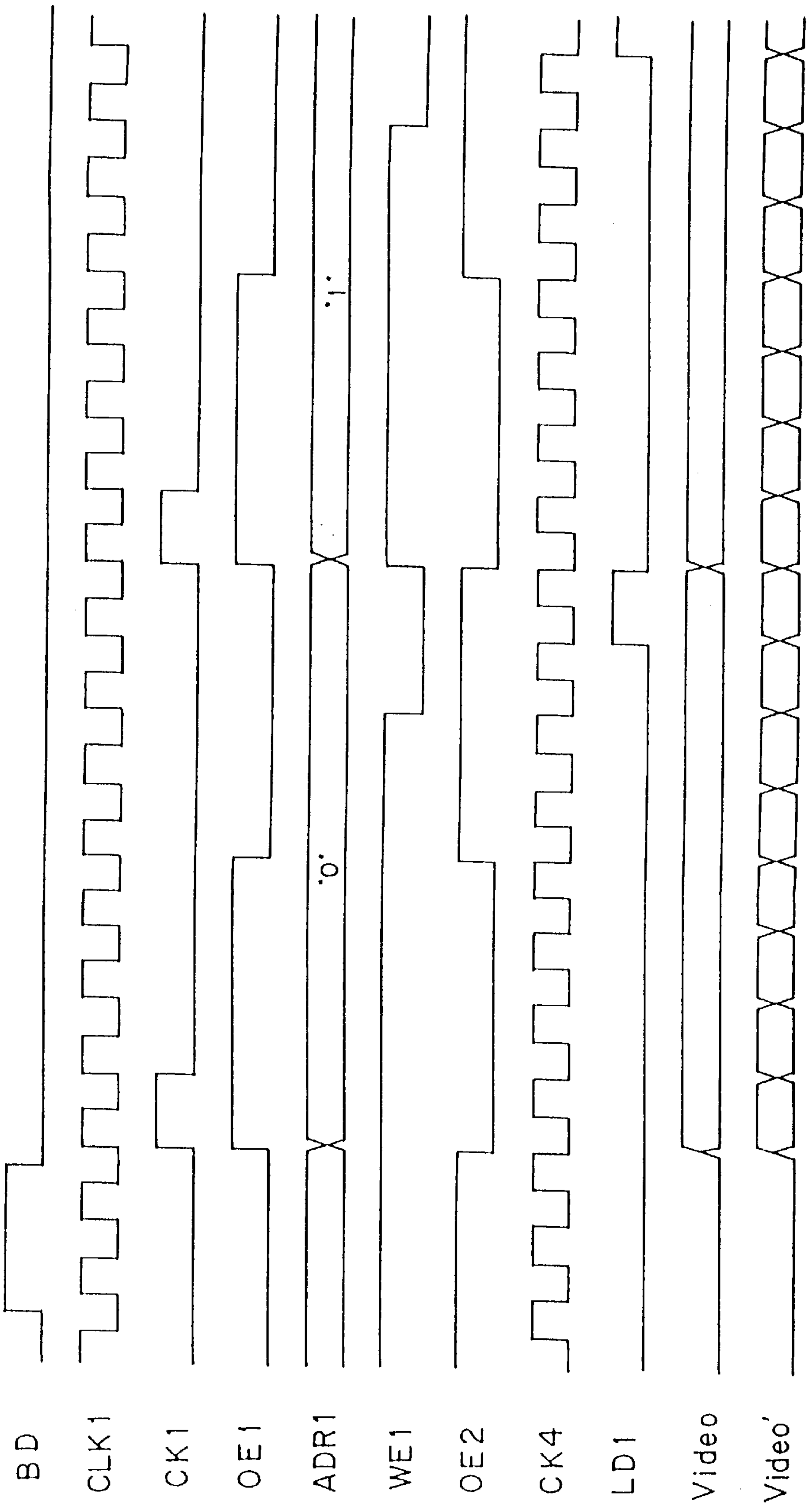
FIG. 68 is a timing chart 1 of the operation of the image quality correcting circuit shown in FIG. 67.

FIGS. 68 and 69 are timing charts for explaining the operation of the image quality correcting circuit. When an optical sensor provided at the end of the laser light scanning area inputs a beam detection signal (BD) for indicating the detection of a laser light, the counters 88 and 89 shown in FIG. 67 are reset and data are applied according to the video data clock (VDCLK=CK1) from the controller 60 shown in FIG. 38 to the RAM 82 through the latch 81.

The write of data to the RAM 82 from the latch 81 is controlled according to an address ADR1 from the counter 88, an output enable signal OE1, and a write enable signal WE1. The read of data from the RAM 82 to the latch 81 is controlled according to an output enable signal OE2 and a video data clock CK1 while data are not being written to the RAM 82 (while a write enable signal WE1 is OFF).

When 1-line data at addresses 0–N are inputted, the write of data is disabled to prevent the write of invalid out-of-area data from being written until the next BD signal is inputted. If a 8×11-inch printing form is fed in the longer side direction with the resolution of 300 dots/inch, N=2560 approximately.

Data are outputted from the RAM 82 according to an address ADR2 outputted from the counter 89. The outputted data are applied to shift registers 83*a*–83*g* in synchronous with clock CK2. The data inputted to shift registers 83*a*–83*g* are converted in serial/parallel, and the 63-bit data are simultaneously applied to the neural network 84 in synchronous with input strove signal ST1. In the neural network 84, an arithmetic operation is performed in synchronous with clock CK3 using the circuit configuration of the input layer 110 shown in FIG. 60, the hidden layer 121 shown in FIG. 61, the output layer 141 shown in FIG. 64, and the neuro output unit shown in FIG. 65. After a process is completed by the neural network 84, an 8-bit image correction signal (comprising correction subdots 0–7) outputted from the circuit shown in FIG. 65 is outputted in synchronous with output strove signal ST2. This image correction signal is stored in the RAM 85 according to address ADR2 from the counter 89 and write enable signal WE2.

The data stored in the RAM 85 are sequentially read starting from address 0 according to address ADR1 outputted from the counter 88. The data read from the RAM 85 are loaded to a shift register 160 according to load signal LD1 to the shift register 160. The loaded data are outputted sequentially, starting from subdot 0, from the shift register 160 to the optical unit 76 in synchronous with clock CK4.

Thus, the optical unit 76 applies to a laser diode a drive pulse signal having the pulse width according to a pattern comprising 8 sequentially inputted subdots.

Next, the embodiment of the third principle is described. According to the third principle, the central dot in a window together with its right and left dots are divided into three, and each of a total of 9 small dots is corrected.

Figure 70A:
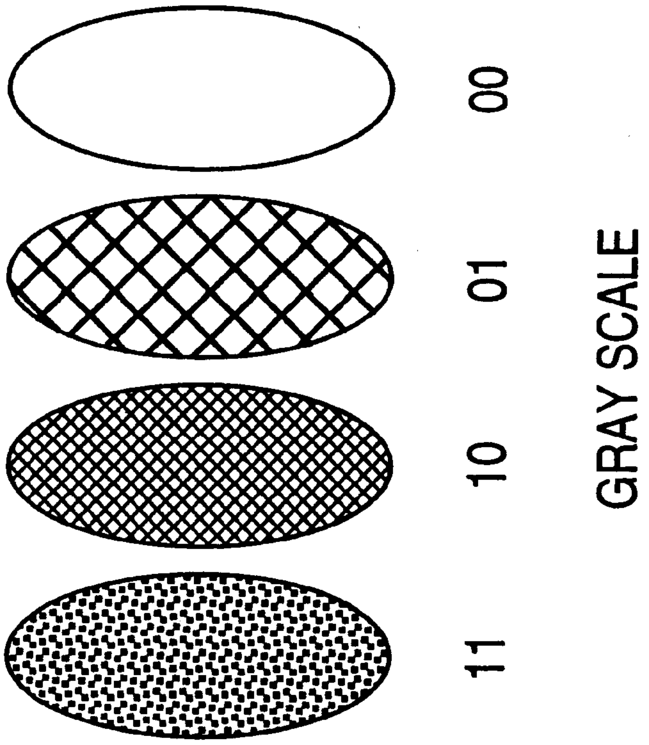
FIG. 70 shows an embodiment of the gray scale of divided picture elements according to the third principle of the present invention.
Figure 70B:
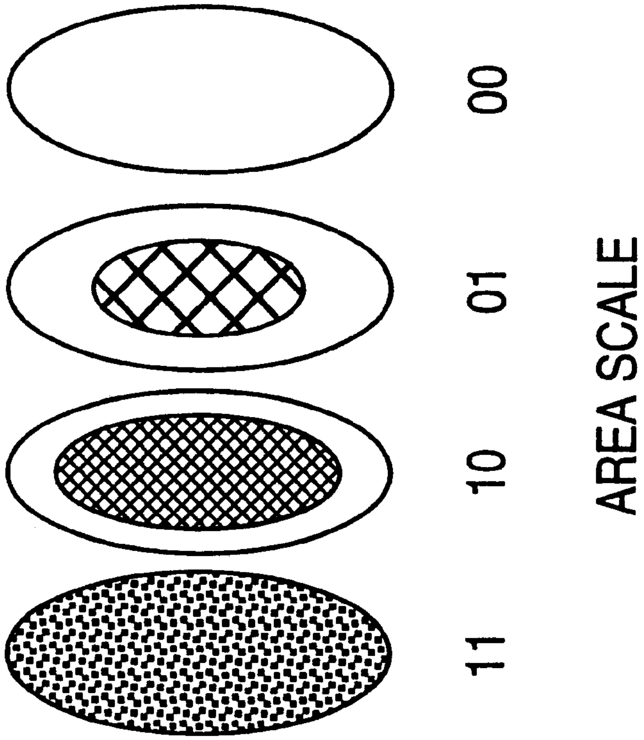

FIG. 70 shows an embodiment of a gray scale of each picture element when the central, left, and right picture elements in a window are divided into N divisions, for example, 3 parts in the third principle of the present invention. FIG. 70A shows an example of a gray scale; FIG. 70B shows an example of an area scale. The divided picture elements are represented by a 4-grade scale, and each piece of the data occupy 2 bits: 00–11.

Figure 71:
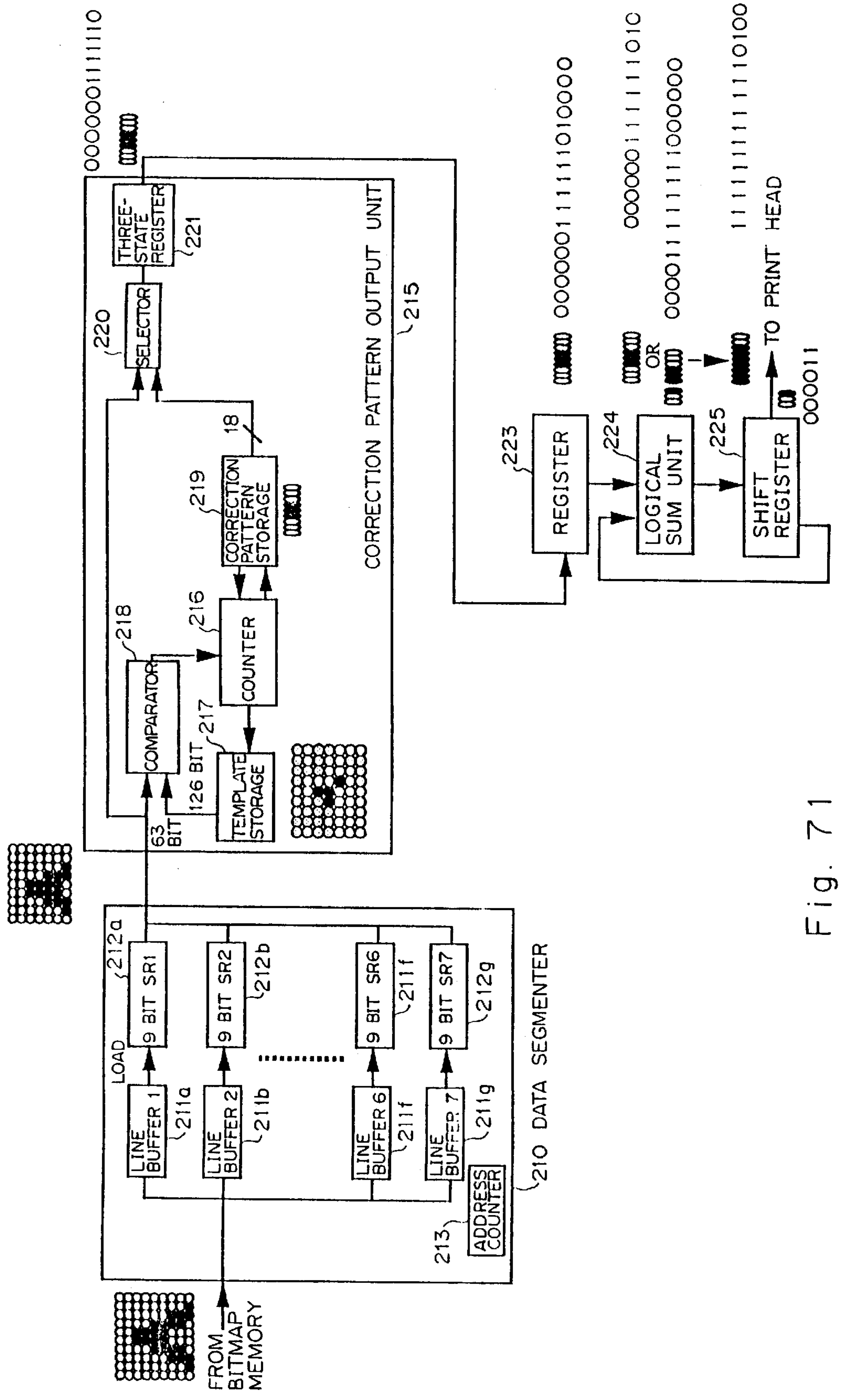
FIG. 71 is a block diagram for explaining the system configuration of the first embodiment of the image forming apparatus according to the third principle of the present invention.
Figure 72:
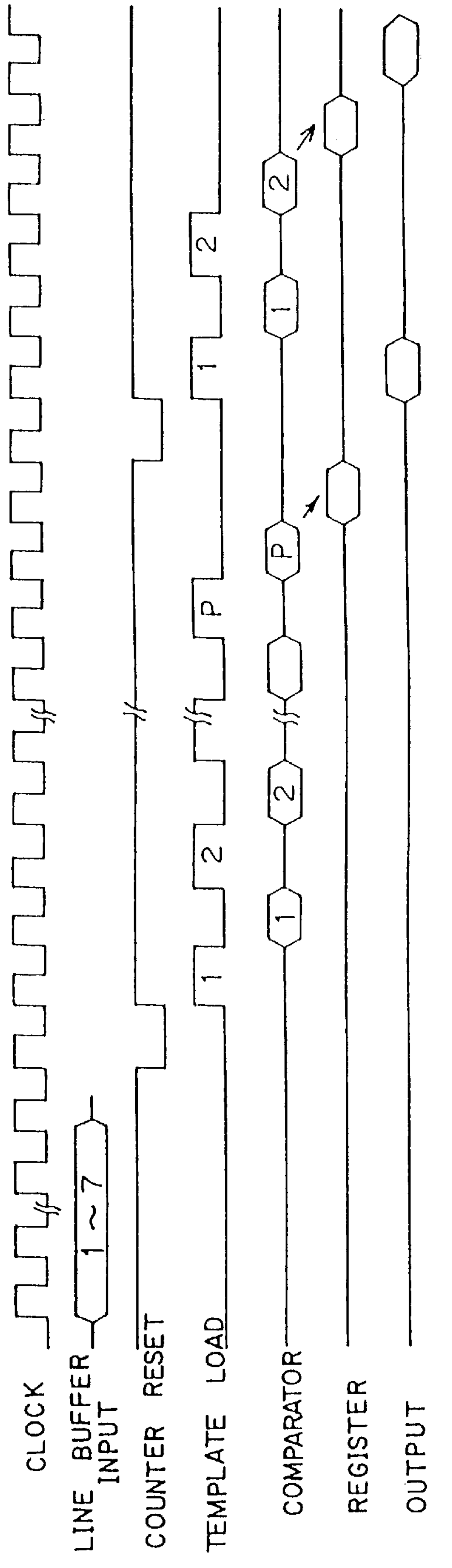
FIG. 72 is a timing chart of the operation of the system shown in FIG. 71.

FIG. 71 is a configurational block diagram for explaining the first embodiment of the image forming apparatus according to the third principle of the present invention; and FIG. 72 is a timing chart for explaining the operation by this embodiment. The system shown in FIG. 71 is described together with FIG. 72.

As shown in FIG. 71, the data inputted from the bit map memory is applied to a data segmenter 210. The data input to a line buffer in a data segmenter 210 and the data output from a shift register are similar to those of the system shown in FIG. 20. Therefore, the explanation involved is omitted here.

A counter 216 in the correction pattern output unit is reset as shown in FIG. 72 before data are serially applied bit by bit from the data segmenter 210 to a correction pattern output unit 215. A count value provided by the counter 216 corresponds to a template number for the comparison with the image data in a window. A template in a template storage 217 is loaded after resetting the counter 216, and the content is compared with the data inputted from the data segmenter 210 by a comparator 218.

The inputted data correspond to 63 picture elements in a window. Each of the picture elements corresponds to 1-bit data indicating black or white. The template data comprise "01" indicating black, "00" indicating white, and "10" indicating a "don't care", that is, black or white. The value of "10" indicating "don't care" causes a picture element to occupy 2 bits, that is, a total of 126 bits in a window.

If inputted data do not coincide with the template data, the counter 216 is stepped up and the next template data are compared with the inputted data.

Figure 73:
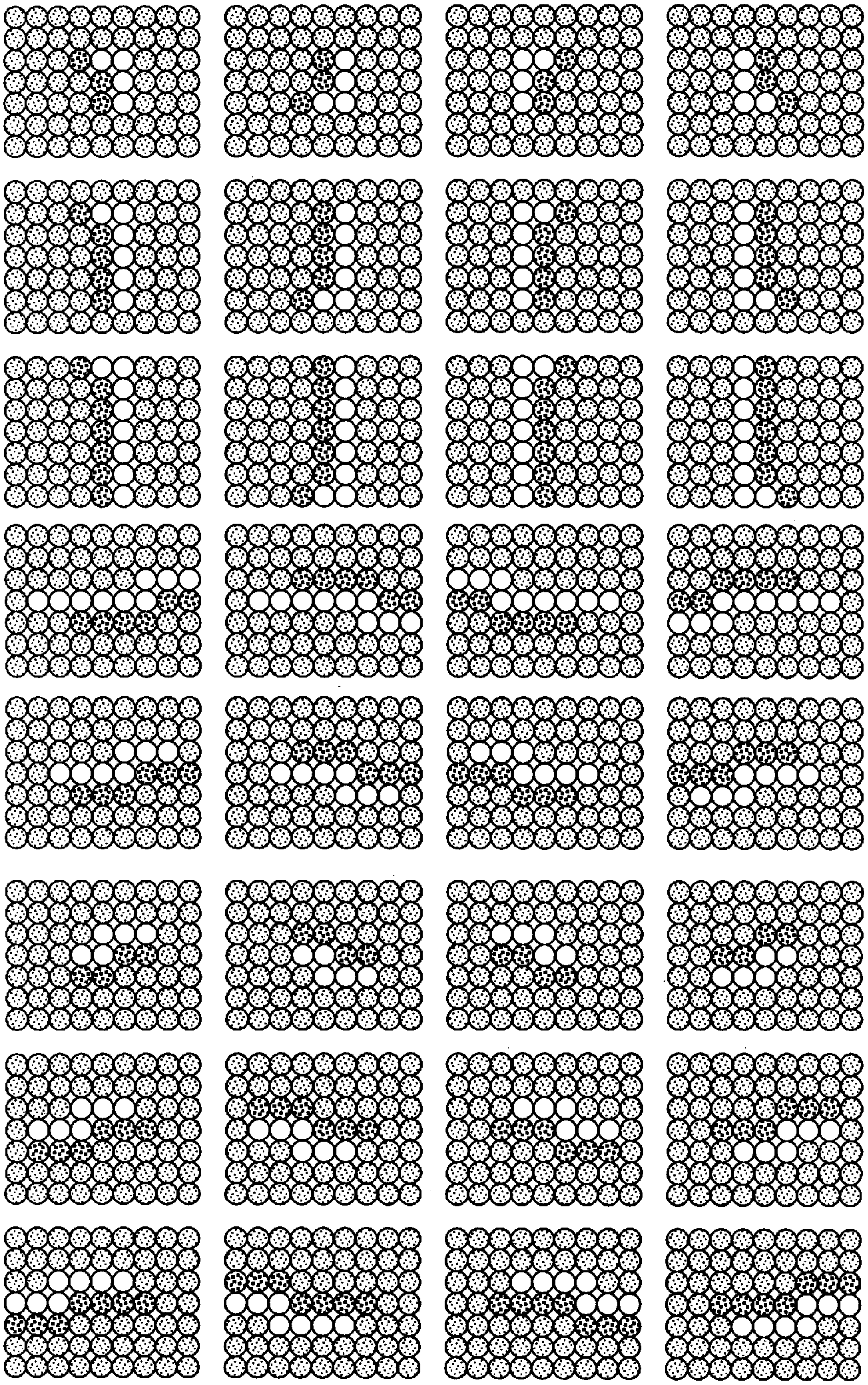
FIG. 73 shows examples of templates.

FIG. 73 shows examples of template data. Pale black dots indicate "don't care", that is, black or white.

If template data coincide with inputted data in a window, a correction pattern in a correction pattern storage 219 at the address pointed to by the counter 216 is stored in a three-state register 221 through a selector 220. The correction pattern is used for correcting each of the 3-divided picture elements to be corrected at the central position, and its right and left positions in a 9×7 picture element window. A total of 9 picture element correction data occupy 18 bits. The higher 6 bits represent the picture element data of the left adjacent element to the central element; the central 6 bits represent the data of the central picture element; and the lower 6 bits represent the picture element data of the right adjacent element to the central element. Each piece of picture element data refers to 3 divisional data. With an area scale shown in FIG. 70, the size of dots is simply reduced from left to right, for example.

If data inputted from the data segmenter 210, that is, the data in a window, do not completely coincide the template data in the template storage 217, the data shown in FIG. 74 are stored in the three-state register 221 through the selector 220 as nine pieces of picture element correction data for 3 picture elements, that is, the central and its right and left picture elements each being divided into 3 parts. When the central picture element is black, that is, indicates "1", the value of 111111 is stored for only the central picture element, and 000000 is stored for the left and right picture elements. If the central picture element is white, that is, indicates "0", the value of 000000 is stored for all these three picture elements.

The data shown in FIG. 74 are stored in the data storage 222 in FIG. 71 as those uncorrected. If window image data do not coincide with any template data, the data shown in FIG. 74 are stored in the three-state register 221 through the selector 220 depending on the state (black or white) of the central picture element in the window provided by segmented by the data segmenter. The selector 220 is switched to the side of the data storage (222) with the data uncorrected under the control of the counter 216.

As shown in FIG. 71, the correction pattern stored in the three-state register 221 is outputted from the output unit 215 to a register 223. The content in the register 223 is arranged such that 6-bit data for 3 picture elements for the central picture element being divided 3 elements are positioned in the center; 6-bit data for the left picture element at a higher order; and 6-bit data for the right picture element at a lower order, amounting to 18 bits.

In FIG. 72, since the data in the first window do not coincide with any of P pieces of template data as the result of comparison, the correction pattern shown in FIG. 74 is outputted to the register 223. The inputted image data in the next window, that is, the window in which the right picture element in the preceding window becomes the central window, coincide with the template data in the template storage 217, thereby outputting the corresponding correction pattern.

When the register 223 stores a correction pattern for the central picture element in a window, the preceding output result stored in a shift register 225 and outputted from the three-state register 221 are shifted to left by 6-bit data for the divided 3 picture elements. The shift register 225 has the same capacity as the register 223, and the overflowing 6 bits from the shift register 225, that is, the data for the divided 3 picture elements, are outputted to the print head. The data refer to those for the second picture element to the left of the present central picture element, and are transmitted to the print head as print data.

The correction pattern stored in the register 223 for the central picture element in the present window and the shift result stored in the shift register 225 are ANDed by a logical sum unit 224. The logical sum is obtained using corresponding bits between the register 223 and the shift register 225, and the logical sum is stored again in the shift register 225 so that it can be used at the next output of the three-state register 221, that is, at the output of the correction pattern for the picture element right to the central picture element in the present window.

Figure 75A:
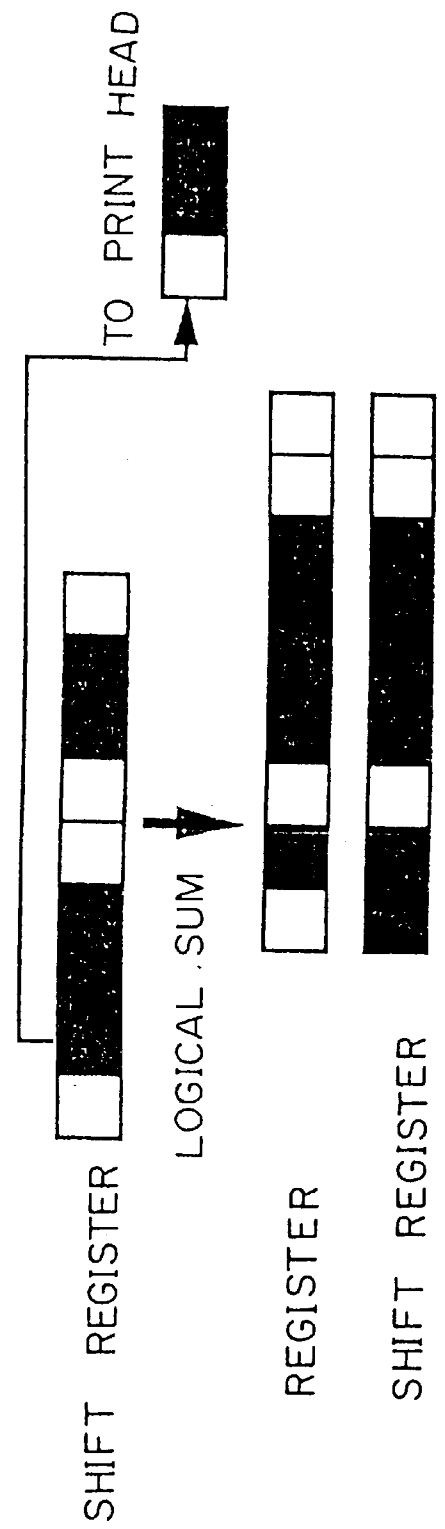
FIG. 75 shows the operation of the register and the shift register shown in FIG. 71
Figure 75B:
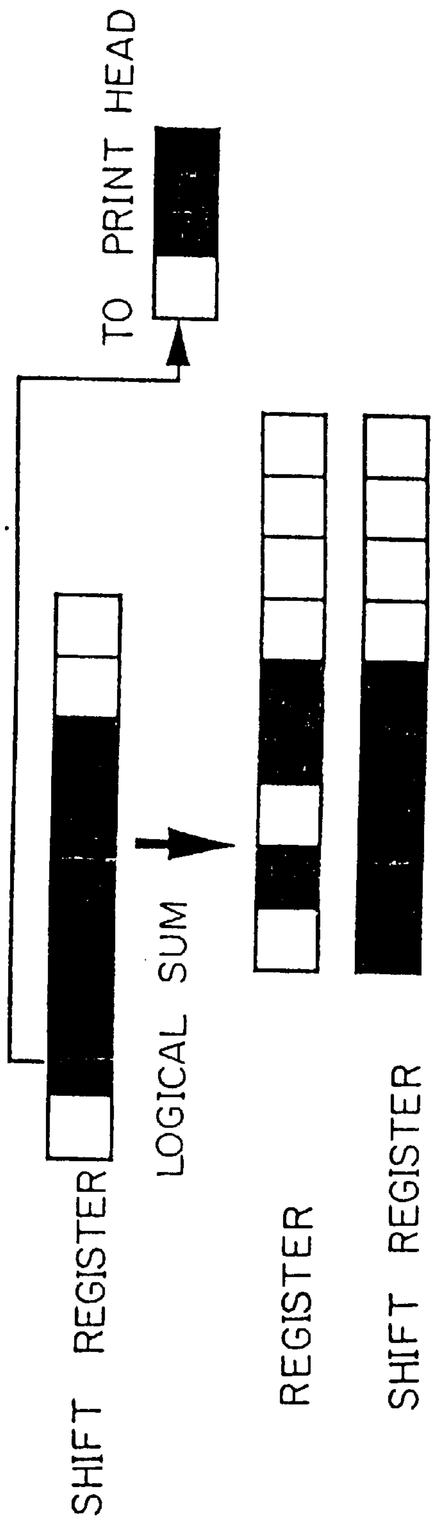

FIG. 75 shows the operation of the register 223 and the shift register 225 shown in FIG. 71. In FIG. 75A, "033" corresponding to the 3 leftmost picture elements in the content 033300330 in the shift register 225 (3 is a decimal number and represented by 11 in binary corresponding to the area scale 11 shown in FIG. 70B) is transmitted to the print head, and the content of the shift register is shifted to left by 3 picture elements. The shift result and the value 030333300 stored in the register 23 and outputted from the three-state register 21 are ANDed. The logical sum 330333300 is stored again in the shift register. FIG. 75B shows another example.

Figure 76A:
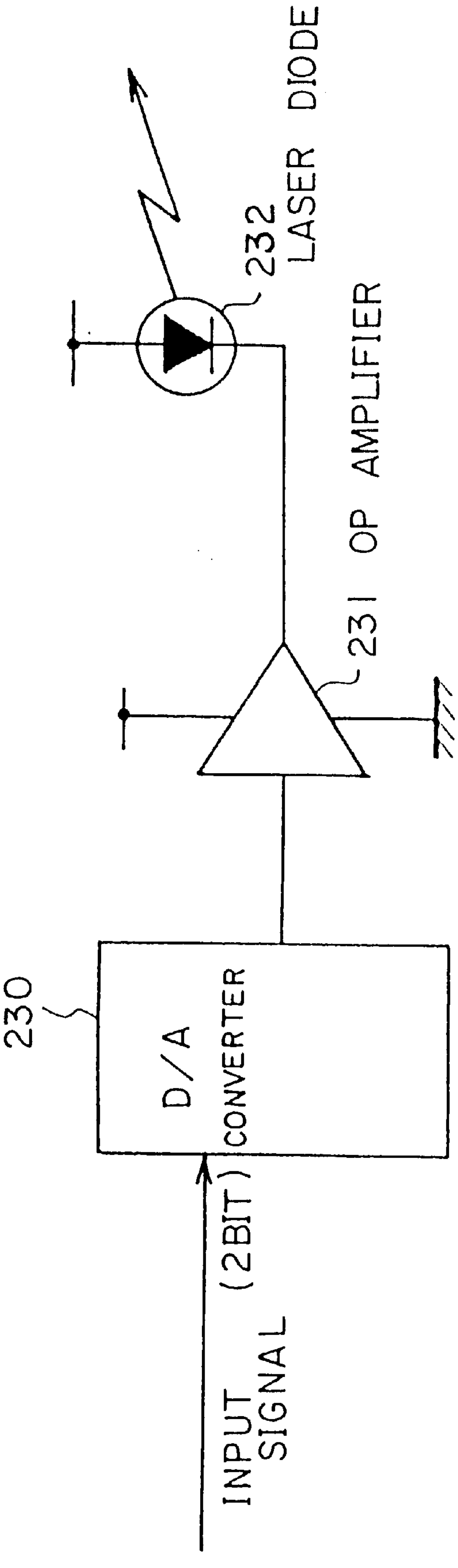
FIG. 76 shows the embodiment of the circuit in which an output from the shift register is used "as is" as an optical modulation signal.
Figure 76B:
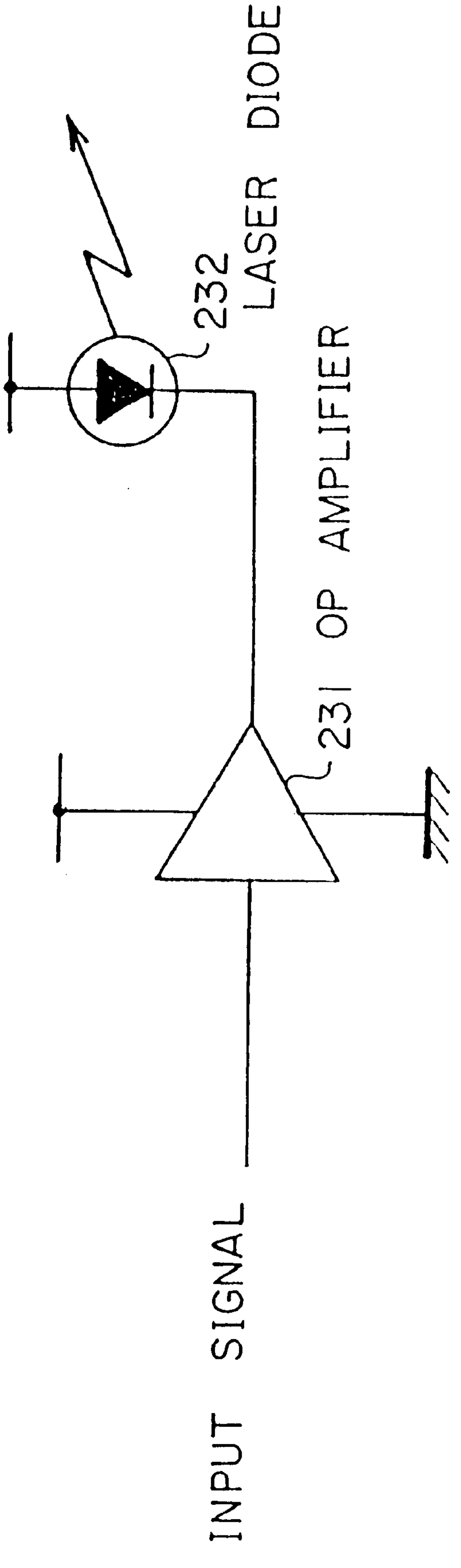

FIG. 76 shows an embodiment of the circuit in which an output result from the shift register 225 shown in FIG. 71 is used "as is" as an optical modulation signal. In FIG. 76A, the input signal for a divided picture element is represented by 2 bits as shown in FIG. 70, and the 2-bit data are applied to a D/A converter 230, and to an operational amplifier 231 after converted to an analog signal so that it can be used to control a laser diode 232. FIG. 76B shows an example in which an input signal is a 1-bit data indicating white or black represented by 0 or 1, and is applied as is to the operational amplifier 231 to control the exposure pulse of the laser diode 232.

In the first embodiment shown in FIG. 71, picture element data in a window are compared with template data. In the first embodiment, an applicable correction pattern is outputted only for the inputted data completely coincident with the corresponding template data except for don't care bits. By contrast, in the present embodiment, a correction pattern can be outputted by a neural network, thereby avoiding the comparison with all patterns and enabling an unlearned pattern to be appropriately corrected.

Figure 77:
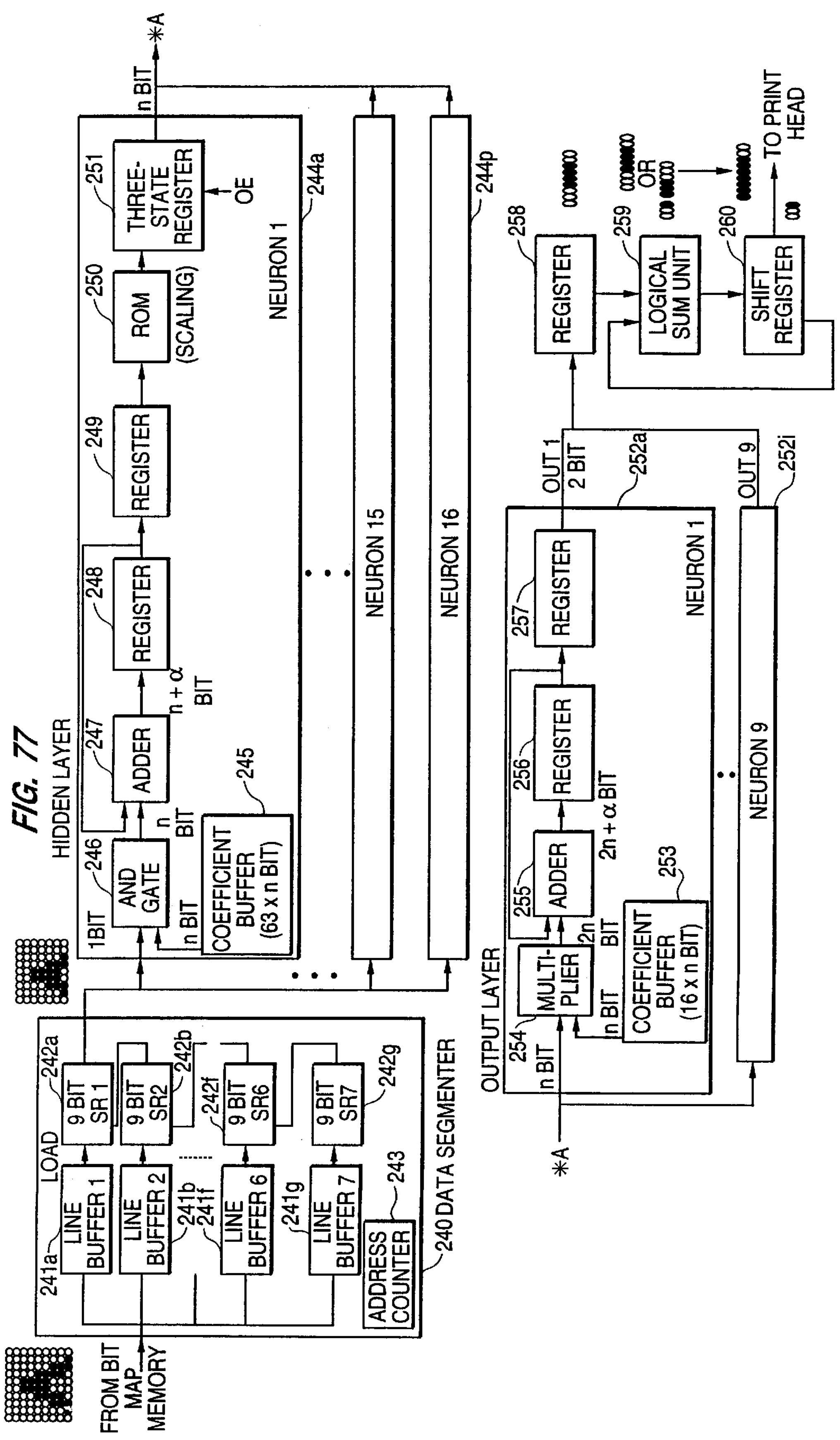
FIG. 77 shows the system configuration for explaining the second embodiment of the image forming apparatus according to the third principle of the present invention.

FIG. 77 shows the system configuration of the second embodiment of the image forming apparatus according to the third principle of the present invention. The configuration between a data segmenter 240 and neurons 252*a*–252*i* in the output layer is similar to that shown in FIG. 20 except that a window comprises 7 lines×9 dots, and that each the neurons in the output layer comprises 9 divisions each corresponding to one of 3 divisions of the central picture element, and its right and left picture elements. The configuration of a register 258, a logical sum unit 259, and a shift register 260 is the same as that shown in FIG. 71, thereby omitting the explanation of the operation shown in FIG. 77.

Figure 78A:
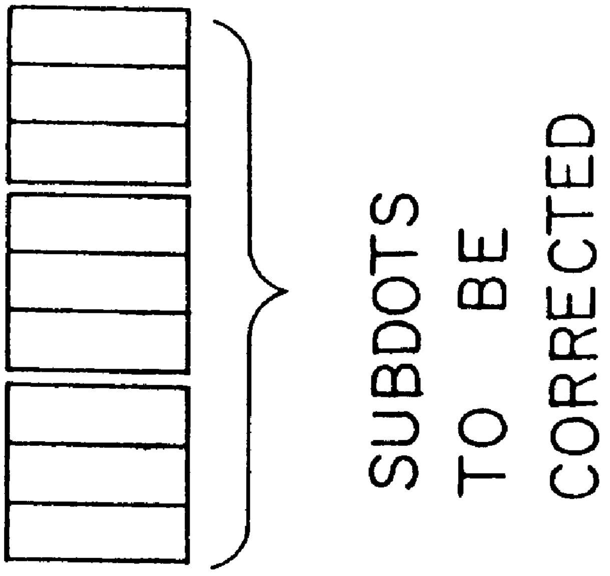
FIG. 78 is a view for explaining the image correcting method for correcting a part of subdot pattern.
Figure 78B:
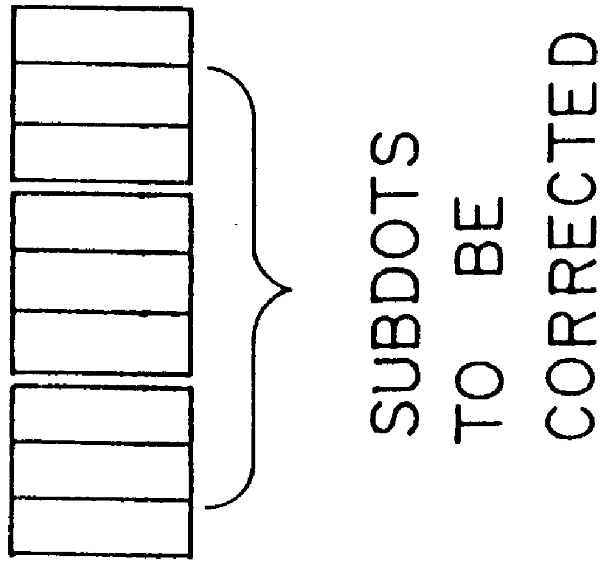

Thus, all of 9 bits indicating 9 subdots for 3 divisions of the central, its right and left picture elements are used. Among these, 1 or 2 bits in 3 bits can be selected for practical use. FIG. 78 shows how to realize this application. In FIG. 78A, data for all 9 subdots are to be corrected, while, in FIG. 78B, only 2-subdot data closer to the central picture element are corrected for the right and left picture elements. Additionally, the number of divisions can be optionally determined. For example, an original picture element is divided into 16 subdots, and the data of each dot can be represented by 1 bit.

In the application above, the size of a window is not limited to 5×3 or 9×7 picture elements. Besides, a transformation function for a neuron is not limited to a Sigmoid function or a step function, but a linear approximation or a line of a Sigmoid function can be used.

The present invention can be used in an ink jet printer and a thermal transfer printer as well as an electrophotographic printer such as laser printers, etc. Furthermore, it can be used in a display unit, not limited to a printer. When it is used in a display unit, the present invention can be applicable by applying print data to a video D/A converter, not to a print head.

What is claimed is:

1. An image forming apparatus comprising:

input means for receiving image data, the image data comprising a plurality of input dots of image data, each input dot having a corresponding dot position in a window of a predetermined shape;

jaggedd edge reducing means for reducing jagged edges in the image data said jagged edge reducing means comprising a neural network for receiving image data in a window, the window having a center dot, the neural network outputting correction data, in response to the window image data, correcting the corresponding dot position and size for the center dot in the window based on the correction data, simultaneously generating subdivided dots of each of said input dots subject to reducing jagged edges thereof to reduce a jagged edge present in said image data, and outputting a smoothed image on the correction of the center dot; and means for replacing said generated subdivided dots for each input dot subject to reducing a jagged edge thereof using the neural network.

2. The image forming apparatus according to claim 1, wherein said window image data comprises input dots of image data organized into a plurality of horizontal lines and a plurality of vertical lines;

said input means comprises data segmenter means, said data segmenter means comprising:

a plurality of line buffer means for storing and supplying window image data, each of said line buffer means storing one of said horizontal lines of the window image data, and a plurality of shift register means connected to the plurality of line buffer means, each shift register means connected in correspondence to one of said line buffer means, each said shift register means receiving the corresponding stored image data from said plurality of line buffer means, and for serially outputting, in bit units, said window image data in said window; and said neural network comprises:

an input layer, coupled to said data segmenter, for receiving said window image data and serially outputting said window image data in bit units, a plurality of hidden layer neuron means which form hidden layers of said neural network, each hidden layer comprising:

hidden layer coefficient buffer means for storing a hidden layer coefficient corresponding to the number of image data within said window and outputting the corresponding hidden layer coefficient, AND gate means for receiving the output corresponding hidden layer coefficient and the output from said data segmenter means, performing an AND operation between said to corresponding hidden layer coefficient and the output from said data segmenter means and outputting a result of said AND operation, first adder means for receiving the result from said AND gate means and receiving a stored first register content from a first register means, performing a sum-of-product operations, and outputting a first adder result, said first register means receiving and storing the first adder result from said first adder means and outputting the stored first register content, second register means for receiving and storing the first register content from said first register means and outputting a second register output, read only memory (ROM) means for receiving the second register output from said second register means and for outputting, as a scaling result, a conversion function value of a neuron, and three-state register means for holding the scaling result from said read only memory means and outputting a set value; and a plurality of output layer neuron means for forming output layers said neural network, each output layer comprising:

output layer coefficient buffer means for storing an output coefficient in correspondence with the number of said plurality of hidden layer neuron means and outputting the output coefficient, multiplier means for receiving the output from said plurality of hidden layer neurons, each output layer neuron means multiplying the output from a corresponding hidden layer neuron with the corresponding output coefficient, second adder means for receiving an output from said multiplier means and a third register output from a third register means and for performing a sum-of-product operation, and outputting a second adder result, said third register means receiving and storing the second adder result from said second adder means, and outputting the third register output, fourth register means for receiving and storing the third register output from said third register means.

3. The image forming apparatus according to claim 2, wherein:

said three-state register means in the corresponding one among said plurality of hidden layer neuron means holds the scaling result for the sum total of the products between all of said window image data and the corresponding hidden layer coefficient in said plurality of hidden layer neuron means, and output enable means, for said three-state register means in the corresponding one among said plurality of hidden layer neuron means, are sequentially established for said plurality of hidden layer neuron means;

said three-state register means, in the corresponding one of said plurality of hidden layer neuron means, sequentially outputs the stored contents to a corresponding one of said multiplier means in said plurality of output layer neuron means; and said plurality of output layer neuron means output a most significant bit of the sum total of the products between said output coefficient and all outputs from said plurality of three-state register means of said plurality of output layer neuron means.

4. The image forming apparatus according to claim 2, wherein:

more than one of said plurality of output layer neuron means, outputs correction data for the size of said center dot in said window; and more than one of said plurality of output layer neuron means, which do not output correction data for the size of said center dot, outputs correction data for the position of said center dot in said window.

5. The image forming apparatus according to claim 1, for use in a printer wherein:

said input means comprises:

first latch circuit means for receiving image data from a controller means for said printer and storing said image data, first two-port random access memory means for receiving said image data from said first latch circuit means, storing the output from said first latch circuit means, and supplying a serial output, and a plurality of shift register means for converting the serial output from said first two-port random access memory means to a parallel output; and said neural network further comprises:

neural network receiving means for receiving the output from said plurality of shift register means and for outputting correction data relating to the size and position of the center dot in said window, second two-port random access memory means for storing the output correction data from said neural network means and supplying said correction data, second latch circuit means for receiving the output correction data from said second two-port random access memory means and storing the output correction data, pulse width correcting circuit means for outputting an exposure pulse correction signal to a printing mechanism means of said printer in response to the output from said second two-port random access memory means and said second latch circuit means, first counter means for controlling read/write addresses of said first two-port random access memory means and for said second two-port random access memory means, and second counter means for controlling read/write addresses for said first two-port random access memory means and for said two-port random access memory means.

6. The image forming apparatus according to claim 5, wherein said first latch circuit means comprises:

a plurality of input terminals, one of said input terminals for receiving said image data; and a plurality of output terminals provided in a one-to-one correspondence with said plurality of input terminals and connected to respective terminals of said first two-port random access memory means; wherein each of said plurality of output terminals has a corresponding number assigned and each of said plurality of input terminals has a corresponding number assigned and each of said plurality of output terminals, except said output terminals with the last assigned number, is connected to one of said plurality of input terminals which has an assigned number equal to the assigned number of the output terminal plus one.

7. The image forming apparatus according to claim 5, wherein:

respective terminals of said first two-port random access memory means are connected to respective input terminals of said shift register means; and said shift register means store, by shifting one bit, said window image data of respective horizontal lines stored in said first two-port random access memory means.

8. The image forming apparatus according to claim 5, wherein said pulse width correcting circuit means comprises:

read only memory means for outputting actual graphic data for the center dot in a window which is current, based on the address specified by the correction data for the position and size for said center dot in said current window input from said second two-port random access memory means and by correction data left behind by a shift in dot positions of the correction data for the position and size for the preceding dots input from said second latch circuit means; and pulse width shift register means for outputting to said printing mechanism means, as said exposure pulse correction signal, serial data converted from parallel data supplied from said ROM means.

9. The image forming apparatus according to claim 8, wherein:

said read only memory means output, in accordance with said specified address, a logical sum between said correction data for said center dot in said window and said correction data left behind by said shift in dot positions.

10. The image forming apparatus according to claim 5, wherein:

said image quality correcting circuit means resets said first counter means and said second counter means in response to a beam detect signal input from said printing mechanism means from said printer and sequentially stores, in said first two-port random access memory means, image data from said controller means of said printer based on a value counted by said first counter means while simultaneously, said first two-port random access memory means sequentially outputs data to said neural network means according to a value counted by said second counter means;

said neural network means sequentially outputs data delayed by an operating cycle of said neural network means to said second two-port random access memory means according to the value counted by said second counter means; and said second two-port random access memory means starts outputting data to said pulse width correcting circuit means and processing image data for the next line according to the next beam direct signal from said printing mechanism means.

11. The image forming apparatus according to claim 1, wherein:

said neural network has one of a positive selected constant, a negative of the selected constant, and zero as a coefficient for input combination to the corresponding one of a plurality of hidden layer neuron means.

12. The image forming apparatus according to claim 11, wherein the value of said selected constant is one.

13. The image forming apparatus according to claim 11, wherein:

said hidden layer coefficient buffer means outputs said corresponding hidden layer coefficient and a second corresponding hidden layer coefficient and said hidden layer neuron means further comprises second AND gate means for receiving the second corresponding hidden layer coefficient and the output from said data segmenter means, performing an AND operation b/w said second corresponding hidden layer coefficient and the output from said data segmenter means and outputting a second AND result of said AND operation; and said first adder means receiving at one of its input terminals the output from each of said two AND gate means for performing a sum-of-product operations as one of a plurality of hidden layer neuron means.

14. The image forming apparatus according to claim 1, wherein:

said window image data comprises input dots of image data organized into a plurality of horizontal lines and a plurality of vertical lines;

said input means comprises data segmenter means, said data segmenter means comprising:

a plurality of line buffer means for storing and supplying window image data, each of said line buffer means storing one of said horizontal lines of the window image data, and a plurality of shift register means connected to the plurality of line buffer means, each shift register means connected in correspondence to one of said line buffer means, each said shift register means receiving the corresponding stored image data from said plurality of line buffer means, and for serially outputting, in bit units, said window image data in said window; and said neural network comprises:

an input layer, coupled to said data segmenter, for receiving said serial output in bit units, a plurality of hidden layer neuron means which form hidden layers of said neural network, each hidden layer comprising:

hidden layer coefficient buffer means for storing hidden layer coefficients corresponding to the number of image data within said window and outputting a first corresponding hidden layer coefficient and a second corresponding hidden layer coefficient, first AND gate means for receiving the first corresponding hidden layer coefficient and the output from said data segmenter means, performing an AND operation between the first corresponding hidden layer coefficient and the output from said data segmenter means, and outputting a first result of said AND operation, second AND gate means for receiving the second corresponding hidden layer coefficient and the output from said data segmenter means, performing an AND operation between the first corresponding hidden layer coefficient and the output from said data segmenter means, and outputting a second result of said AND operation, decoder means for receiving the first result and the second result, instructing one of an up operation, a down operation, and a hold operation, said decoder means instructing the up operation when the first result and the second result are not equal, instructing the down operation when the first result and the second result both indicate a one, and instructing the hold operation when the first result and the second result both indicate a zero, and outputting a decoder signal indicative of the operation to be instructed, up/down counter means for counting up or down in response to said decoder signal from said decoder means and outputting an up/down counter signal, first register means for receiving and storing the up/down counter signal from said up/down counter and outputting a first register output, read only memory means for receiving the first register output from said first register means and for outputting, as a scaling result, a conversion function value of a neuron, three-state register means for holding the scaling result from said read only memory means and outputting a set value, and a plurality of output layer neuron means for forming output layers said neural network, each output layer comprising:

output layer coefficient buffer means for storing an output coefficient in correspondence with the number of said plurality of hidden layer neuron means and outputting the output coefficient, multiplier means for receiving the output from said plurality of hidden layer neurons, each output layer neuron means multiplying the output from a corresponding hidden layer neuron with the corresponding output coefficient, first adder means for receiving an output from said multiplier means and a second register output from a second register means and for performing a sum-of-product operation, and outputting a first adder result, said second register means receiving and storing the first adder result from said first adder means, and outputting the second register output, and fourth register means for receiving and storing the second register output from said second register means.

15. The image forming apparatus according to claim 1, wherein:

said neural network comprises a plurality of hidden layer neuron means; and said neural network has two values, each said value being one of positive one and zero, representative of a coefficient for a corresponding one of said input to the hidden layer neuron means; and said plurality of hidden layer neuron means receive said image data and said window image data which has been inverted.

16. The image forming apparatus according to claim 15, wherein said input means further comprises data segmenter means for segmenting image data, and supplying said window image data; and said hidden layer neuron means comprises:

inverter means for inverting the window image data received from the data segmenter means and outputting an inverted window image data;

selector means for receiving as said window image data from said data segmenter means and said inverted window image data from said inverter means and outputting one of said window image data of said inverted window image data in response to a selector control signal;

selector controller means for controlling the output, by said selector means, between said window image data and by generating the selector control signal;

hidden layer coefficient buffer means for storing a hidden layer coefficient corresponding to the number of image data within said window and outputting the corresponding hidden layer coefficient;

AND gate means for receiving the output corresponding hidden layer coefficient and the output from said data segmenter means, performing an AND operation between said to corresponding hidden layer coefficient and the output from said data segmenter means and outputting a result of said AND operation;

first adder means for receiving the result from said AND gate means and receiving a stored first register content from a first register means, performing a sum-of-product operations, and outputting a first adder result, said first register means receiving and storing the first adder result from said first adder means and outputting the stored first register content;

second register means for receiving and storing the first register content from said first register means and outputting a second register output;

read only memory (ROM) means for receiving the second register output from said second register means and for outputting, as a scaling result, a conversion function value of a neuron; and three-state register means for holding the scaling result from said read only memory means and outputting a set value.

17. The image forming apparatus according to claim 16, wherein:

said window image data is indicative of one of white, black and do not care;

said selector controller means outputs a selection control signal for the output of the window image data when a dot corresponding to a datum of the window image data received from said data segmenter means must be black and for selecting the output of the inverted window image data when a dot corresponding to a datum of the window image data received from said data segmenter means must be white;

said hidden layer coefficient buffer means stores a one value as the corresponding hidden layer coefficient to multiply said window image data indicative of black or white by, and stores a zero value as the corresponding hidden layer coefficient to multiply said window image data that do not care.

18. The image forming apparatus according to claim 17, wherein said selector controller means comprises:

counter means which are reset immediately before the window image data from said data segmenter means is received and which are incremented in response to each bit of said window image data received and outputting a counter signal; and read only memory means for outputting, to said selector means, the selection control signal which is stored at an address specified by the counter signal output from said counter means.

19. The image forming apparatus according to claim 1, further comprising an image quality correcting circuit means for a printer comprising:

first latch circuit means for receiving image data from a controller means for said printer and outputting a first latch circuit output;

first two-port random access memory means for receiving and storing the first latch circuit output from said first latch circuit means and for outputting a serial output;

a plurality of shift register means for receiving the serial output from said first two-port random access memory means, converting the serial output to a parallel output and outputting said parallel output;

neural network means for receiving the parallel output from said plurality of shift register means, for generating correction data for the size and position of the center dot in said window and outputting said correction data;

second two-port random access memory means for receiving said correction data storing the correction data from said neural network means;

shift register means for receiving said correcting data, generating an exposure pulse correction signal to said printing mechanism means of said printer by serializing the parallel correction data from said second two-port random access memory means and outputting said serialized correction data;

first counter means for controlling read/write addresses of said first two-port random access memory means and said second two-port random access memory means; and second counter means for controlling read/write addresses of said first two-port random access memory means and said two-port random access memory means.

20. An image forming apparatus as recited in claim 1, further comprising:

an image bearing carrier;

toner image forming means for forming a toner image onto said image bearing carrier; and transferring means for transferring the toner image on said image bearing carrier to a recording medium, wherein said image forming means forms a toner image based on the smoothed image.

21. An image forming apparatus comprising:

light means for receiving an image data, the image data comprising a plurality of input dots of image data, each input dot having a corresponding dot position in a window of a predetermined shape;

jagged edge reducing means for reducing jagged edges in the image data, said jagged edge reducing means comprising a neural network for receiving image data in a window, the window having a center dot, simultaneously generating subdivided dots of each input dot subject to jagged edge reduction according to the image data to reduce jagged edges present in said image data, and outputting subdot pattern exposure data for the center dot in said window in response to the window image data; and means for replacing said generated subdivided dots for each input dot subject to jagged edge reduction through said neural network.

22. The image forming apparatus according to claim 21, wherein:

said input means comprises:

a plurality of line buffer means for storing and supplying window image data, each of said line buffer means storing one of said horizontal lines of the window image data, and a plurality of shift register means connected to the plurality of line buffer means, each shift register means connected in correspondence to one of said line buffer means, each said shift register means receiving the corresponding stored image data from said plurality of line buffer means, and for serially outputting, in bit units, said window image data in said window; and said neural network comprises:

an input layer, coupled to said data segmenter, for receiving said window image data and serially outputting said window image data in bit units, a plurality of hidden layer neuron means which form hidden layers of said neural network, each hidden layer comprising:

hidden layer coefficient buffer means for storing a hidden layer coefficient corresponding to the number of image data within said window and outputting the corresponding hidden layer coefficient, AND gate means for receiving the output corresponding hidden layer coefficient and the output from said data segmenter means, performing an AND operation between said to corresponding hidden layer coefficient and the output from said data segmenter means and outputting a result of said AND operation, first adder means for receiving the result from said AND gate means and receiving a stored first register content from a first register means, performing a sum-of-product operations, and outputting a first adder result, said first register means receiving and storing the first adder result from said first adder means and outputting the stored first register content, second register means for receiving and storing the first register content from said first register means and outputting a second register output, read only memory (ROM) means for receiving the second register output from said second register means and for outputting, as a scaling result, a conversion function value of a neuron, and three-state register means for holding the scaling result from said read only memory means and outputting a set value; and a plurality of output layer neuron means for forming output layers said neural network, each output layer comprising:

output layer coefficient buffer means for storing an output coefficient in correspondence with the number of said plurality of hidden layer neuron means and outputting the output coefficient, multiplier means for receiving the output from said plurality of hidden layer neurons, each output layer neuron means multiplying the output from a corresponding hidden layer neuron with the corresponding output coefficient, second adder means for receiving an output from said multiplier means and a third register output from a third register means and for performing a sum-of-product operation, and outputting a second adder result, said third register means receiving and storing the second adder result from said second adder means, and outputting the third register output, and fourth register means for receiving and storing the third register output from said third register means.

23. The image forming apparatus according to claim 21, wherein said neural network comprises:

an input layer for receiving said window image data and serially outputting said window image data in bit units, each bit unit comprising a bit representative of one of black, white and don't care;

a hidden layer of said neural network comprising a plurality of hidden layer neuron means, each said hidden layer neuron means comprising:

a plurality of pairs of first AND gate means and second AND gate means, each AND gate means having a first and second input terminal, the number of pairs equal to the number of image data in said window, each of the pairs receiving at the first input terminal for said first AND gate means and at the first input terminal for said second AND gate means, one bit of the bits units of said window image data corresponding to the pair and input simultaneously from said input layer of said neural network, and for receiving a one at the second input terminals of both the said first AND gate means and said second AND gate means when the corresponding one bit represents white, for receiving a zero at the second input terminals of both the said first AND gate means and said second AND gate means when the corresponding one bit represents don't care, and for receiving a zero at the second input terminal of one of said first AND gate means and said second AND gate means and receiving a one at the second input terminal of the other of said first AND gate means and said second AND gate means when the corresponding one bit represents black, each said first AND gate means and said second AND gate means outputting a corresponding AND gate output, first adder means for receiving all of said corresponding AND gate outputs from said first and second AND gate means and outputting a first adder output, first register means for receiving the first adder output, storing the first adder output, and supplying a first register output, read only memory means for outputting a neuron conversion function value for the first register output, as a scaling result, and a second register means for receiving the scaling result, storing the scaling result and outputting the scaling result; and an output layer for receiving the scaling result which corresponds to a subdot pattern for the center dot in the window, said subdot pattern comprising a number of subdots, said output layer comprising a plurality of output layer neuron means equal to the number of subdots in said subdot pattern, said output layer neuron means each comprising:

third AND gate means, provided in the number of said plurality of hidden layer neuron means, having a first input terminal and a second input terminal, each of said third AND gate means receiving at the first input terminals one bit of plural bits simultaneously output from said plurality of hidden layer neuron means and corresponding to one of said plurality of hidden layer neuron means and receiving, at the second input terminal, a coefficient of one of zero and one, each of said third AND gate means performing an AND operation and outputting a corresponding third AND gate output, second adder means for receiving all the corresponding third AND gate outputs from said third AND gate means, performing a summing operation, and outputting a second adder output, third register means for receiving said second adder output and storing said second adder output, and fourth register means for receiving said second adder output and outputting a most significant bit of said second adder output.

24. The image forming apparatus according to claim 23, wherein:

said first adder means in said hidden layer neuron means and said second adder means in said output layer neuron means comprise a plurality of adders in a pyramid structure formed by an adder for adding a constant term used for an intraneuron operation to all outputs from said first, second and third AND gate means thereby adding outputs from neighboring AND gate means and by an adder for adding outputs from neighboring adders.

25. The image forming apparatus according to claim 21, wherein:

an input layer for receiving said window image data and serially outputting said window image data in bit units, each bit unit comprising a bit representative of one of black, white and don't care, wherein said an input layer of said neural network comprises an input register means for storing all of said window image data and inverter means for inverting said window image data and generating inverted window image data, and supplying said window image data and said inverted window image data, in parallel, to said plurality of hidden layer neuron means; and a hidden layer of said neural network comprising a plurality of hidden layer neuron means, each said hidden layer neuron means comprising:

a plurality of AND gate means, each AND gate means having a first and second input terminal, the number of AND gate means equal to double the number of input dots in the window image data, for receiving at the first input terminal, one bit of parallel data output from said input layer, and for receiving, at the second input terminal, one if said one dot must be black, and zero otherwise, when said one bit corresponds to the window image data output from said input register means, and for receiving, at the second input terminal, one if said one dot must be white, and zero otherwise, when said one bit corresponds to the inverted window image data, first adder means for receiving all of said corresponding AND gate outputs from said plurality of AND gate means and outputting a first adder output, first register means for receiving the first adder output, storing the first adder output, and supplying a first register output, read only memory means for outputting a neuron conversion function value for the first register output, as a scaling result, and a second register means for receiving the scaling result, storing the scaling result and outputting the scaling result; and an output layer for receiving the scaling result which corresponds to a subdot pattern for the center dot in the window, said subdot pattern comprising a number of subdots, said output layer comprising a plurality of output layer neuron means equal to the number of subdots in said subdot pattern, said output layer neuron means each comprising:

third AND gate means, provided in the number of said plurality of hidden layer neuron means, having a first input terminal and a second input terminal, each of said third AND gate means receiving at the first input terminals one bit of plural bits simultaneously output from said plurality of hidden layer neuron means and corresponding to one of said plurality of hidden layer neuron means and receiving, at the second input terminal, a coefficient of one of zero and one, each of said third AND gate means performing an AND operation and outputting a corresponding third AND gate output, second adder means for receiving all the corresponding third AND gate outputs from said third AND gate means, performing a summing operation, and outputting a second adder output, third register means for receiving said second adder output and storing said second adder output, and fourth register means for receiving said second adder output and outputting a most significant bit of said second adder output.

26. The image forming apparatus according to claim 23, wherein each of said pairs of first AND gate means and second gates means is one of:

a first class of AND gate means, provided in the number double the number of input dots in said window image data, for receiving, at said first input terminal one bit of window image data and all the bits of said inverted window image data, and for receiving, at the second input terminal, a coefficient in accordance with said window image data or said inverted window image data and outputting a first class signal, a second class of AND gate means, provided in the number double the number of input dots in said window image data, for receiving, at the first input terminal one bit of said window image data and a plurality of upside-down inversions of the window image data and for receiving, at the second input terminal, a coefficient corresponding to a pattern obtained by inverting dot patterns to be detected in said window basing said coefficient on said first class of AND gate means and outputting a second class signal, a third class of AND gate means, provided in the number double the number of input dots in said window image data, for receiving at the first input terminal one bit of input data from said input layer and, at the second input terminal, a plurality of mirror images of a dot pattern corresponding to said first class of AND gate means and outputting a third class signal, and a fourth class of AND gate means, provided in the number double the number of input dots in said window image data, for receiving, at the first input terminal, one bit of window image data from said input layer and, at the second input terminal, a plurality of upside-down inversions of the mirror images of dot pattern corresponding to said first class of AND gate means and outputting a fourth class signal;

said image apparatus further comprises:

selector means for receiving the signals from said first class of AND gate means, said second class of AND gate means, said third class of AND gate means, and said fourth class of AND gate means and selectively outputting a selected output signal representative of one of said first class signal, said second class signal, said third class signal, and said fourth class signal;

adder means for adding the selected output signal from said selector means performing an adding operation, and outputting an adder result;

register means for receiving said adder result, storing said adder result and outputting a register output;

read only memory means for receiving said register output and outputting, as a scaling result, a neuron's conversion function value for the register output from said register means; and shift register means for shifting the scaling result obtained by said read only memory means corresponding to the selected signal and for storing the shifted scaling result.

27. The image forming apparatus according to claim 23, wherein:

said output layer comprises said output layer neurons provided in a number less than the number of subdots forming said subdot pattern; and a conversion table means, for converting the correction data, output from said output layer neuron means, to said subdot pattern.

28. The image forming apparatus according to claim 23, wherein:

said window has a left side and a right side;

said output layer has said output layer neuron means in a number less than the number of subdots forming said subdot patterns; and said image forming apparatus further comprises:

table means for receiving correction data and outputting a bit pattern, including all of subdot patterns for the center dot of said window and part each of the left side of said window and the right side of said window, first register means for storing subdot data for the center dot in said window, second register means for storing subdot data for the input dots on the left side of said center dot, third register means for storing subdot data for the input dots on the right side of said center dot, and plurality of OR circuit means for producing a logical sum among subdot data across said center dot from a left side dot to a right side dot, subdot data across said center dot from a right side dot to a left side dot and subdot data for said center dot.

29. An image forming apparatus as recited in claim 21, further comprising:

an image bearing carrier;

toner image forming means for forming a toner image onto said image bearing carrier; and transferring means for transferring the toner image on said image bearing carrier to a recording medium, wherein said image forming means forms a toner image based on the smoothed image.

30. An image forming apparatus comprising:

window data segmenter means for segmenting data representing picture elements in a window, having lines, comprising more than one picture element each on more than one line, each said picture element being one of a center picture element, a left picture element and a right picture element;

correction data output means for simultaneously dividing by a selected number, a block of center picture elements on a horizontal line in said window into a center subblock, a neighboring block of left picture elements on the same horizontal line in said window into a left subblock, and a neighboring block of right picture elements on the same horizontal line in said window into a right subblock, and for outputting center correction data, left correction data and right correction data for the center subblock, left subblock and right subblock, respectively, each comprised of the selected number of picture elements obtained by dividing by the selected number in a sequence of left, center and right; and output picture element data operator means for receiving said center picture element correction data output from said correction data output means, for processing the result of processing by said center correction data on receiving the selected number of subblocks of said left side correction data for said center picture element, and for outputting an output picture element data for a subblock of picture elements further to the left of said subblock of picture elements neighboring said subblock of center picture elements in said window.

31. The image forming apparatus according to claim 30, wherein:

said output picture element operator means comprises:

receiving register means for receiving said center picture element correction data; and shift register means for shifting, by the selected number of subblocks of picture elements, the stored processing result, to the left, for receiving the selected number of subblocks of left side correction data, for holding the logical sum between said shifting result and the content of said receiving register means, as a processing result in response to said center correction data, and for outputting, as said output picture element data, the selected number of subblocks of picture element data overflowed by said left shift.

32. The image forming apparatus according to claim 30, wherein:

said window data segmenter means comprises a data segmenter means comprising:

a plurality of line buffer means for storing and supplying line image data of a plurality of horizontal lines in a window having a predetermined shape, and a plurality of shift register means, connected to the plurality of line buffer means, for receiving the line image data from said plurality of line buffer means and for serially outputting one bit of the line image data of said window;

said correction data output means comprises correction pattern output means comprising:

template storer means for storing a plurality of templates output one of said templates at a time in response to signal, template comparator means for comparing said template output from said template storer means with said window image data received from said data segmenter means and outputting the comparator signal to indicate whether said window image data and said template match, counter means, incremented when said comparator signal indicates a mismatch between said window image data and said template, and for generating a counter signal, correction pattern storer means for outputting, as a correction pattern, said center correction data when said comparator signal indicates a match between said window image data and said template, changeless instance data storer means for outputting, changeless instance data corresponding to the center picture elements in said window, when none of the templates in said template storer means do not match the window image data, selector means for receiving said correction pattern and selectively outputting said one of said correction pattern and changeless instance data and said changeless instance data storer means in response to said counter signal, and a three-state register means for holding the output from said selector means.

33. The image forming apparatus according to claim 30, wherein:

said correction data output means comprises a neural network for outputting said center correction data in response to input dots of said window image data.

34. The image forming apparatus according to claim 33, further comprising:

window data segmenter means comprised of a data segmenter means comprising:

a plurality of line buffer means, for storing and supplying lines image data, each line buffer means storing and supplying line image data for a corresponding one of a plurality of horizontal lines in said window, and a plurality of shift register means, connected to the plurality of line buffer means for receiving the corresponding line image data from said plurality of line buffer means, and for serially outputting, in bit units, said image data in said window; and said correction data output means comprises:

a plurality of hidden layer neuron means which form hidden layers of said neural network, each hidden layer comprising:

hidden layer coefficient buffer means for storing a hidden layer coefficient corresponding to the number of image data within said window and outputting the corresponding hidden layer coefficient, AND gate means for receiving the output corresponding hidden layer coefficient and the output from said data segmenter means, performing an AND operation between said hidden layer coefficient buffer means output and said data segmenter means and outputting a result of said AND operation, first adder means for receiving the result from said AND gate means and receiving a stored first register content from a first register means, performing a sum-of-product operations, and outputting a first adder result, said first register means receiving and storing the first adder result from said first adder means and outputting the stored first register content, second register means for receiving and storing the first register content from said first register means and outputting a second register output, read only memory (ROM) means for receiving the second register output from said second register means and for outputting, as a scaling result, a conversion function value of a neuron, and three-state register means for holding the scaling result from said ROM means and outputting a set value; and a plurality of output layer neuron means for forming output layers of said neural network, each output layer comprising:

output layer coefficient buffer means for storing an output coefficient in correspondence with the number of said plurality of hidden layer neuron means and outputting the output coefficient, multiplier means for receiving the output from said plurality of hidden layer neurons, each output layer neuron means multiplying the output from a corresponding hidden layer neuron with the corresponding output coefficient, second adder means for receiving an output from said multiplier means and a third register output from a third register means and for performing a sum-of-product operation, and outputting a second adder result, said third register means receiving and storing the second adder result from said second adder means, and outputting the third register output, and fourth register means for receiving and storing the third register output from said third register means.

35. The image forming apparatus according to claim 30, wherein:

the output picture element data output from said output picture element operator means, has a plurality of values.

36. The image forming apparatus according to claim 35, wherein:

the output image data, output from said output element data operator means, is used as an exposure modulation signal for an exposure modulator which includes a laser diode.

37. The image forming apparatus according to claim 30, wherein:

all of the selected number of subblocks of center correction data are used;

a selected part of the selected number of subblocks of left correction data is used; and a selected part of the selected number of subblocks of right correction data is used.

38. An image forming apparatus comprising:

means for receiving an input image having a plurality of input dots; and jagged edge reducing means for correcting dots of said input image according to the input image data to obtain a smoothed image, said means comprising a neural network having a hidden layer of neurons, wherein a coefficient of each neuron in the hidden layer of the neural network is one of a selected constant, a negative of the selected constant, or zero, and said neural network simultaneously generates subdivided dots for each of said input dots subject to reducing jagged edges according to input image data to reduce a presence of jagged edges in said input image, and means for replacing said generated subdivided dots for each input dot subject to reducing jagged edges via said neural network.

39. The image forming apparatus according to claim 38, wherein said selected constant is one.

40. The image forming apparatus according to claim 39, wherein:

said image is comprised of a window of a predetermined form, with image data comprising dots;

said neural network outputs a plurality of subdot pattern exposure data for a central dot in the window in response to the input image data in said window; and said hidden layer in said neural network comprises a plurality of neurons each comprising:

a plurality of pairs of first AND gate means and second AND gate means, each AND gate means having a first and second input terminal, the number of pairs equal to the number of image data in said window, each of the pairs receiving at the first input terminal for said first AND gate means and at the first input terminal for said second AND gate means, one bit of the bits units of said window image data corresponding to the pair and input simultaneously from said input layer of said neural network, and for receiving a one at the second input terminals of both the said first AND gate means and said second AND gate means when the corresponding one bit represents white, for receiving a zero at the second input terminals of both the said first AND gate means and said second AND gate means when the corresponding one bit represents don't care, and for receiving a zero at the second input terminal of one of said first AND gate means and said second AND gate means and receiving a one at the second input terminal of the other of said first AND gate means and said second AND gate means when the corresponding one bit represents black, each said first AND gate means and said second AND gate means outputting a corresponding AND gate output, first adder means for receiving all of said corresponding AND gate outputs from said first and second AND gate means and outputting a first adder output, first register means for receiving the first adder output, storing the first adder output, and supplying a first register output, read only memory means for outputting a neuron conversion function value for the first register output, as a scaling result, and a second register means for receiving the scaling result, storing the scaling result and outputting the scaling result; and said neural network further comprises an output layer for receiving the scaling result which corresponds to a subdot pattern for the center dot in the window, said subdot pattern comprising a number of subdots, said output layer comprising a plurality of output layer neuron means equal to the number of subdots in said subdot pattern, said output layer neuron means each comprising:

third AND gate means, provided in the number of said plurality of hidden layer neuron means, having a first input terminal and a second input terminal, each of said third AND gate means receiving at the first input terminals one bit of plural bits simultaneously output from said plurality of hidden layer neuron means and corresponding to one of said plurality of hidden layer neuron means and receiving, at the second input terminal, a coefficient of one of zero and one, each of said third AND gate means performing an AND operation and outputting a corresponding third AND gate output, second adder means for receiving all the corresponding third AND gate outputs from said third AND gate means, performing a summing operation, and outputting a second adder output, third register means for receiving said second adder output and storing said second adder output, and fourth register means for receiving said second adder output and outputting a most significant bit of said second adder output.

41. The image forming apparatus according to claim 40, wherein:

said first adder in said hidden layer neuron and said second adder in said output layer neuron comprise a plurality of adders for adding outputs from adjacent AND gates and a plurality of adders for adding outputs from adjacent adders, both being in a pyramid form, for adding a selected constant value, for use in an arithmetic operation in a neuron, to the outputs from all AND gates.

42. The image forming apparatus according to claim 39, said neural network further comprises:

an input layer of said neural network comprises an input register for storing said window image data in said window and an inverter for inverting all window image data in said window, all window image data in said window being stored and the output from said inverter is output in parallel to said hidden layer neuron;

said hidden layer in said neural network further comprises:

a plurality of AND gate means, each AND gate means having a first and second input terminal, the number of AND gate means equal to double the number of input dots in the window image data, for receiving at the first input terminal, one bit of parallel data output from said input layer, and for receiving, at the second input terminal, one if said one dot must be black, and zero otherwise, when said one bit corresponds to the window image data output from said input register means, and for receiving, at the second input terminal, one if said one dot must be white, and zero otherwise, when said one bit corresponds to the inverted window image data, first adder means for receiving all of said corresponding AND gate outputs from said plurality of AND gate means and outputting a first adder output, first register means for receiving the first adder output, storing the first adder output, and supplying a first register output, read only memory means for outputting a neuron conversion function value for the first register output, as a scaling result, and a second register means for receiving the scaling result, storing the scaling result and outputting the scaling result; and an output layer for receiving the scaling result which corresponds to a subdot pattern for the center dot in the window, said subdot pattern comprising a number of subdots, said output layer comprising a plurality of output layer neuron means equal to the number of subdots in said subdot pattern, said output layer neuron means each comprising:

third AND gate means, provided in the number of said plurality of hidden layer neuron means, having a first input terminal and a second input terminal, each of said third AND gate means receiving at the first input terminals one bit of plural bits simultaneously output from said plurality of hidden layer neuron means and corresponding to one of said plurality of hidden layer neuron means and receiving, at the second input terminal, a coefficient of one of zero and one, each of said third AND gate means performing an AND operation and outputting a corresponding third AND gate output, second adder means for receiving all the corresponding third AND gate outputs from said third AND gate means, performing a summing operation, and outputting a second adder output, third register means for receiving said second adder output and storing said second adder output, and fourth register means for receiving said second adder output and outputting a most significant bit of said second adder output.

43. The image forming apparatus according to claim 40, wherein:

said hidden layer of said neural network comprises a plurality of neurons each comprising:

a first class of AND gate means, provided in the number double the number of input dots in said window image data, for receiving, at said first input terminal one bit of window image data and all the bits of said inverted window image data, and for receiving, at the second input terminal, a coefficient in accordance with said window image data or said inverted window image data and outputting a first class signal;

a second class of AND gate means, provided in the number double the number of input dots in said window image data, for receiving, at the first input terminal one bit of said window image data and a plurality of upside-down inversions of the window image data and for receiving, at the second input terminal, a coefficient corresponding to a pattern obtained by inverting dot patterns to be detected in said window basing said coefficient on said first class of AND gate means and outputting a second class signal;

a third class of AND gate means, provided in the number double the number of input dots in said window image data, for receiving at the first input terminal one bit of input data from said input layer and, at the second input terminal, a left-to-right inverted pattern of a dot pattern corresponding to said first class of AND gate means and outputting a third class signal; and a fourth class of AND gate means, provided in the number double the number of input dots in said window image data, for receiving, at the first input terminal, one bit of window image data from said input layer and, at the second input terminal, a coefficient corresponding to an upside-down inversion and left-to-right dot pattern corresponding to said first class of AND gate means and outputting a fourth class signal;

selector means for receiving the signals from said first class of AND gate means, said second class of AND gate means, said third class of AND gate means, and said fourth class of AND gate means and selectively outputting a selected output signal representative of one of said first class signal, said second class signal, said third class signal, and said fourth class signal;

adder means for adding the selected output signal from said selector means performing an adding operation, and outputting an adder result;

register means for receiving said adder result, storing said adder result and outputting a register output;

read only memory means for receiving said register output and outputting, as a scaling result, a neuron's conversion function value for the register output from said register means; and shift register means for shifting the scaling result obtained by said read only memory means corresponding to the selected signal and for storing the shifted scaling result.

44. An image forming apparatus according to claim 40, wherein said output layer comprises:

said output layer neurons, the number of said neuron being smaller than the number of subdots forming said subdot pattern, and a table for converting outputs from said output layer neurons to said subdot patterns.

45. An image forming apparatus as recited in claim 38, further comprising:

an image bearing carrier;

toner image forming means for forming a toner image onto said image bearing carrier; and transferring means for transferring the toner image on said image bearing carrier to a recording medium, wherein said image forming means forms a toner image based on the smoothed image.

46. An image forming apparatus for smoothing an image by correcting dots in an input image formed of a plurality of input dots according to an array of inputted dot image data, comprising:

jagged edge reducing means including a neural network for receiving dot image data, in a window of a predetermined form, and simultaneously outputting a plurality of subdot pattern exposure data for each central dot in said window and outputting jagged edge reducing means subdot information; and exposure pattern data outputting means for obtaining a logical sum using the jagged edge reducing means subdot information, said jagged edge reducing means subdot information containing information about left-to-right dots and right-to-left dots, and containing information about said central dot and subdot information about said central dot, and outputting said logical sum as an exposure pattern data for said central dot in said window.

47. The image forming apparatus according to claim 46, wherein:

said window comprises dots of one of the type of center dot, left dot and right dot;

said smoothing means determines a subdot pattern comprised of subdots;

said smoothing means comprises a neural network having an output layer containing a smaller number of output layer neurons than the number of subdots forming said subdot pattern; and said exposure pattern data output means comprises:

a table for receiving from said output layer of said neural network a bit pattern containing the subdot pattern corresponding to said central dot in said window and a part of each subdot pattern for the left dots and the right dots to said central pattern dot;

a first register for storing subdot information for said central dot in said window;

a second register for storing subdot information about a dot left to said central dot;

a third register for storing subdot information about a dot right to said central dot; and a plurality of OR circuits for obtaining a logical sum of subdot information about left to right and right to left dots containing said central dot and subdot information about said central dot.

48. An image forming apparatus as recited in claim 46, further comprising:

an image bearing carrier;

toner image forming means for forming a toner image onto said image bearing carrier; and transferring means for transferring the toner image on said image bearing carrier to a recording medium, wherein said image forming means forms a toner image based on the smoothed image.

49. An image forming apparatus comprising:

means for receiving image data comprising a plurality of input dots;

jagged edge reducing means including:

a neural network for simultaneously generating subdivided dots of each said input dot subject to reducing jagged edges according to input image data to reduce jagged edges present in said input image; and means for replacing said generated subdivided dots for each said input dot subject to reduce jagged edges through said neural network.

50. An image forming apparatus as recited in claim 49, further comprising:

an image bearing carrier;

toner image forming means for forming a toner image onto said image bearing carrier; and transferring means for transferring the toner image on said image bearing carrier to a recording medium, wherein said image forming means forms a toner image based on the smoothed image.

51. An image forming apparatus comprising:

means for receiving an image data constructed by a plurality of input dots; and jagged edge reducing means including:

means for simultaneously generating subdivided dots of each said input dot to be subject to reducing jagged edges according to input image data to reduce jagged edges present in said output image, wherein said generated subdivided dots for said input dot to be subject to reduction in jagged edges and second subdivided dots affected to an adjacent input dot adjacent to said input dot to be subject to reduction in jagged edges;

means for storing said second subdivided dots;

means for combining said second subdivided dots and first subdivided dots successively generated for said adjacent input dot; and means for replacing said combined subdivided dots for said adjacent input dot.

52. An image forming apparatus comprising:

input means for receiving image data, the image data comprising a plurality of input dots of image data, each input dot having a corresponding dot position in a window of a predetermined shape;

jagged edge reducing means for reducing jagged edges in the image data said jagged edge reducing means comprising a neural network, which includes three layers being an input layer, a hidden layer having neurons therein that converge to +1, 0, or −1, and an output layer, for receiving image data in a window, the window having a center dot, the neural network outputting correction data, in response to the window image data, correcting the corresponding dot position and size for the center dot in the window based on the correction data, generating subdivided dots of each of said input dots subject to reducing jagged edges thereof to reduce a jagged edge present in said image data, and outputting a smoothed image based on the correction of the center dot; and means for replacing said generated subdivided dots for each input dot subject to reducing a jagged edge thereof using the neural network;

wherein neurons of said neural network multiply a plurality of inputs by respective coefficients, adding the products together, converting the sum using an appropriate function, and outputting the result; and the output of the n-th neuron of the neural network is given by the following expression:

$$y^n = f(k_0^n + k_1^n x_1^n + \ldots + k_m^n X_m^n)$$

where $x_i^n$ indicates the i-th input to the n-th neuron, $k_i^n$ indicates a coefficient of the input; and $k_0^n$ indicates a constant term.

53. The image forming apparatus according to claim 52, wherein said window image data comprises input dots of image data organized into a plurality of horizontal lines and a plurality of vertical lines;

said input means comprises data segmenter means, said data segmenter means including:

a plurality of line buffer means for storing and supplying window image data, each of said line buffer means storing one of said horizontal lines of the window image data, and a plurality of shift registers connected to the plurality of line buffer means, each shift register connected in correspondence to one of said line buffer means, each said shift register receiving the corresponding stored image data from said plurality of line buffer means, and for serially outputting, in bit units, said window image data in said window; and said neural network comprises:

said input layer, coupled to said data segmenter means, for receiving said window image data and serially outputting said window image data in bit units, a plurality of neurons in the hidden layer which form a plurality of said hidden layers of said neural network, each said hidden layer comprising:

hidden layer coefficient buffer means for storing a hidden layer coefficient corresponding to the number of image data within said window and outputting the corresponding hidden layer coefficient, an AND gate for receiving the output corresponding to the hidden layer coefficient and the output from said data segmenter means, performing an AND operation between said corresponding hidden layer coefficient and the output from said data segmenter means and outputting a result of said AND operation, a first adder for receiving the result from said AND gate and receiving a stored first register content from a first register, performing a sum-of-product operations, and outputting a first adder result, said first register receiving and storing the first adder result from said first adder and outputting the stored first register content, a second register for receiving and storing the first register content from said first register and outputting a second register output, a read only memory (ROM) for receiving the second register output from said second register means and for outputting, as a scaling result, a conversion function value of a neuron, and a three-state register for holding the scaling result from said read only memory and outputting a set value; and a plurality of neurons forming a plurality of said output layers of said neural network, each said output layer including:

an output layer coefficient buffer for storing an output coefficient in correspondence with the number of said plurality of hidden layer neurons and outputting the output coefficient, a multiplier for receiving the output from said plurality of hidden layer neurons, each output layer neuron multiplying the output from a corresponding hidden layer neuron with the corresponding output coefficient, a second adder for receiving an output from said multiplier and a third register output from a third register and for performing a sum-of-product operation, and outputting a second adder result, said third register receiving and storing the second adder result from said second adder, and outputting the third register output, and a fourth register for receiving and storing the third register output from said third register.

* * * * *